US012671290B2

(12) United States Patent
Tateishi et al.

(10) Patent No.: US 12,671,290 B2
(45) Date of Patent: Jun. 30, 2026

(54) MOTOR

(71) Applicant: DENSO CORPORATION, Kariya-city (JP)

(72) Inventors: Yusuke Tateishi, Kariya-city (JP); Toshio Yamamoto, Kariya-city (JP); Yuji Hayashi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 238 days.

(21) Appl. No.: 18/539,674

(22) Filed: Dec. 14, 2023

(65) Prior Publication Data

US 2024/0120794 A1      Apr. 11, 2024

Related U.S. Application Data

(63) Continuation      of      application      No. PCT/JP2022/012889, filed on Mar. 18, 2022.

(30) Foreign Application Priority Data

Jun. 18, 2021     (JP) ................................. 2021-101618

(51) Int. Cl.
*H02K 3/28*          (2006.01)
*H02K 1/27*          (2022.01)
(Continued)

(52) U.S. Cl.
CPC .............. *H02K 3/28* (2013.01); *H02K 1/278* (2013.01); *H02K 3/02* (2013.01); *H02K 3/34* (2013.01); *H02K 2213/03* (2013.01)

(58) Field of Classification Search
CPC ............ H02K 3/28; H02K 1/278; H02K 3/02; H02K 3/34; H02K 2213/03; H02K 7/116; H02K 21/14; H02K 3/47
See application file for complete search history.

(56) References Cited

U.S. PATENT DOCUMENTS

2002/0067094 A1      6/2002   Okazaki et al.
2012/0001513 A1      1/2012   Kawano et al.
(Continued)

FOREIGN PATENT DOCUMENTS

JP          S4933311 U       3/1974
JP          H04-58747 A      2/1992
(Continued)

OTHER PUBLICATIONS

Jun. 14, 2022 Search Report issued in International Application No. PCT/JP2022/012889.

*Primary Examiner* — Thomas Truong
(74) *Attorney, Agent, or Firm* — Oliff PLC

(57) ABSTRACT

A motor includes a stator having a stator core. The stator includes a coil connection body of one phase having a plurality of coils connected with each other; at least one of the coils has an electrical resistance set to be different from an electrical resistance of another of the coils. The stator also includes a coil connection body of another phase having a plurality of coils connected with each other; at least one of the coils has an electrical resistance set to be different from an electrical resistance of another of the coils. Moreover, the coil connection body of the another phase has a combined resistance set to be equal to a combined resistance of the coil connection body of the one phase.

14 Claims, 40 Drawing Sheets

(51) Int. Cl.
    *H02K 1/278*     (2022.01)
    *H02K 3/02*      (2006.01)
    *H02K 3/34*      (2006.01)

(56)                 References Cited

U.S. PATENT DOCUMENTS

| | | | | |
|---|---|---|---|---|
| 2013/0009523 | A1 | 1/2013 | Takeuchi | |
| 2016/0322875 | A1 | 11/2016 | Ogawa | |
| 2019/0140500 | A1 | 5/2019 | Takizawa et al. | |
| 2019/0363596 | A1* | 11/2019 | Takeuchi | H02K 15/066 |
| 2022/0109358 | A1* | 4/2022 | Tamura | H02P 21/0003 |
| 2022/0209633 | A1* | 6/2022 | Takahashi | H02K 3/522 |

FOREIGN PATENT DOCUMENTS

| | | | | | |
|---|---|---|---|---|---|
| JP | H05-115150 | A | | 5/1993 | |
| JP | 2006-141137 | A | | 6/2006 | |
| JP | 5566541 | B1 | | 8/2014 | |
| JP | 2021-13258 | A | | 2/2021 | |
| JP | 2021044913 | A | * | 3/2021 | H02K 21/26 |
| WO | 20190008848 | A1 | | 1/2019 | |
| WO | WO-2020251050 | A1 | * | 12/2020 | H02P 21/0003 |

* cited by examiner

MOTOR

CROSS-REFERENCE TO RELATED APPLICATIONS

The present application is a continuation application of International Application No. PCT/JP2022/012889 filed on Mar. 18, 2022, which is based on and claims priority from Japanese Patent Application No. 2021-101618 filed on Jun. 18, 2021. The entire contents of these applications are incorporated by reference into the present application.

BACKGROUND

1 Technical Field

The present disclosure relates to motors.

2 Description of Related Art

There is known a motor that is formed by arranging a plurality of coils along an annular coil-fixing ring (see, for example, Japanese Unexamined Patent Application Publication No. JPH0458747A). Specifically, the motor includes A-phase coils and B-phase coils. Each of the A-phase coils and the B-phase coils is formed by winding a winding into a rectangular shape and radially bending both axial end parts of the rectangular-shaped winding. Moreover, the A-phase coils and the B-phase coils are arranged alternately along a circumferential direction of the coil-fixing ring.

SUMMARY

In motors where the combined resistance of coils constituting one phase is different from the combined resistance of coils constituting another phase, the difference in combined resistance between the two phases may cause electrical imbalance, thereby deteriorating torque ripple. However, this problem has not been considered in the aforementioned patent document.

The present disclosure has been accomplished in consideration of the above problem.

According to the present disclosure, there is provided a motor comprising:

a rotating body having magnets and rotatably supported;

a core formed in a ring shape and arranged coaxially with the rotating body;

a coil connection body of one phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core; and a coil connection body of another phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core, wherein the coil connection body of the another phase has a combined resistance set to be equal to a combined resistance of the coil connection body of the one phase.

With the above configuration of the motor according to the present disclosure, it is possible to suppress deterioration of torque ripple.

BRIEF DESCRIPTION OF THE DRAWINGS

FIG. 5 is a perspective view showing the stator.

FIG. 9 is an enlarged side cross-sectional view showing, through enlargement, the boundary portion between the opposing part and the coil end part.

3

Figure 24:
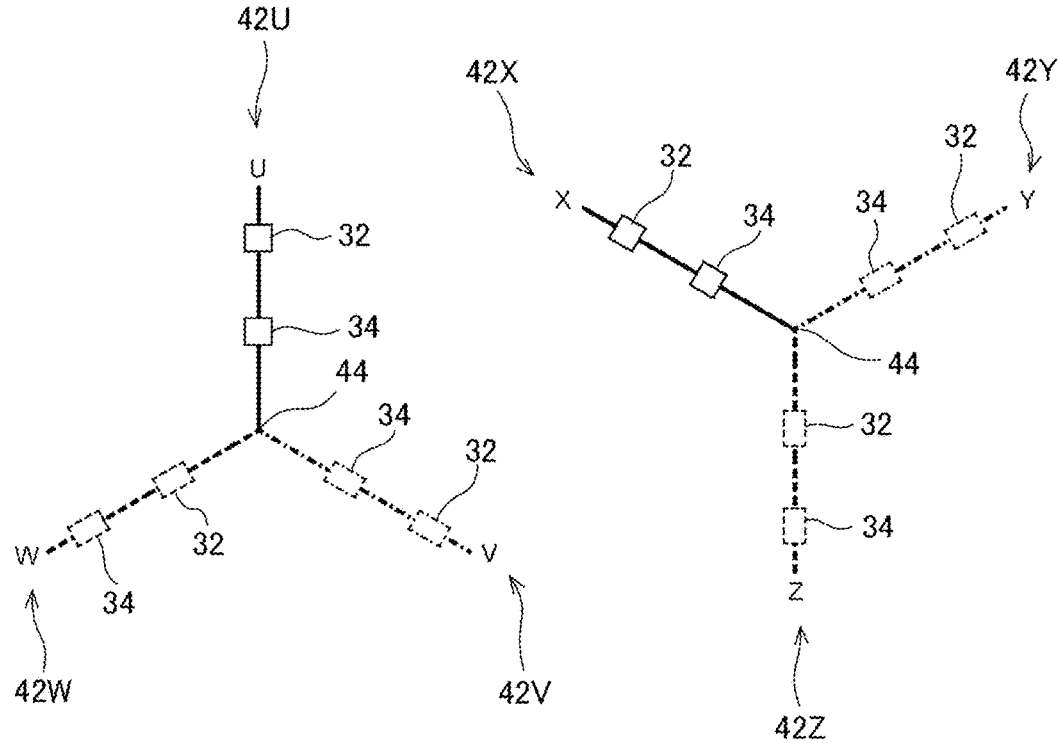

FIG. 24 is a schematic diagram for explaining the connection between U-phase, V-phase and W-phase coils of a motor according to a sixth embodiment.

Figure 25:
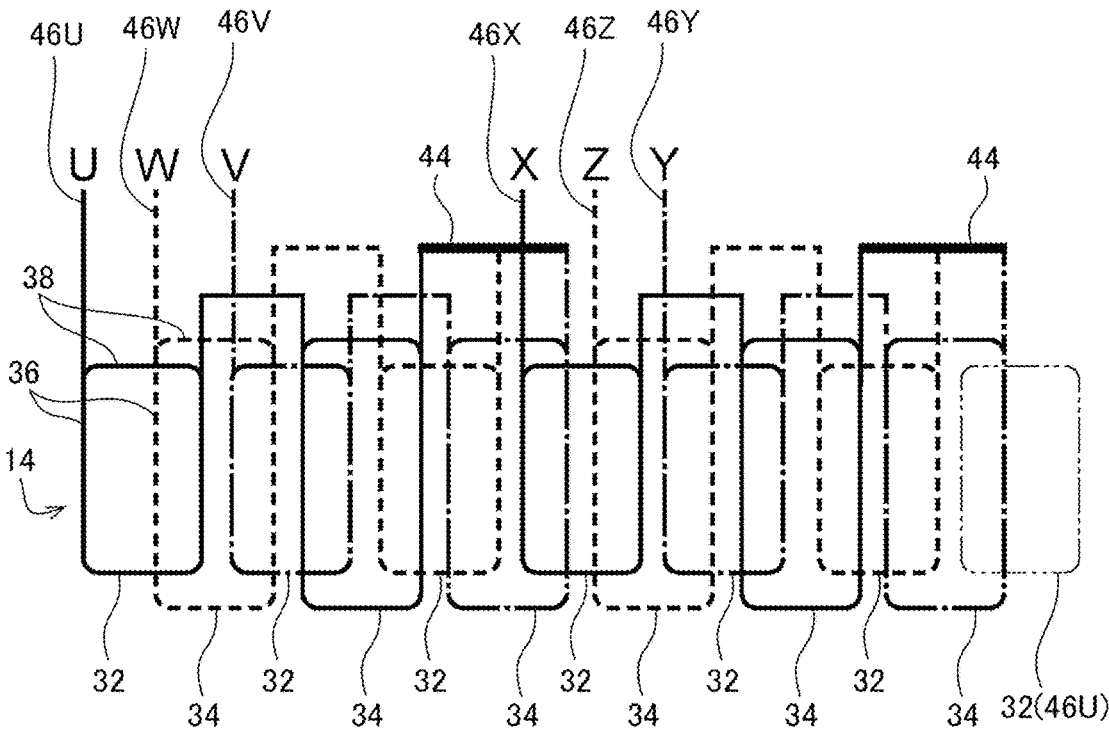

FIG. 25 is a schematic diagram for explaining the connection and arrangement of the U-phase, V-phase and W-phase coils of the motor according to the sixth embodiment.

Figure 26:
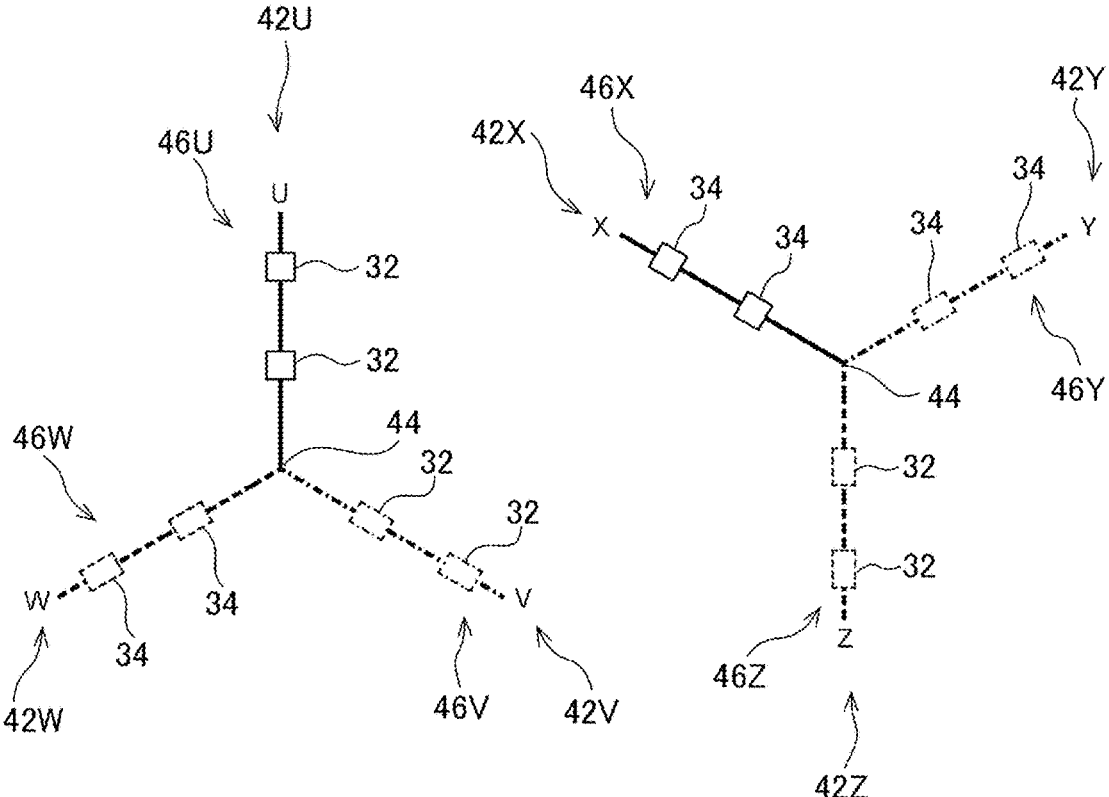

FIG. 26 is a schematic diagram for explaining the connection between U-phase, V-phase and W-phase coils of a motor according to a seventh embodiment.

Figure 27:
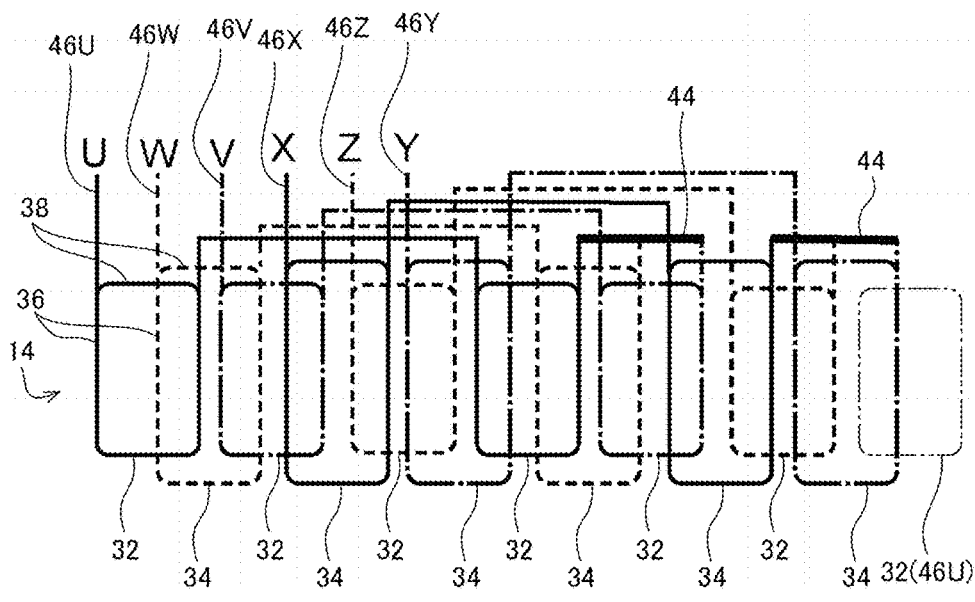

FIG. 27 is a schematic diagram for explaining the connection and arrangement of the U-phase, V-phase and W-phase coils of the motor according to the seventh embodiment.

Figure 28:
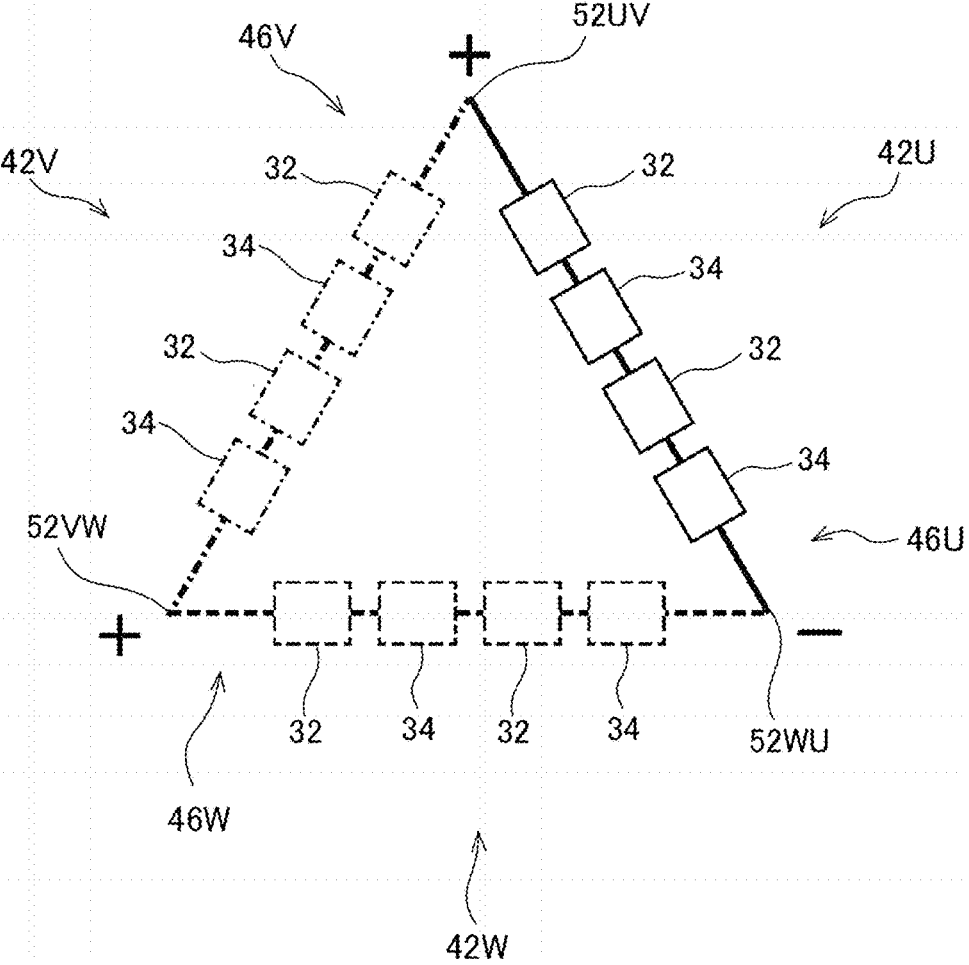

FIG. 28 is a schematic diagram for explaining the connection between U-phase, V-phase and W-phase coils of a motor according to an eighth embodiment.

Figure 29:
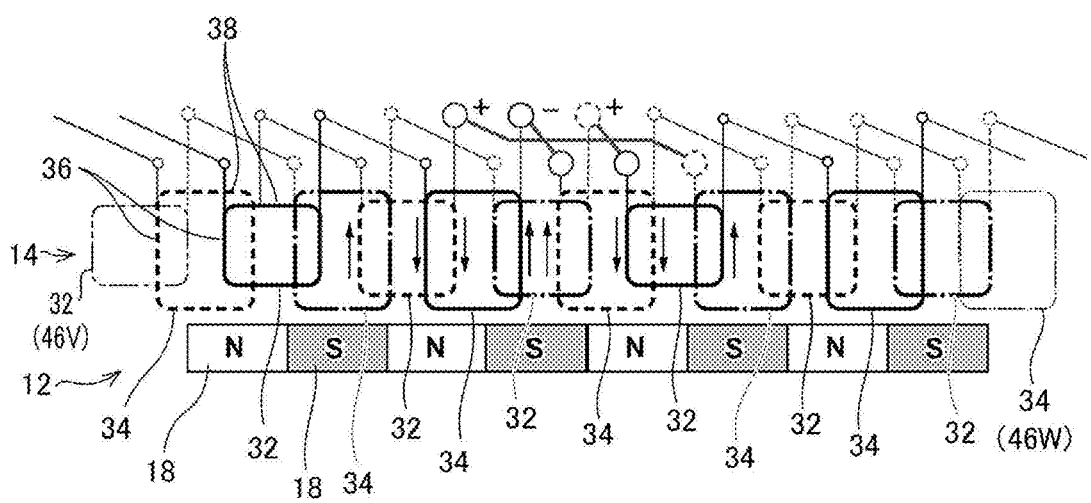

FIG. 29 is a schematic diagram for explaining the connection and arrangement of the U-phase, V-phase and W-phase coils of the motor according to the eighth embodiment.

Figure 30:
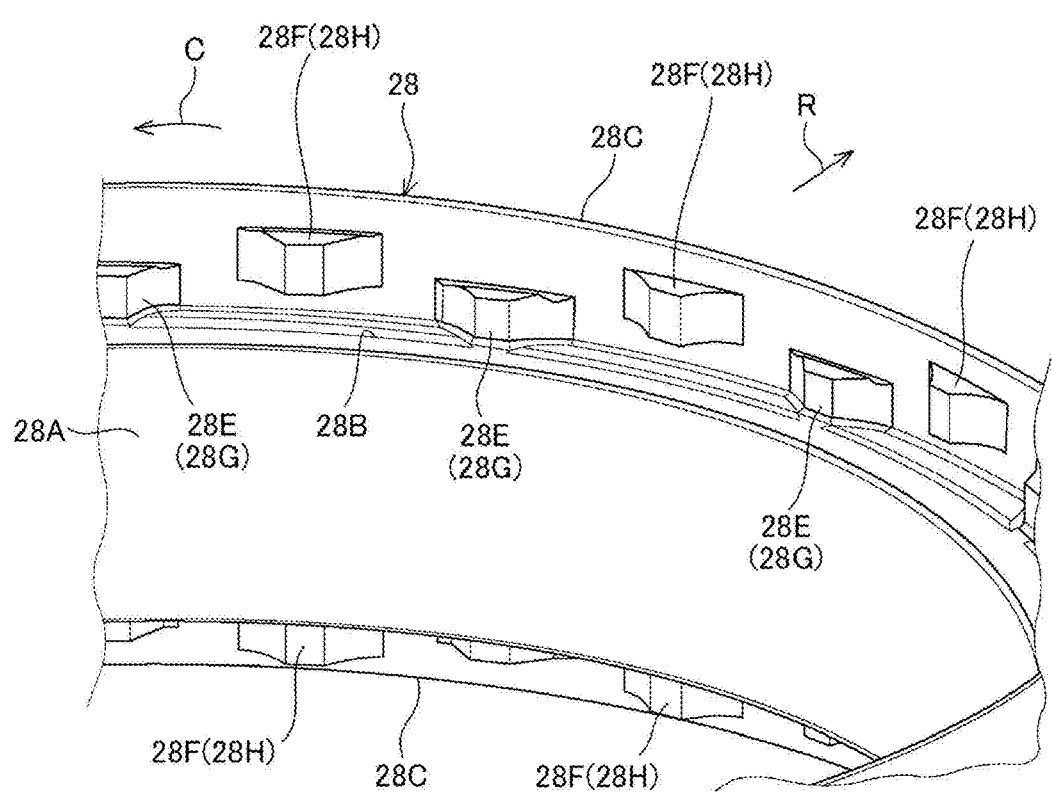

FIG. 30 is a perspective view showing an insulator of a motor according to a ninth embodiment.

Figure 31:
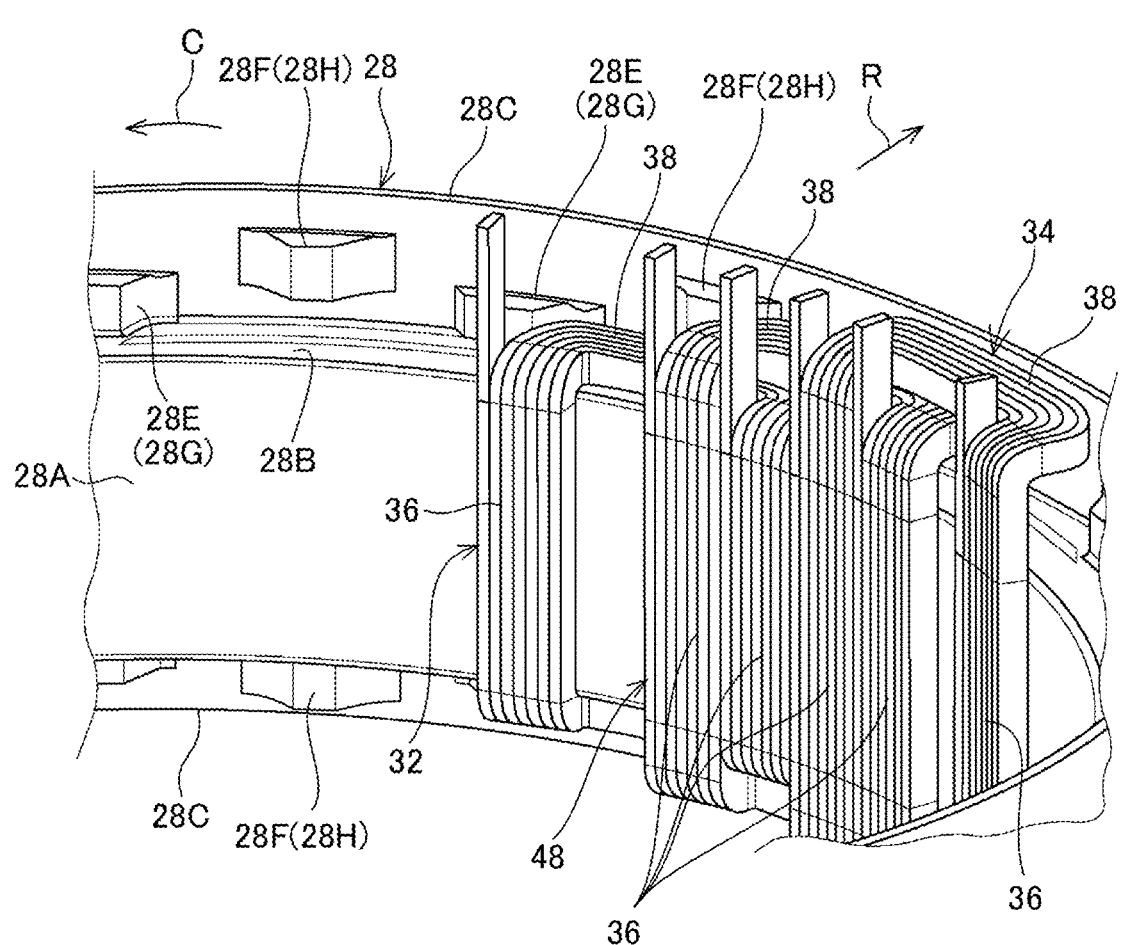

FIG. 31 is a perspective view showing the insulator and U-phase, V-phase and W-phase coils that are supported by a stator core via the insulator in the motor according to the ninth embodiment.

Figure 32:

FIG. 32 is an enlarged plan view showing, through enlargement, part of a motor according to a tenth embodiment.

Figure 33:

FIG. 33 is an enlarged plan view showing, through enlargement, part of a motor according to an eleventh embodiment.

Figure 34A:
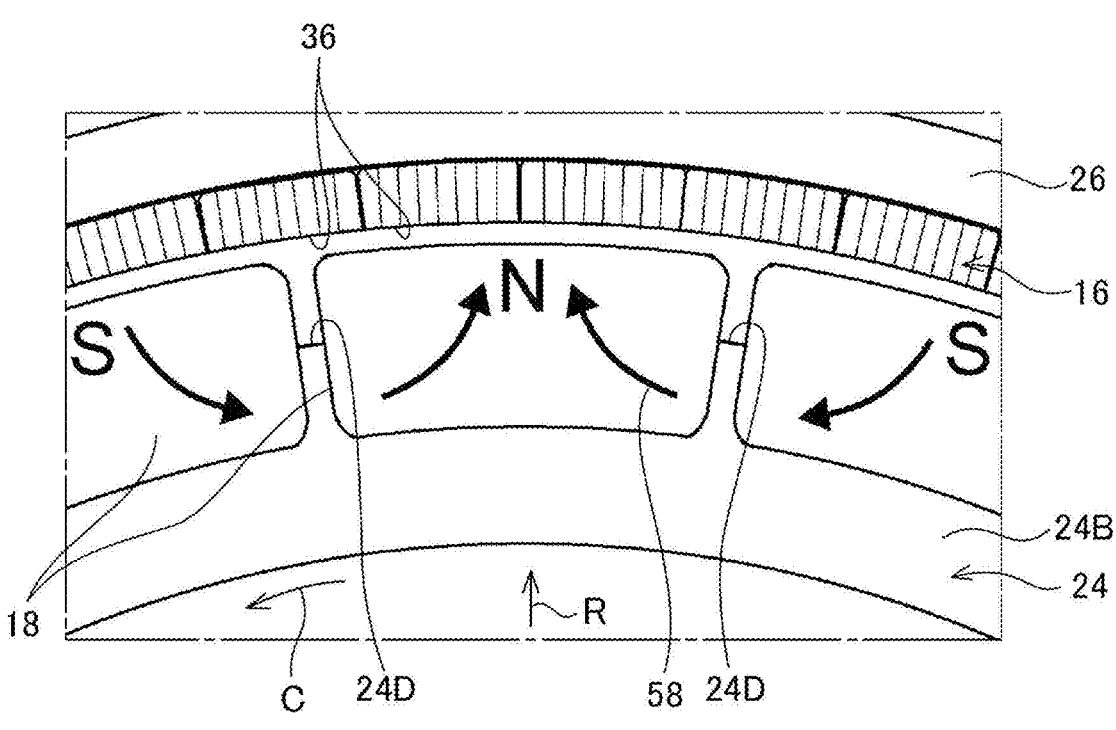

FIG. 34A is an enlarged plan view showing, through enlargement, part of a motor according to a twelfth embodiment.

Figure 34B:
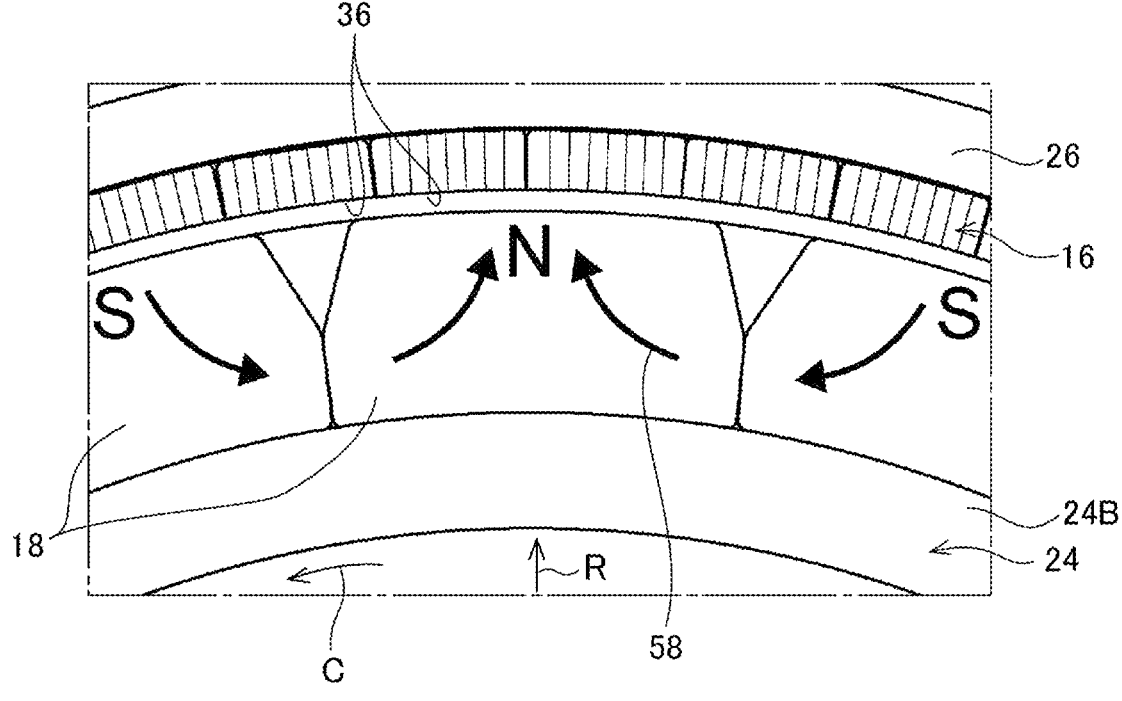

FIG. 34B is an enlarged plan view showing, through enlargement, part of a motor according to a thirteenth embodiment.

Figure 35:
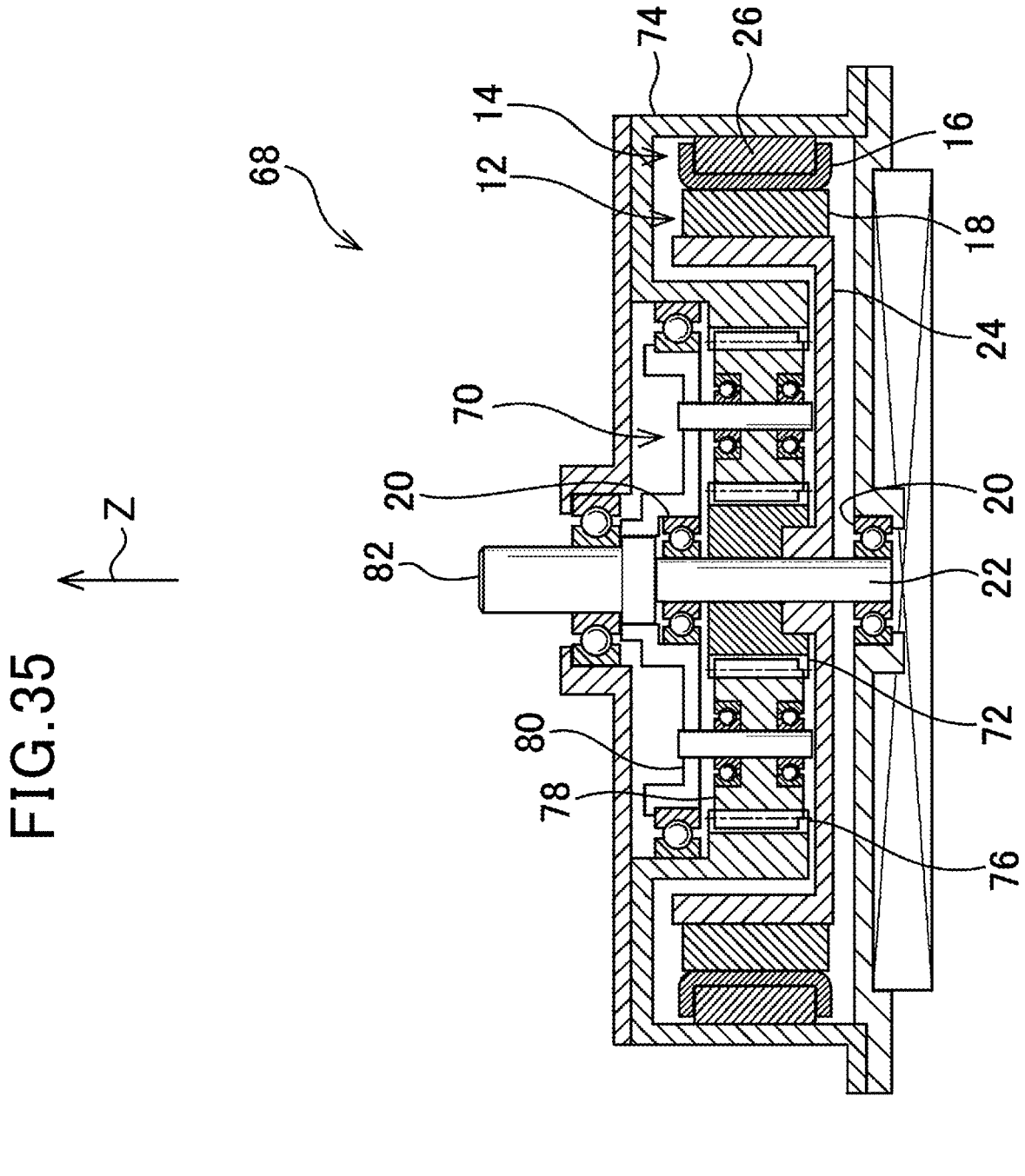

FIG. 35 is a side cross-sectional view of a motor according to a fourteenth embodiment.

Figure 36:
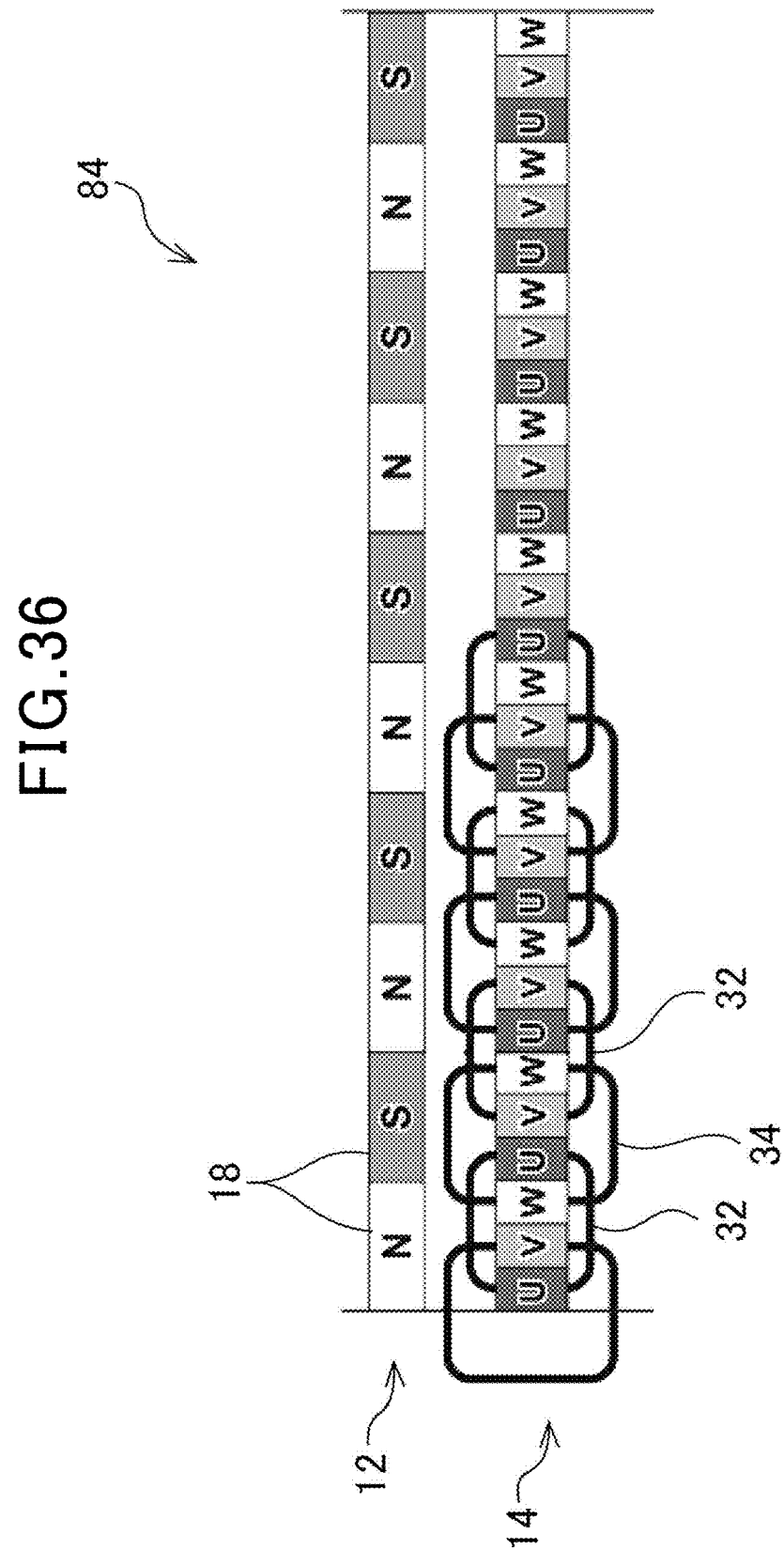

FIG. 36 is a schematic diagram showing both a rotor and a stator of a motor according to a fifteenth embodiment.

Figure 37:
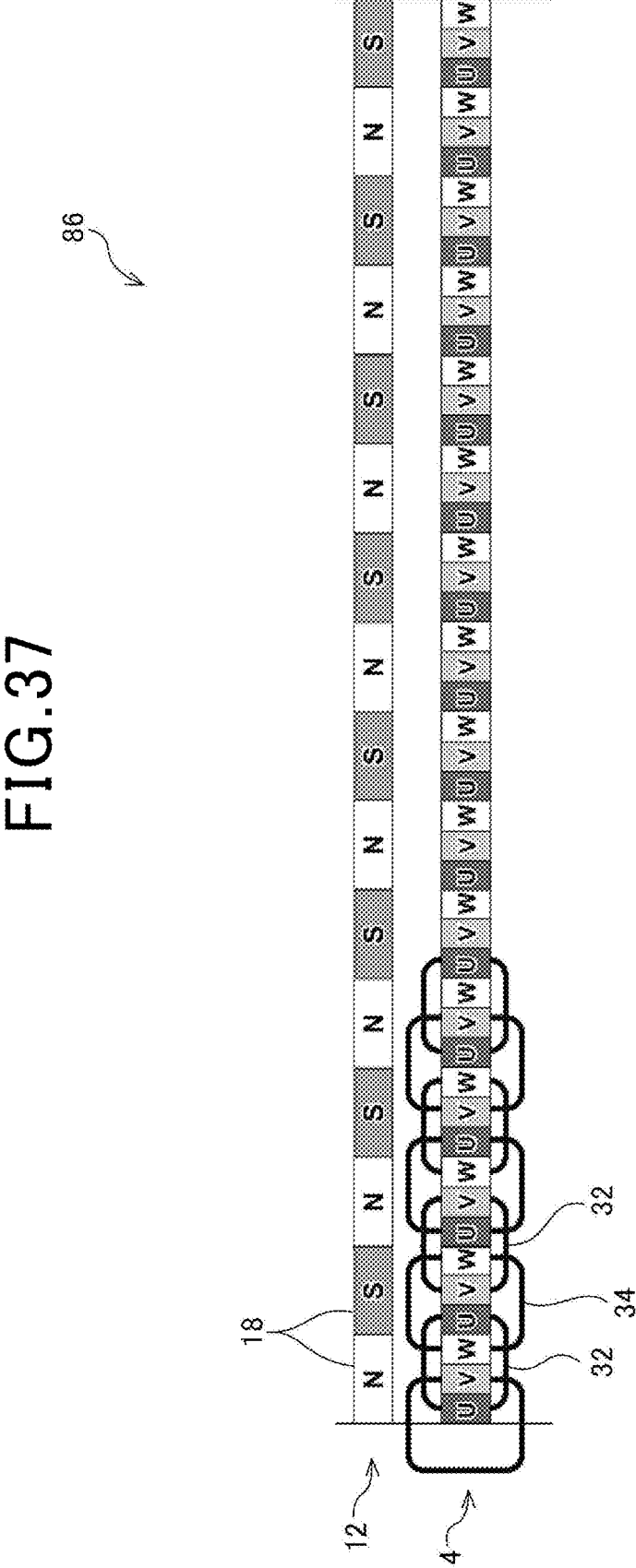

FIG. 37 is a schematic diagram showing both a rotor and a stator of a motor according to a sixteenth embodiment.

Figure 38:
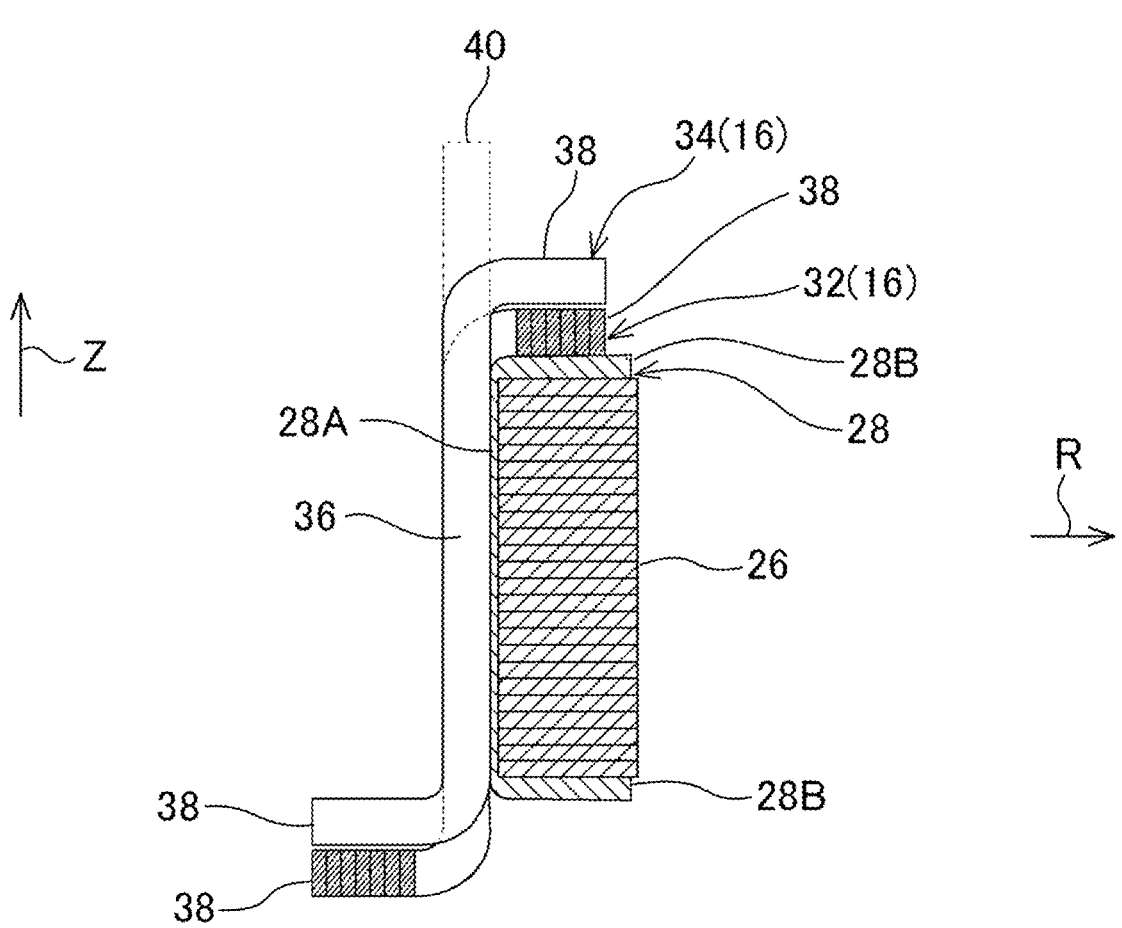

FIG. 38 is a side cross-sectional view for explaining a variation of the manner of bending coil end parts.

Figure 39:
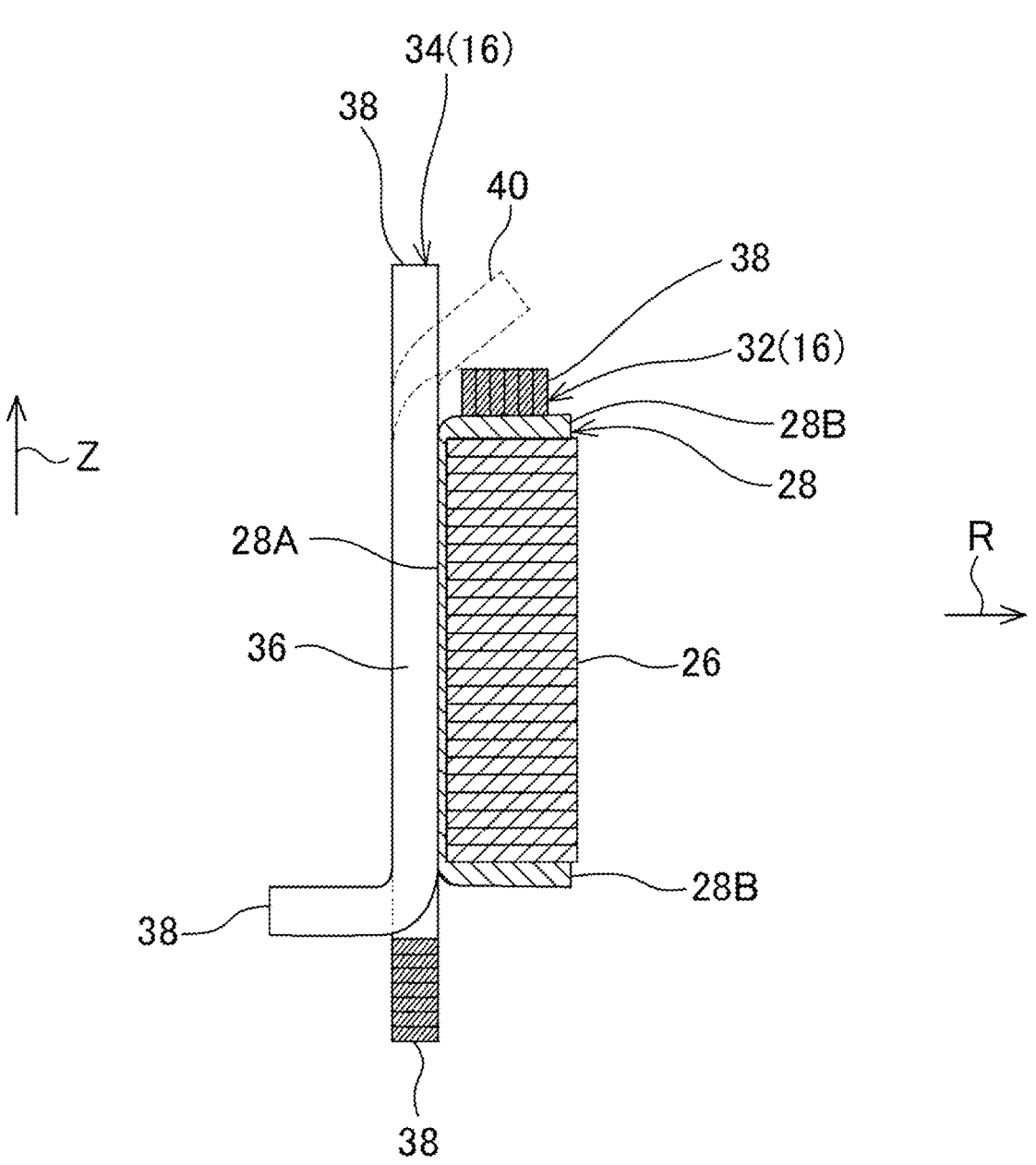

FIG. 39 is a side cross-sectional view for explaining another variation of the manner of bending coil end parts.

Figure 40:
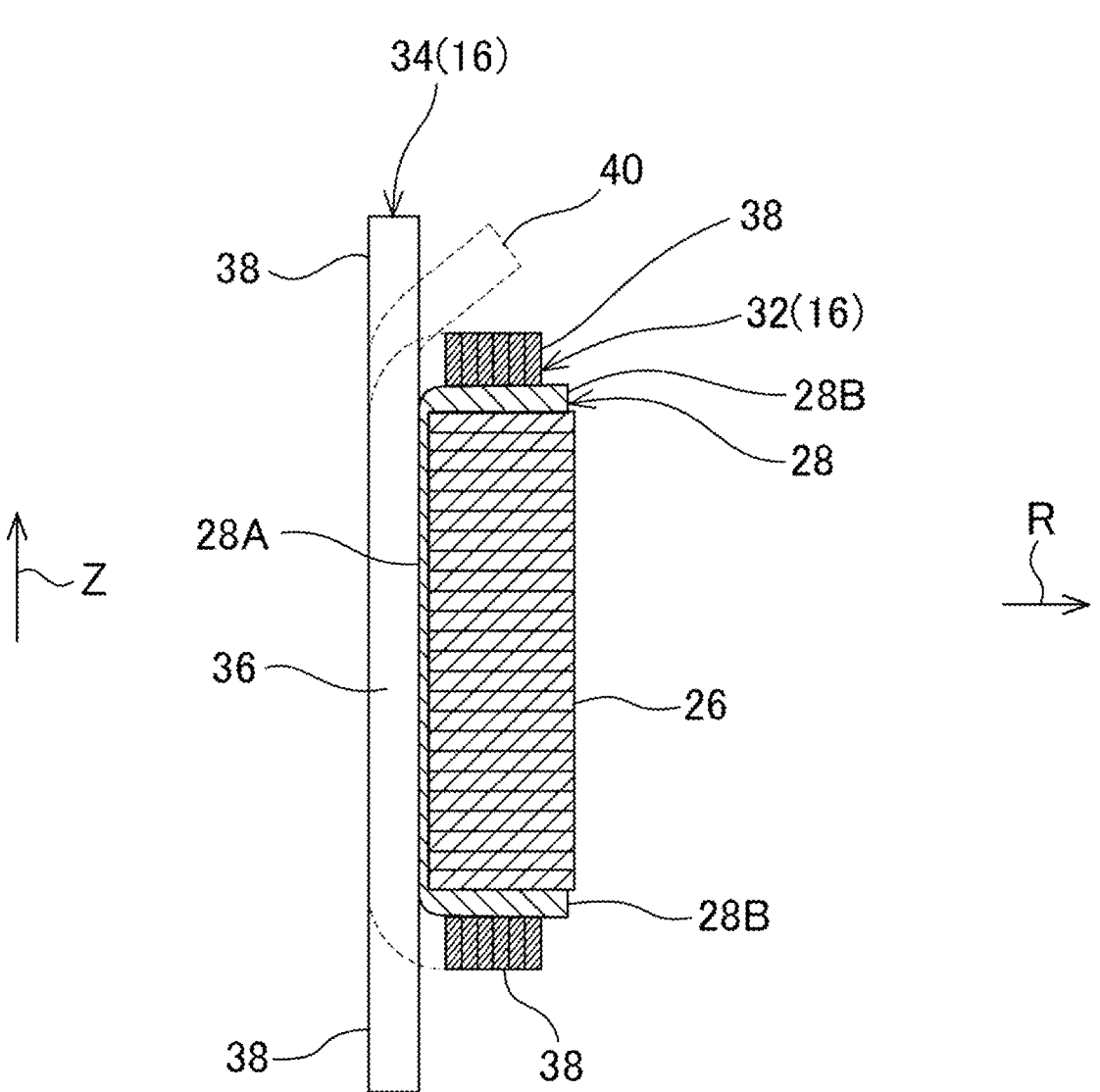

FIG. 40 is a side cross-sectional view for explaining another variation of the manner of bending coil end parts.

Figure 41:
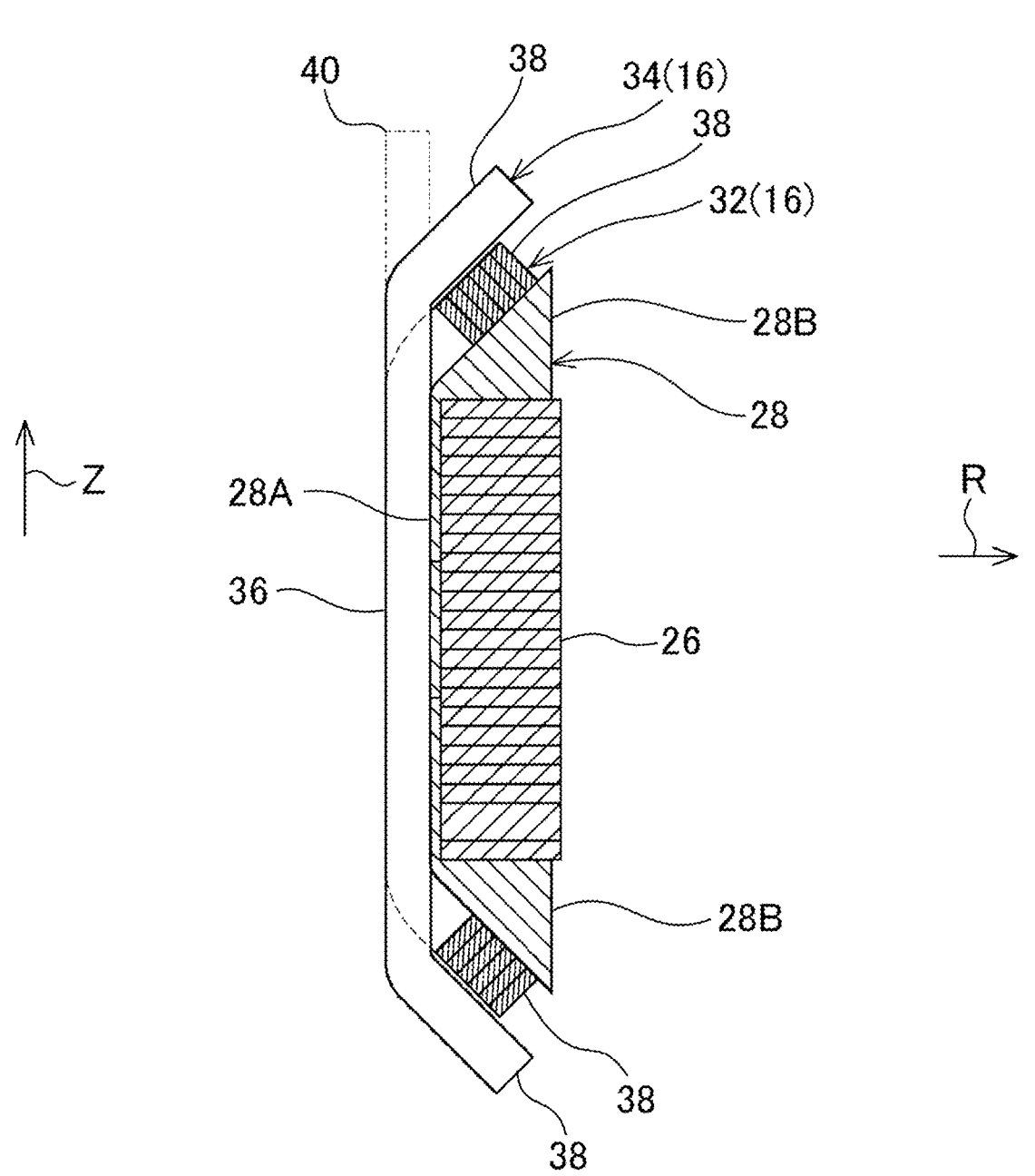

FIG. 41 is a side cross-sectional view for explaining another variation of the manner of bending coil end parts.

Figure 42:
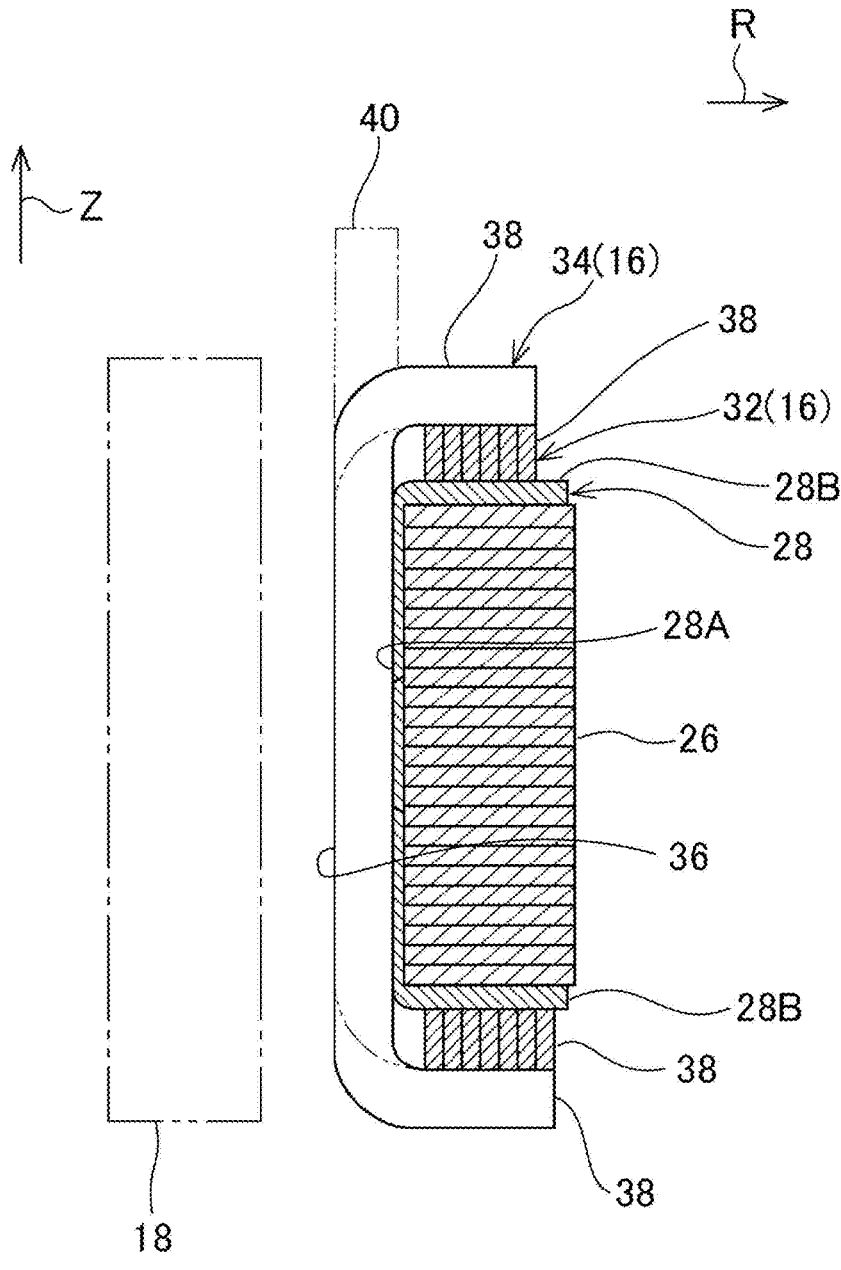

FIG. 42 is a diagram for explaining the positional relationship between coil end parts and magnets.

Figure 43:
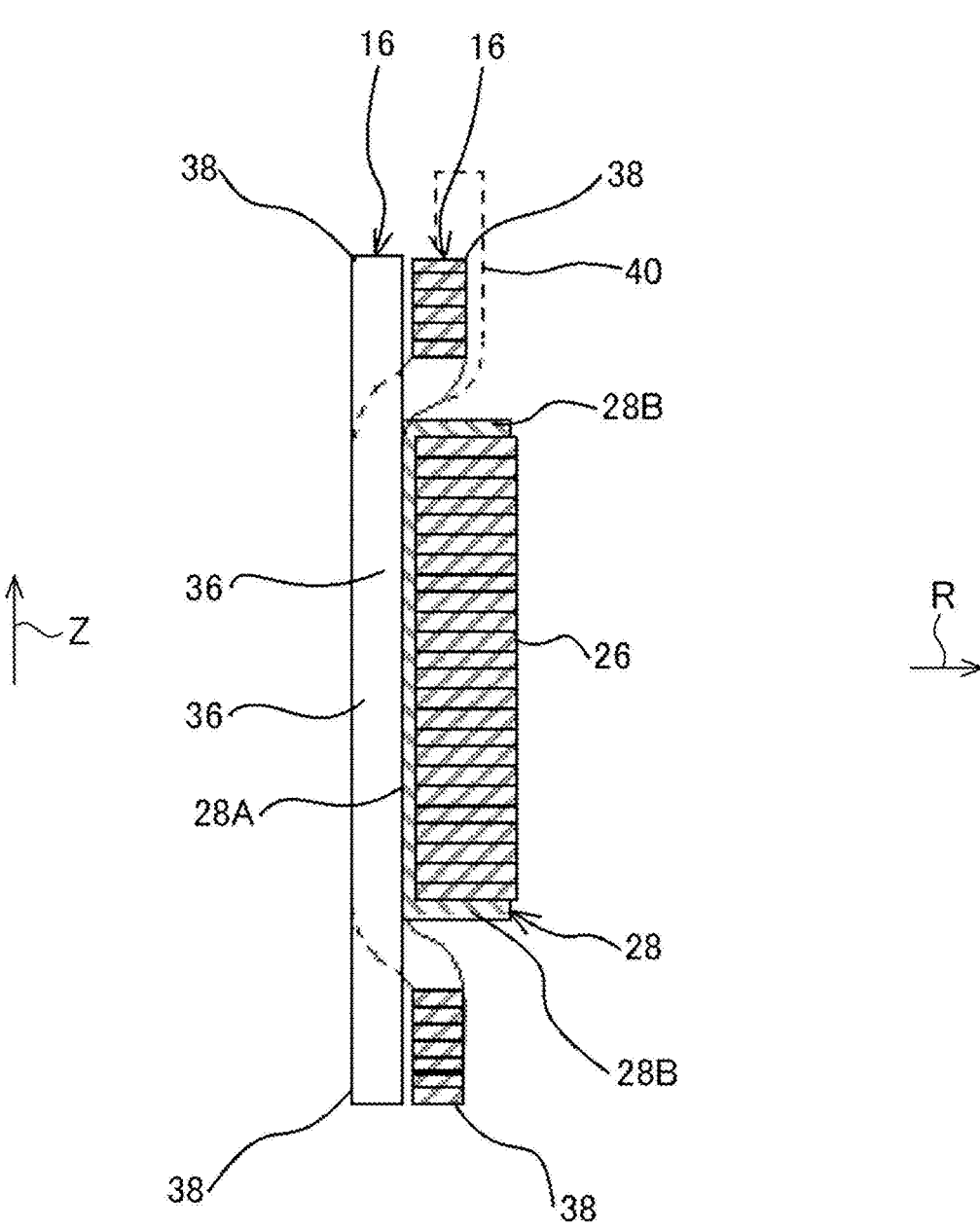

FIG. 43 is a side cross-sectional view for explaining another variation of the manner of bending coil end parts.

Figure 44:
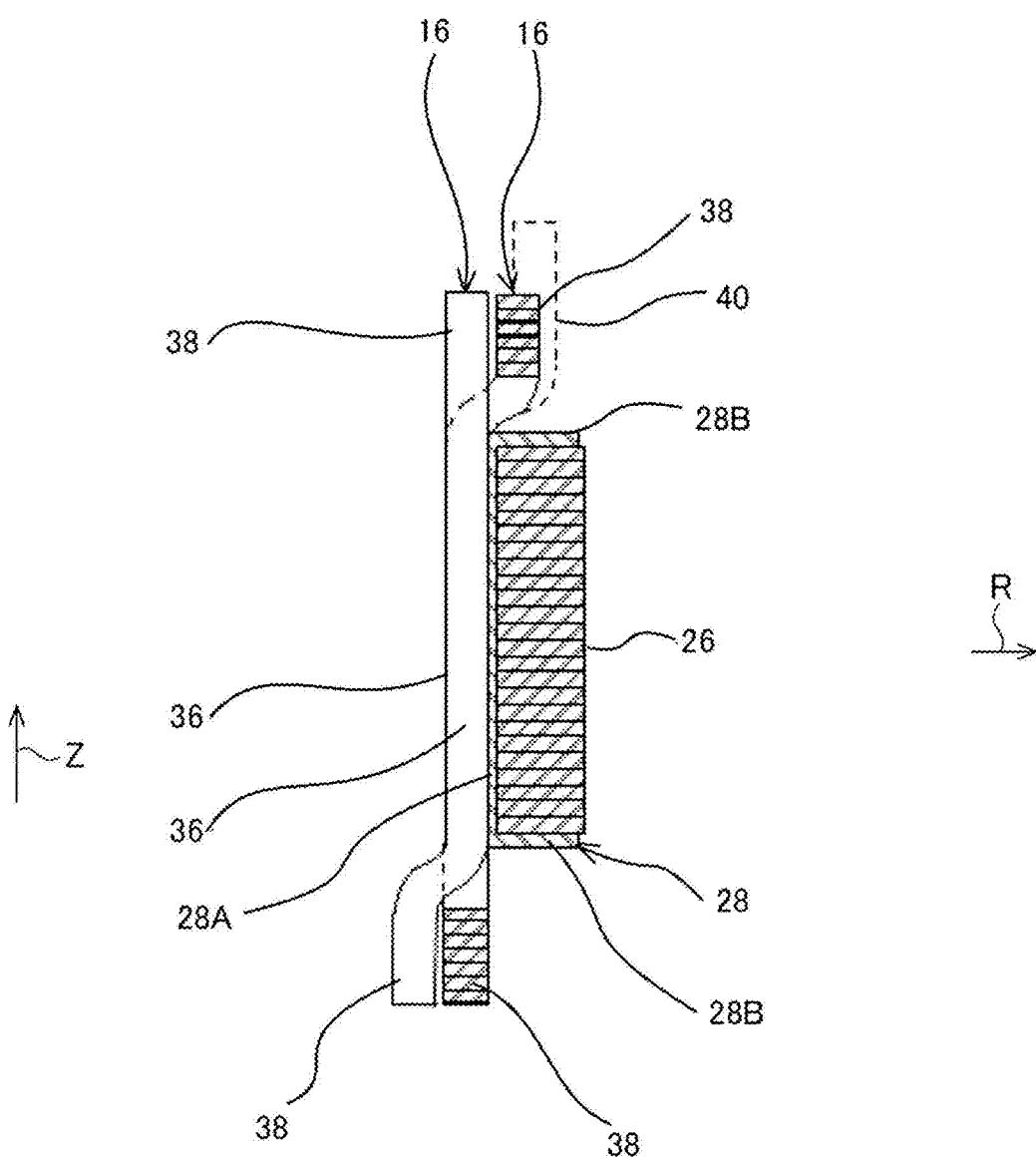

FIG. 44 is a side cross-sectional view for explaining another variation of the manner of bending coil end parts.

Figure 45:
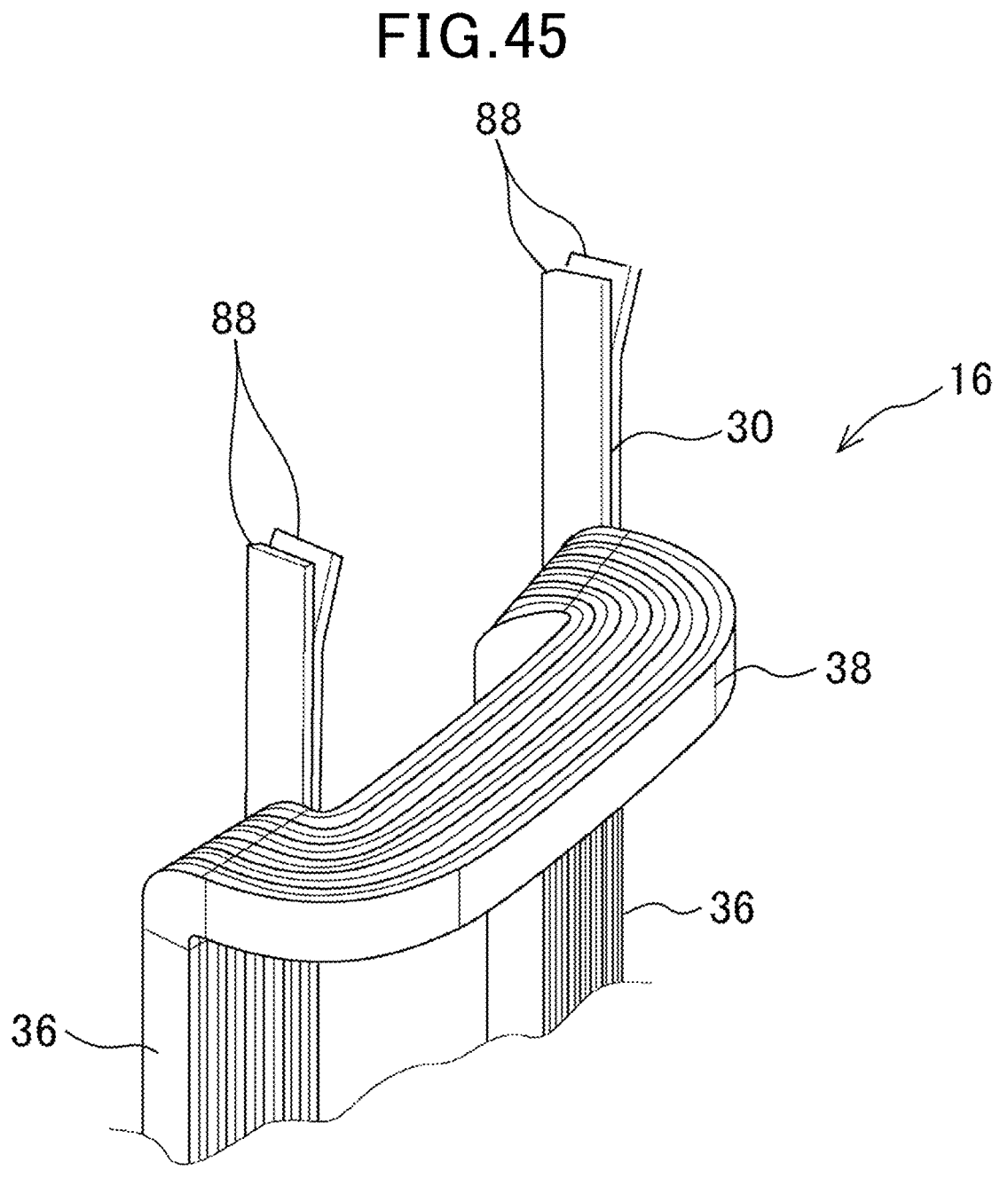

FIG. 45 is an enlarged perspective view for explaining a variation of terminal parts of a winding that forms a coil.

Figure 46:
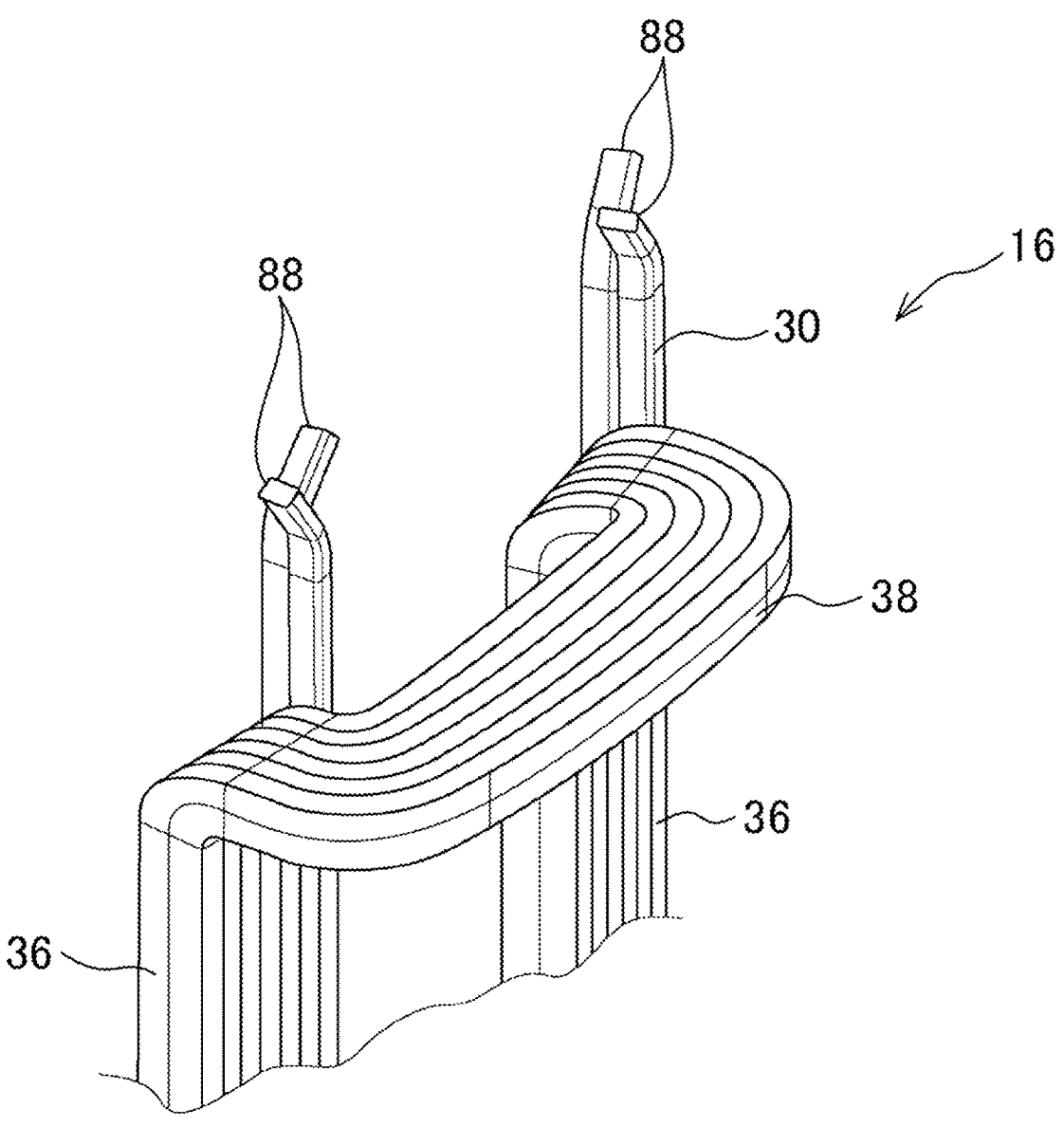

FIG. 46 is an enlarged perspective view for explaining another variation of terminal parts of a winding that forms a coil.

Figure 47:
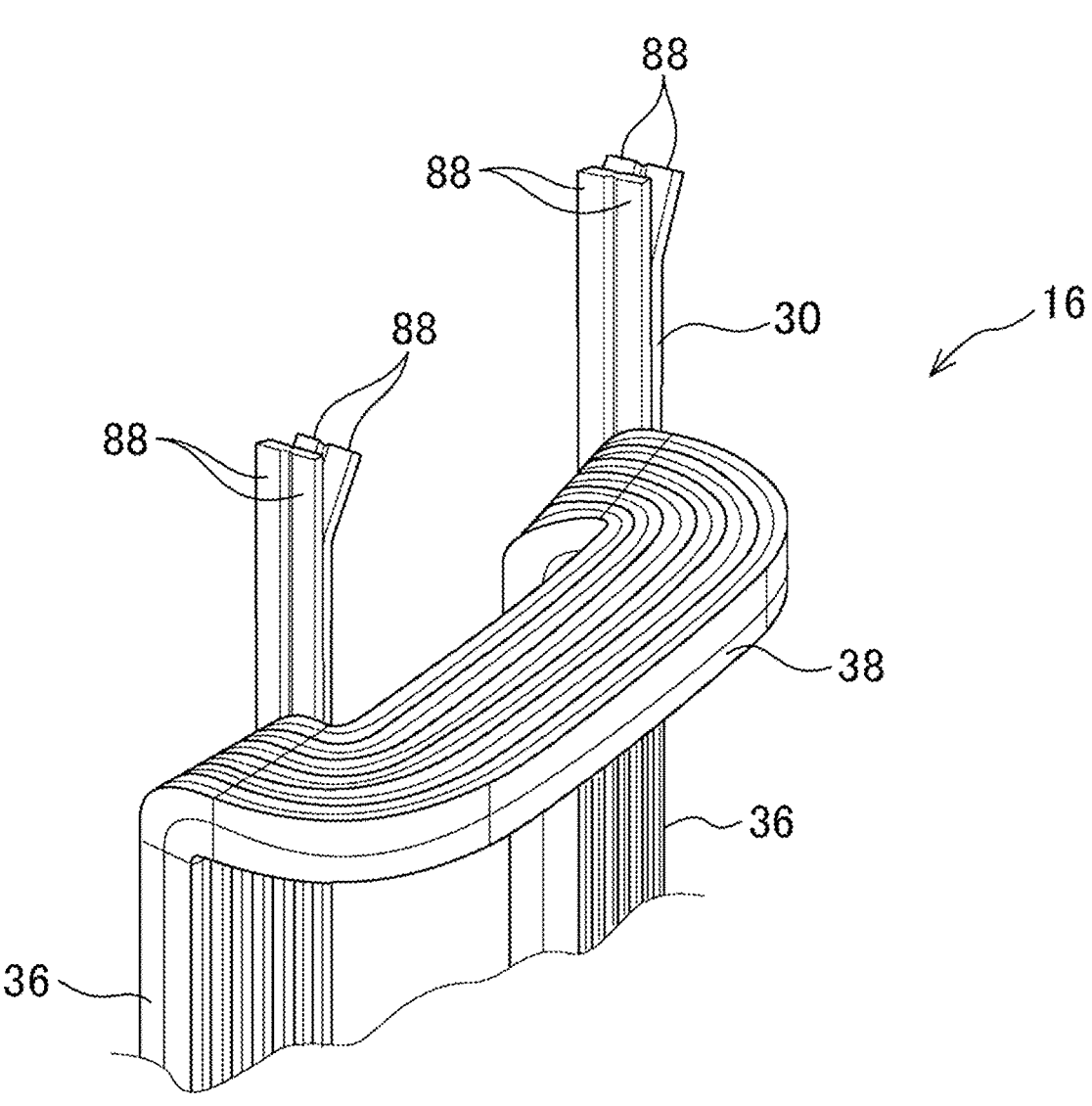

FIG. 47 is an enlarged perspective view for explaining another variation of terminal parts of a winding that forms a coil.

4

DESCRIPTION OF EMBODIMENTS

First Embodiment

A motor 10 according to the first embodiment of the present disclosure will be described with reference to FIGS. 1 to 15. In addition, the arrows Z, R and C suitably shown in the drawings respectively indicate one side in a rotation axial direction, the outer side in a rotation radial direction and one side in a rotation circumferential direction of a rotor 12 that will be described later. Moreover, in the case of merely indicating the axial direction, the radial direction and the circumferential direction, unless specified otherwise, the arrows Z, R and C respectively indicate the rotation axial direction, the rotation radial direction and the rotation circumferential direction of the rotor 12.

Figure 1:
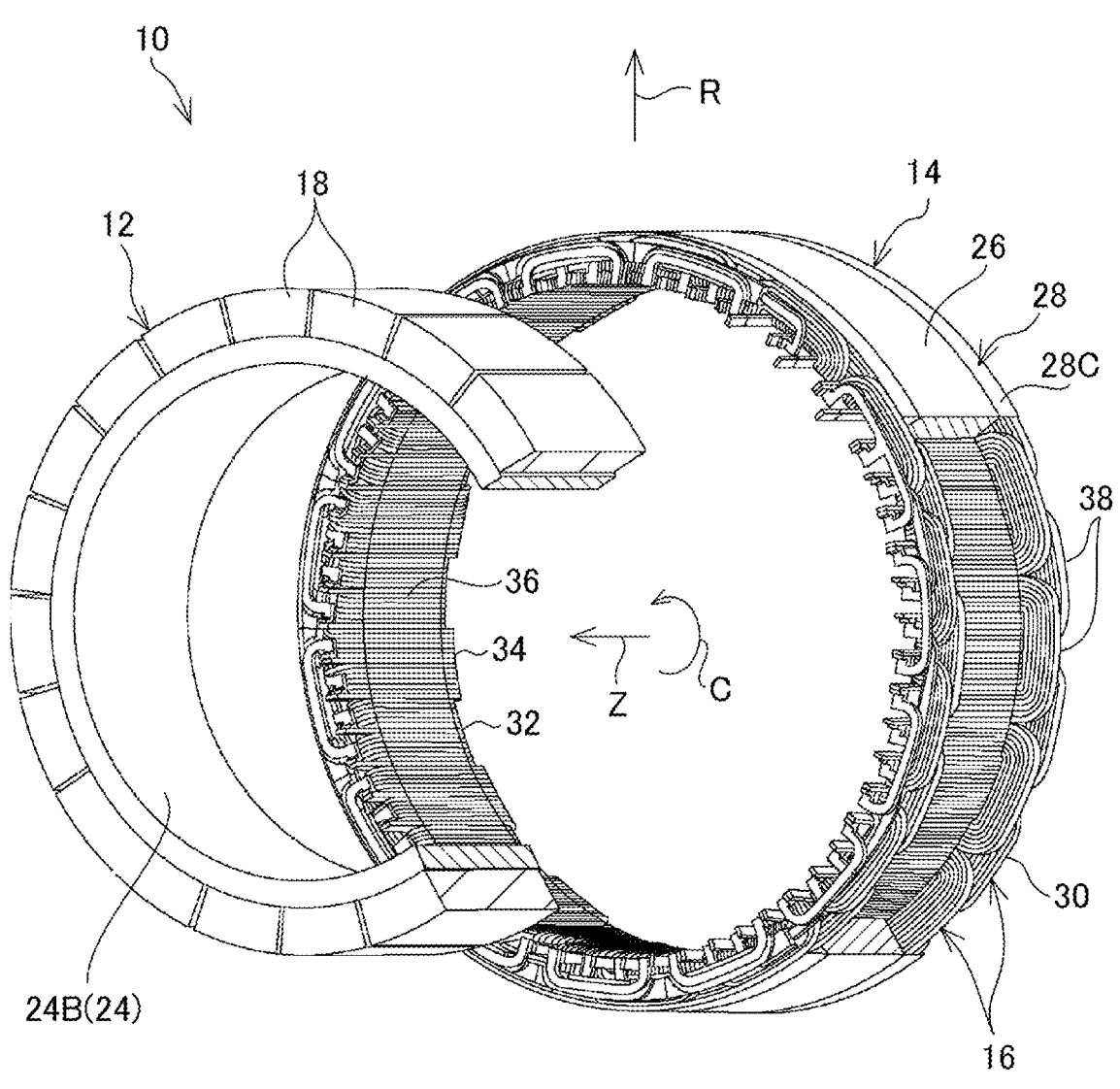
FIG. 1 is a partially cross-sectional perspective view showing both a rotor and a stator of a motor according to a first embodiment.
Figure 2:
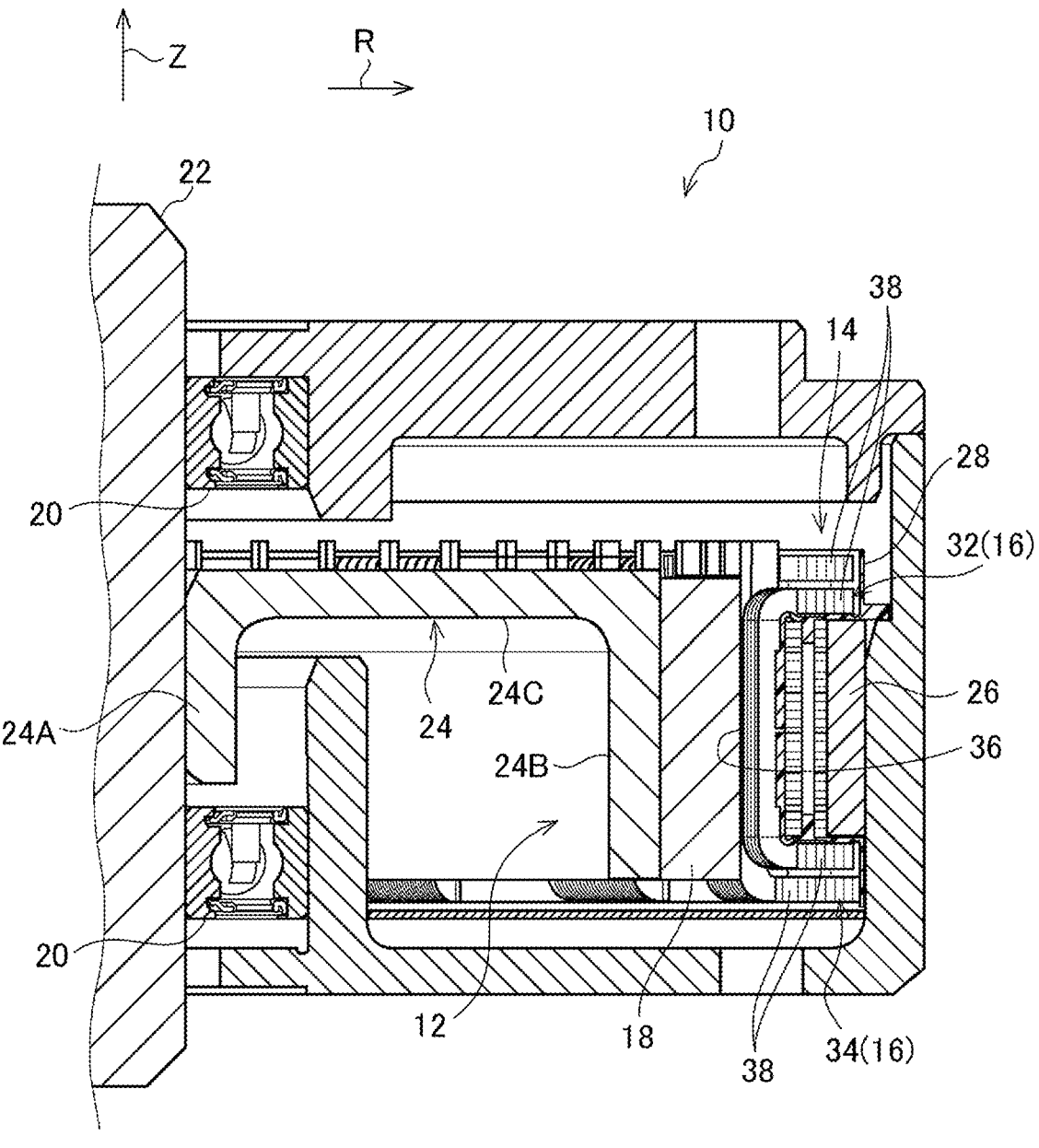
FIG. 2 is a side cross-sectional view showing a cross section of the motor taken along an axial direction.
Figure 3:
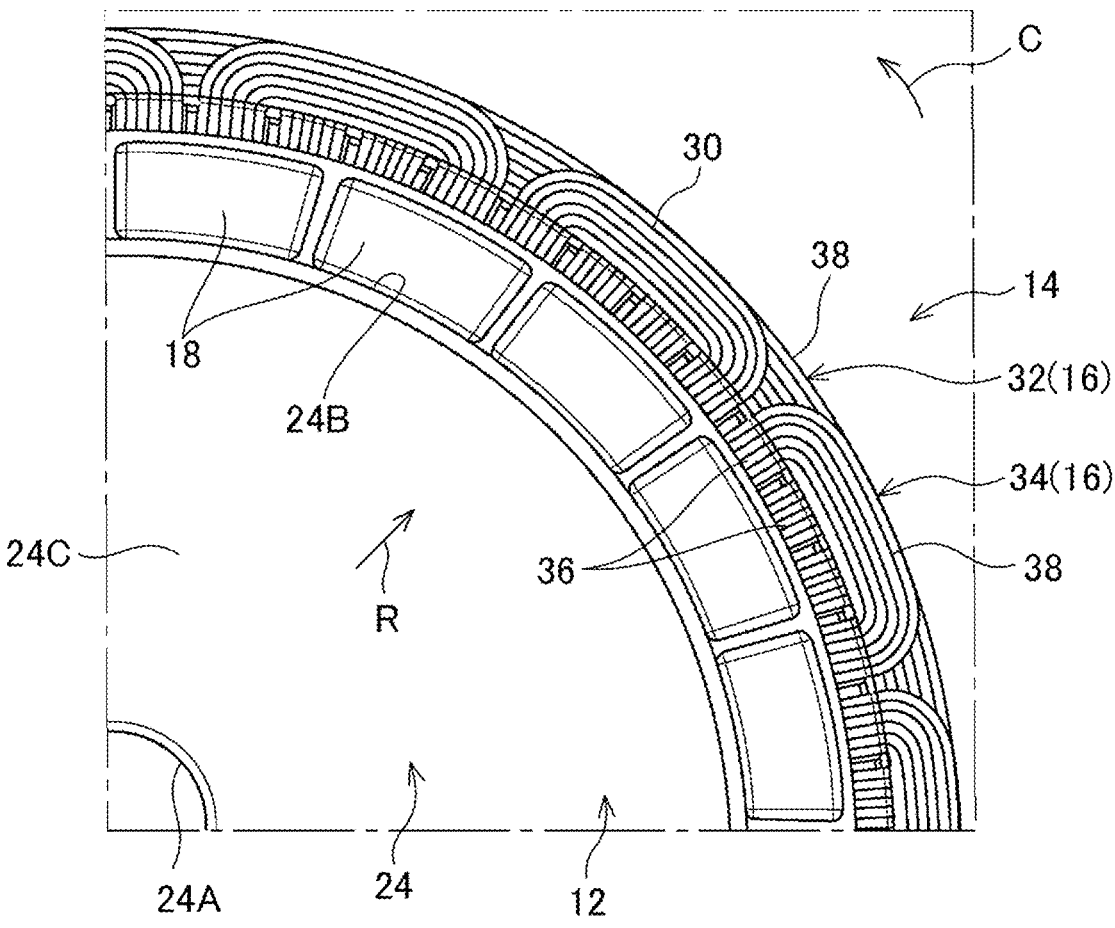
FIG. 3 is a plan view showing both the stator and the rotor.
Figure 4:
FIG. 4 is a cross-sectional view showing both the stator and the rotor.

As shown in FIGS. 1 to 3, in the present embodiment, the motor 10 is configured as an inner rotor type brushless motor in which the rotor 12 is arranged, as a rotating body, radially inside a stator 14. It should be noted that: FIGS. 1 to 5 merely illustrate an example of the motor 10; and there some inconsistencies in the number of coils 16 and the number of magnets 18 between these figures and the later explanation of the motor 10.

The rotor 12 includes a rotating shaft 22 that is rotatably supported by a pair of bearings 20, a rotor core 24 that is formed in a bottomed cylindrical shape and fixed to the rotating shaft 22, and a plurality of magnets 18 fixed to a radially outer surface of the rotor core 24.

The rotor core 24 has a first cylindrical part 24A fixed onto the rotating shaft 22 by press-fitting or the like, a second cylindrical part 24B located radially outside the first cylindrical part 24A, and a discoid connection plate part 24C that radially connects an end portion of the first cylindrical part 24A on the one side in the axial direction and an end portion of the second cylindrical part 24B on the one side in the axial direction. An outer circumferential surface (i.e., a radially outer surface) of the second cylindrical part 24B is formed as a cylindrical surface along the circumferential direction. To the outer circumferential surface of the second cylindrical part 24B, there are fixed the magnets 18 which will be described later.

The magnets 18 are formed of a magnetic compound whose intrinsic coercive force He is higher than or equal to 400 [kA/m] and residual flux density Br is higher than or equal to 1.0[T]. For example, the magnets 18 may be formed of a magnetic compound such as $NdFe_{11}TiN$, $Nd_2Fe_{14}B$, $Sm_2Fe_{17}N_3$ or FeNi. Moreover, as mentioned above, the magnets 18 are fixed to the outer circumferential surface of the second cylindrical part 24B of the rotor core 24. Furthermore, those magnets 18 each of which has a radially outer surface forming an N pole and those magnets 18 each of which has a radially outer surface forming an S pole are arranged alternately in the circumferential direction. In addition, the number of the magnets 18 may be suitably set in consideration of the output and the like required for the motor 10.

Figure 5:
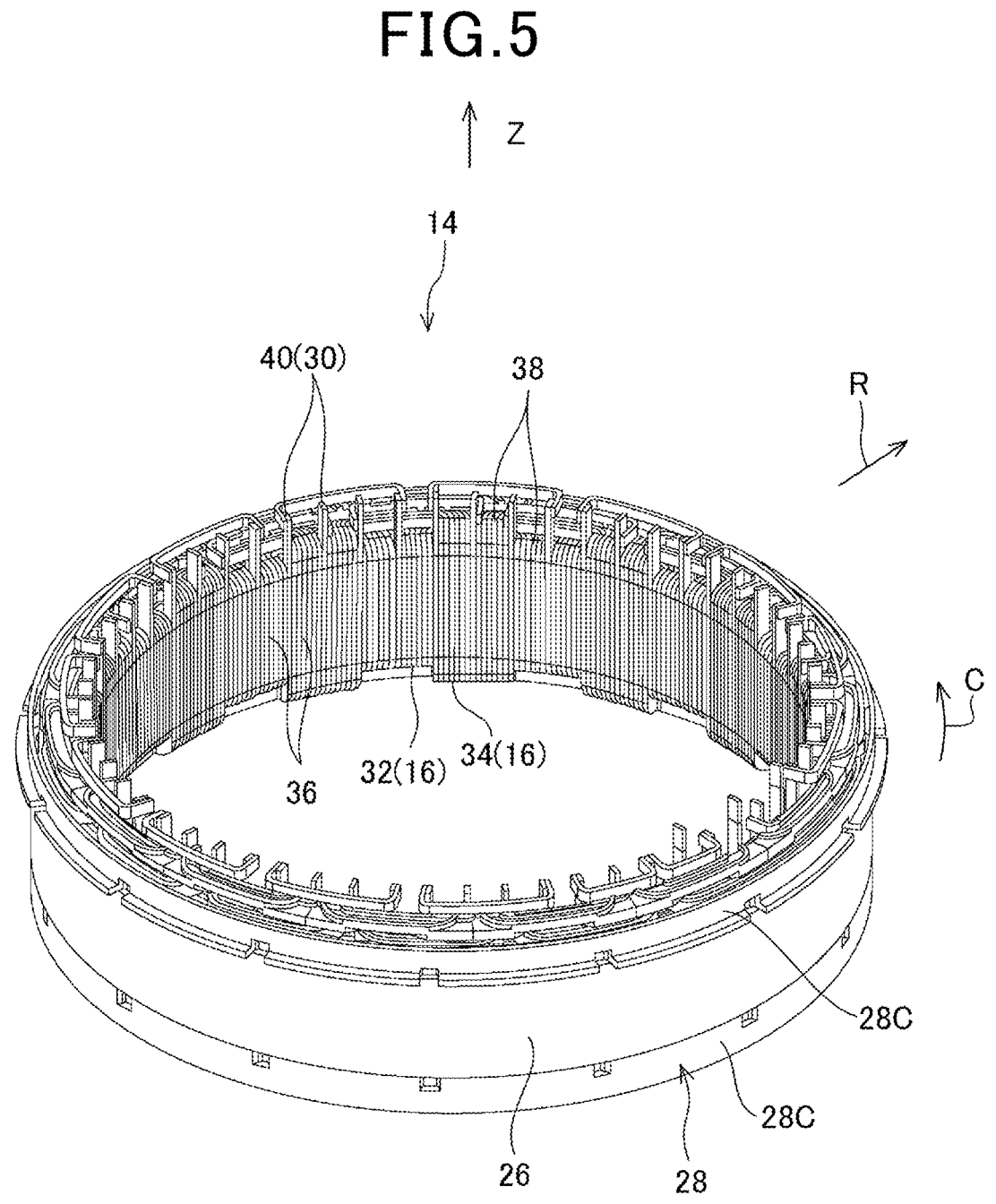

As shown in FIG. 5, the stator 14 includes an annular stator core 26, an insulator 28 mounted to the stator core 26 by bonding or fitting, and a plurality of coils 16 mounted to the stator core 26 via the insulator 28. In the present embodiment, the stator 14 has a toothless structure such that no part of the stator core 26 is arranged inside the coils 16.

As shown in FIGS. 1 and 5, the stator core 26 is formed into an annular shape using a magnetic material such as steel. Moreover, a cross section of the stator core 26 taken along both the axial direction and the radial direction is a rectangular cross section whose longitudinal direction coincides with the axial direction. Furthermore, the radial thickness of the stator core 26 is set to be greater than the radial dimension of coil end parts 38 of the coils 16 which will be described later. The stator core 26 is arranged coaxially with the rotor 12; and the axial center position of the stator core 26 coincides in the axial direction with the axial center positions of the magnets 18 fixed to the rotor core 24.

The insulator 28 is formed of a highly electrically-insulative material such as a resin material. In a state of having been mounted to the stator core 26, the insulator 28 covers a radially inner surface and a pair of axial end surfaces of the stator core 26. In addition, the specific configuration of the insulator 28 will be detailed later.

Figure 6:
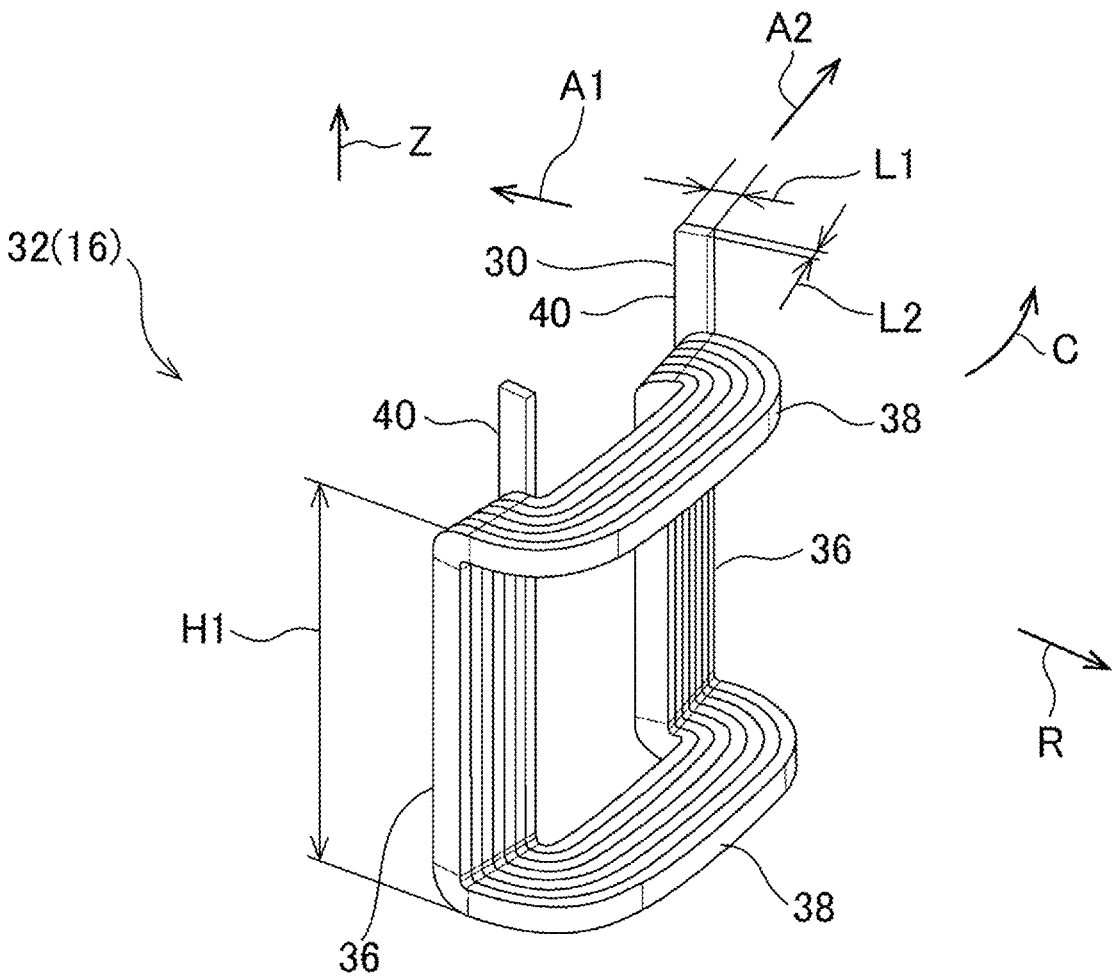
FIG. 6 is a perspective view showing a short coil.
Figure 7:
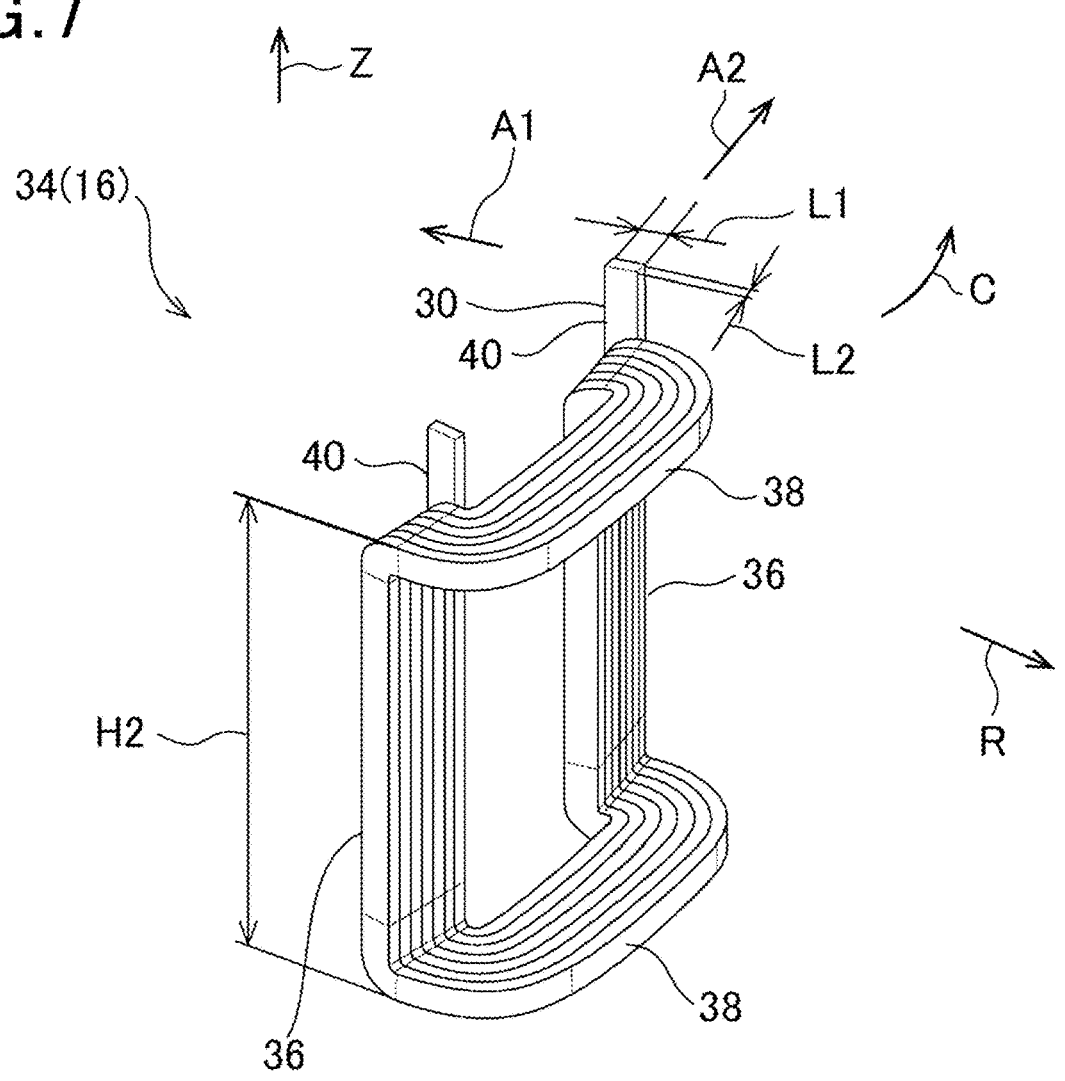
FIG. 7 is a perspective view showing a long coil.

As shown in FIGS. 5 to 7, each of the coils 16 is formed by winding an electrically conductive winding (or electrical conductor wire) 30 into a ring shape. In the present embodiment, as shown in FIGS. 6 and 7, each of the windings 30 forming the coils 16 has, in a cross-sectional view taken along its longitudinal direction, a rectangular cross section where a dimension L1 of the winding 30 in a first direction (i.e., the direction of an arrow A1) is set to be greater than a dimension L2 of the winding 30 in a second direction (i.e., the direction of an arrow A2) perpendicular to the first direction. Moreover, each of the windings 30 may be constituted of an element-wire bundle formed by bundling a plurality of electrically conductive element wires together. In this case, the electrical resistances between the bundled element wires are higher than the electrical resistance of each of the element wires. In addition, each of the windings 30 may alternatively have an oval or elliptical cross-sectional shape. In general, enameled wires are suitably used for the windings 30; and the enameled wires include an electrical conductor such as copper, aluminum or the like.

As shown in FIGS. 5 to 7, in the present embodiment, the stator 14 includes two types of coils 16 having different axial dimensions. The first-type coils 16 are as shown in FIG. 6, which will be referred to as short coils 32 hereinafter. In contrast, the second-type coils 16 are as shown in FIG. 7, which will be referred to as long coils 34 hereinafter. In addition, the number of the coils 16 may be suitably set in consideration of the output and the like required for the motor 10.

As shown in FIG. 6, each of the short coils 32 is formed by: winding the winding 30 into a rectangular shape so that layers of the winding 30 are stacked in the second direction (i.e., the direction of the arrow A2); and then bending both axial end parts of the winding 30 radially outward. Consequently, each of the short coils 32 has: a pair of opposing parts 36 in each of which layers of the winding 30 are arranged side by side in the circumferential direction and which are spaced apart from each other in the circumferential direction; one coil end part 38 that circumferentially connects end portions of the pair of opposing parts 36 on the one side in the axial direction; and the other coil end part 38 that circumferentially connects end portions of the pair of opposing parts 36 on the other side in the axial direction. Moreover, each of the short coils 32 also has: a terminal part 40 that is located at one end of the winding 30 forming the short coil 32 and extending, on the one circumferential side of the opposing part 36 located on the one circumferential side, to the one side in the axial direction; and a terminal part 40 that is located at the other end of the winding 30 forming the short coil 32 and extending, on the one circumferential side of the opposing part 36 located on the other circumferential side, to the one side in the axial direction. With such an arrangement of the terminal parts 40, in each of the short coils 32, the number of stacked layers of the winding 30 at the coil end part 38 on the one side in the axial direction becomes less than the number of stacked layers of the winding 30 at the coil end part 38 on the other side in the axial direction. Specifically, the number of stacked layers of the winding 30 at the coil end part 38 on the one side in the axial direction is six, whereas the number of stacked layers of the winding 30 at the coil end part 38 on the other side in the axial direction is seven. In addition, the number of stacked layers of the winding 30 at the pair of opposing parts 36 is seven.

Figure 8:
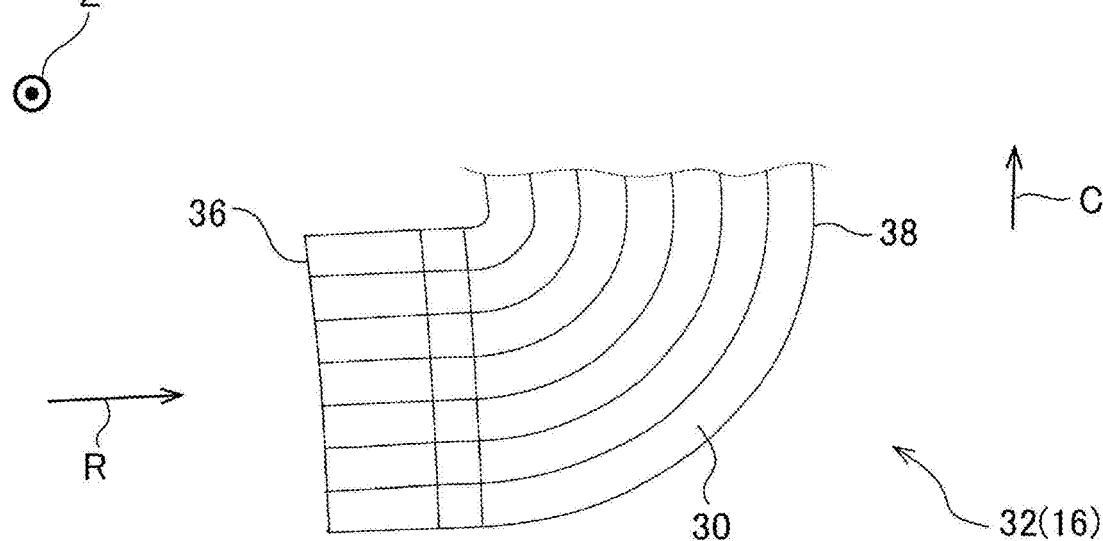
FIG. 8 is an enlarged plan view showing, through enlargement, a boundary portion between an opposing part and a coil end part.
Figure 9:
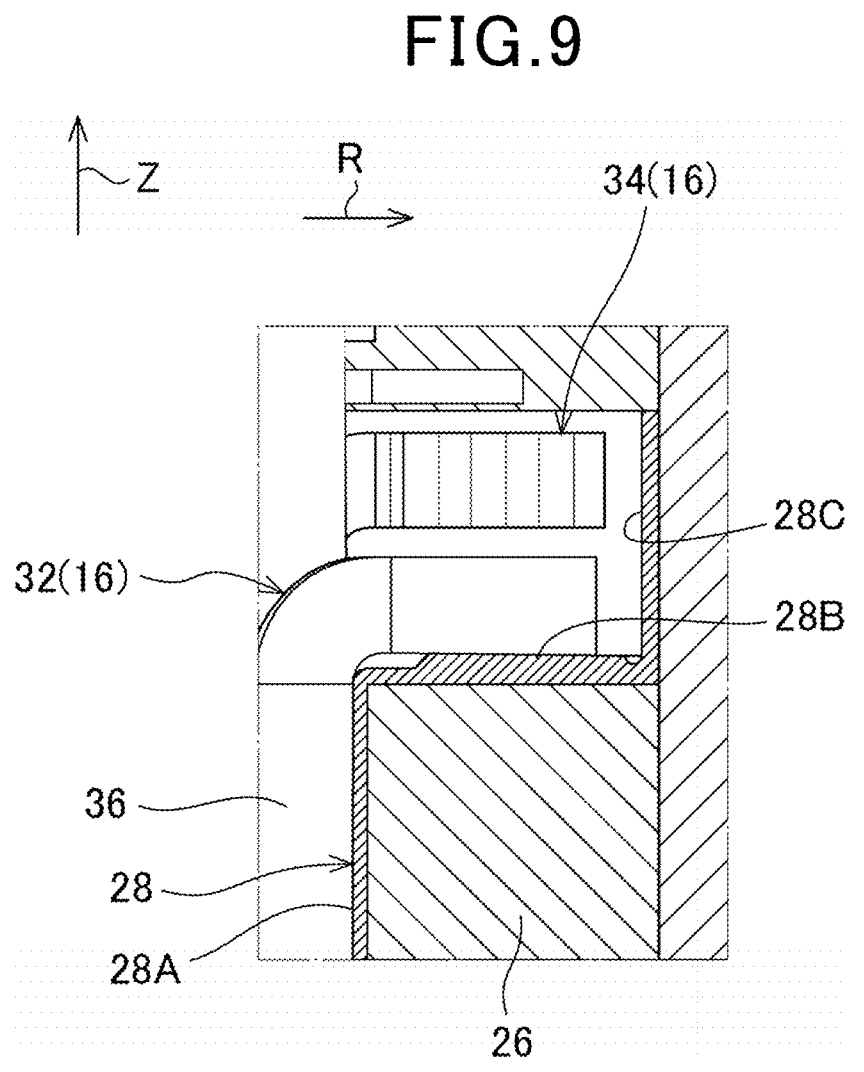

Here, the manufacturing process of the short coils 32 will be briefly described. In the manufacturing process of the short coils 32, first, for each of the short coils 32, the winding 30 for forming the short coil 32 is wound into a rectangular shape so that layers of the winding 30 are stacked in the second direction (i.e., the direction of the arrow A2). Then, the rectangularly-wound portions of the short coil 32 excluding the pair of terminal parts 40 are bound together by a binding member (not shown). Consequently, those portions of the short coil 32 (i.e., the stacked layers of the winding 30) which form the pair of opposing parts 36, the coil end part 38 on the one side in the axial direction and the coil end part 38 on the other side in the axial direction are inseparably bound in the second direction. Next, as shown in FIGS. 8 and 9, the portions of the short coil 32 forming the coil end part 38 on the one side in the axial direction and the coil end part 38 on the other side in the axial direction are bent radially outward at substantially right angles. That is, boundary portions between the pair of coil end parts 38 and the pair of opposing parts 36 are bent in the first direction at substantially right angles. Consequently, the short coil 32 is obtained which has the pair of opposing parts 36 to be arranged along the radially inner surface of the stator core 26 and the pair of coil end parts 38 to be arranged respectively along the pair of axial end surfaces of the stator core 26. Through the above process, all the short coils 32 are manufactured.

As shown in FIGS. 6 and 7, the long coils 34 have the same configuration as the short coils 32 except that the axial dimension H2 of the long coils 34 is greater than the axial dimension H1 of the short coils 32. It should be noted that: parts of the long coils 34 corresponding to those of the short coils 32 are designated by the same reference numerals as the corresponding parts of the short coils 32; and description of these parts will be omitted hereinafter. The long coils 34 are manufactured through the same process as the short coils 32. However, the length of each of the windings 30 forming the long coils 34 is greater than the length of each of the windings 30 forming the short coils 32. Consequently, the electrical resistance of each of the long coils 34 becomes higher than the electrical resistance of each of the short coils 32.

Figure 10:
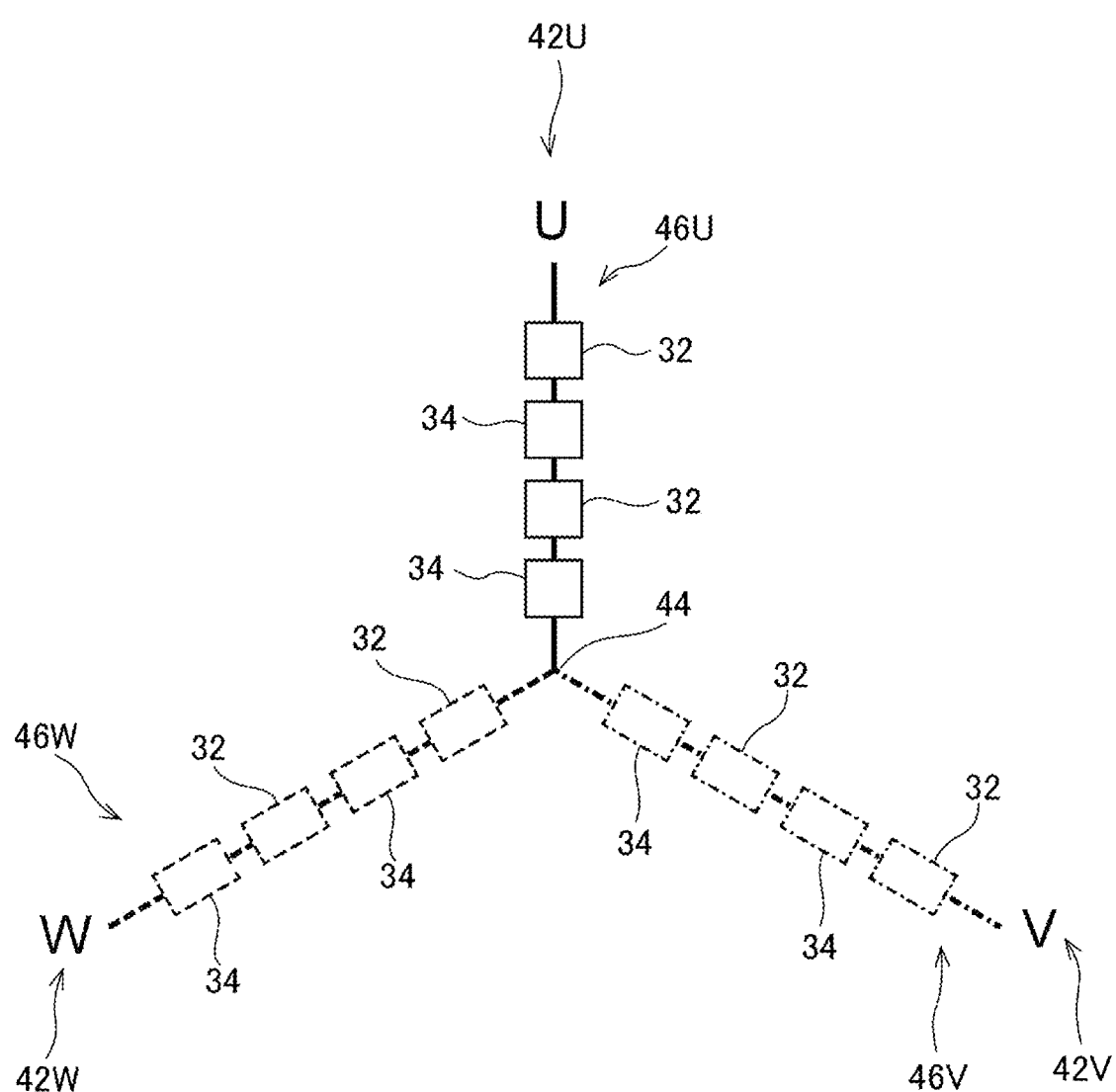
FIG. 10 is a schematic diagram for explaining the connection between U-phase, V-phase and W-phase coils.

As shown in FIG. 10, the coils 16 of the stator 14 are connected in, for example, a star connection. In this example, each of a U phase 42U, a V phase 42V and a W phase 42W is constituted of two short coils 32 and two long coils 34. Specifically, in the U phase 42U, the four coils 16 are serially connected in the order of one long coil 34, one short coil 32, the other long coil 34 and the other short coil 32 from a neutral point 44 side. Similarly, in the V phase 42V, the four coils 16 are serially connected in the order of one long coil 34, one short coil 32, the other long coil 34 and the other short coil 32 from the neutral point 44 side. On the other hand, in the W phase 42W, the four coils 16 are serially connected in the order of one short coil 32, one long coil 34, the other short coil 32 and the other long coil 34 from the neutral point 44 side. It should be noted that the coils 16 of the stator 14 may be connected to one another using connection members such as busbars, or may be continuously wound with the same winding 30 without being separated from each other.

Hereinafter, in the U phase 42U, the range from the short coil 32 located farthest from the neutral point 44 to the neutral point 44 will be referred to as a U-phase coil connection body 46U. Similarly, in the V phase 42V, the range from the short coil 32 located farthest from the neutral point 44 to the neutral point 44 will be referred to as a V-phase coil connection body 46V. Moreover, in the W phase 42W, the range from the long coil 34 located farthest from the neutral point 44 to the neutral point 44 will be referred to as a W-phase coil connection body 46W. In present embodiment, the numbers of long coils 34 of the U-phase, V-phase and W-phase coil connection bodies 46U, 46V and 46W are set to be equal to each other; and the numbers of short coils 32 of the U-phase, V-phase and W-phase coil connection bodies 46U, 46V and 46W are also set to be equal to each other. Therefore, the combined resistances of the U-phase, V-phase and W-phase coil connection bodies 46U, 46V and 46W are equal to each other. It should be noted that the expression "the combined resistances of the U-phase, V-phase and W-phase coil connection bodies 46U, 46V and 46W are equal to each other" used hereinafter means that the differences between the combined resistances of the U-phase, V-phase and W-phase coil connection bodies 46U, 46V and 46W are within 5%.

Figure 11:
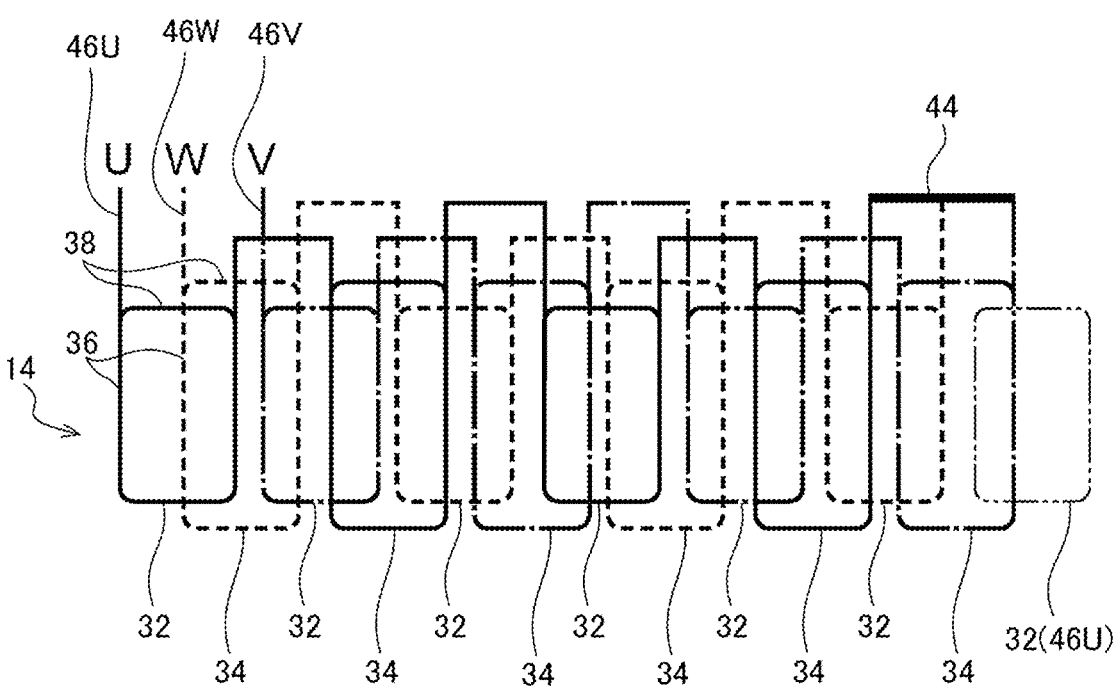
FIG. 11 is a schematic diagram for explaining the connection and arrangement of the U-phase, V-phase and W-phase coils.
Figure 12:
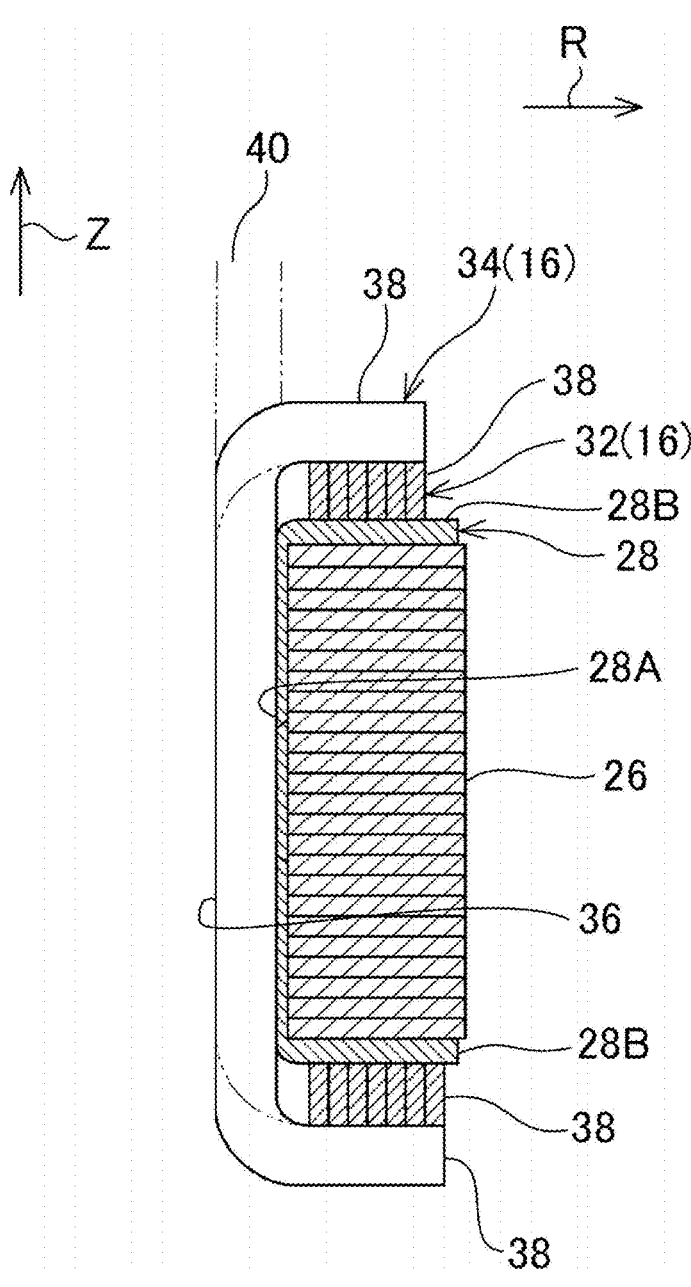
FIG. 12 is a side cross-sectional view showing a cross section of part of the stator taken along the axial direction.

FIG. 11 illustrates the arrangement relationship between the coils 16 of the U phase 42U, the coils 16 of the V phase 42V and the coils 16 of the W phase 42W. As shown in FIGS. 11 and 12, the short coil 32 located farthest from the neutral point 44 in the U phase 42U and the short coil 32 located farthest from the neutral point 44 in the V phase 42V are arranged adjacent to each other in the circumferential direction along the stator core 26. Moreover, the long coil 34 located farthest from the neutral point 44 in the W phase 42W is arranged so as to straddle the short coil 32 located farthest from the neutral point 44 in the U phase 42U and the short coil 32 located farthest from the neutral point 44 in the V phase 42V.

The short coil 32 located farthest from the neutral point 44 in the V phase 42V and the short coil 32 located on the opposite side to the neutral point 44 in the W phase 42W are arranged adjacent to each other in the circumferential direction along the stator core 26. Moreover, the long coil 34 located on the opposite side to the neutral point 44 in the U phase 42U is arranged so as to straddle the short coil 32 located farthest from the neutral point 44 in the V phase 42V and the short coil 32 located on the opposite side to the neutral point 44 in the W phase 42W.

The short coil 32 located on the opposite side to the neutral point 44 in the W phase 42W and the short coil 32 located on the neutral point 44 side in the U phase 42U are arranged adjacent to each other in the circumferential direction along the stator core 26. Moreover, the long coil 34 located on the opposite side to the neutral point 44 in the V phase 42V is arranged so as to straddle the short coil 32 located on the opposite side to the neutral point 44 in the W phase 42W and the short coil 32 located on the neutral point 44 side in the U phase 42U.

The short coil 32 located on the neutral point 44 side in the U phase 42U and the short coil 32 located on the neutral point 44 side in the V phase 42V are arranged adjacent to each other in the circumferential direction along the stator core 26. Moreover, the long coil 34 located on the neutral point 44 side in the W phase 42W is arranged so as to straddle the short coil 32 located on the neutral point 44 side in the U phase 42U and the short coil 32 located on the neutral point 44 side in the V phase 42V.

The short coil 32 located on the neutral point 44 side in the V phase 42V and the short coil 32 located on the neutral point 44 side in the W phase 42W are arranged adjacent to each other in the circumferential direction along the stator core 26. Moreover, the long coil 34 located on the neutral point 44 side in the U phase 42U is arranged so as to straddle the short coil 32 located on the neutral point 44 side in the V phase 42V and the short coil 32 located on the neutral point 44 side in the W phase 42W.

The short coil 32 located on the neutral point 44 side in the W phase 42W and the short coil 32 located farthest from the neutral point 44 in the U phase 42U are arranged adjacent to each other in the circumferential direction along the stator core 26. Moreover, the long coil 34 located on the neutral point 44 side in the V phase 42V is arranged so as to straddle the short coil 32 located on the neutral point 44 side in the W phase 42W and the short coil 32 located farthest from the neutral point 44 in the U phase 42U.

Figure 13:
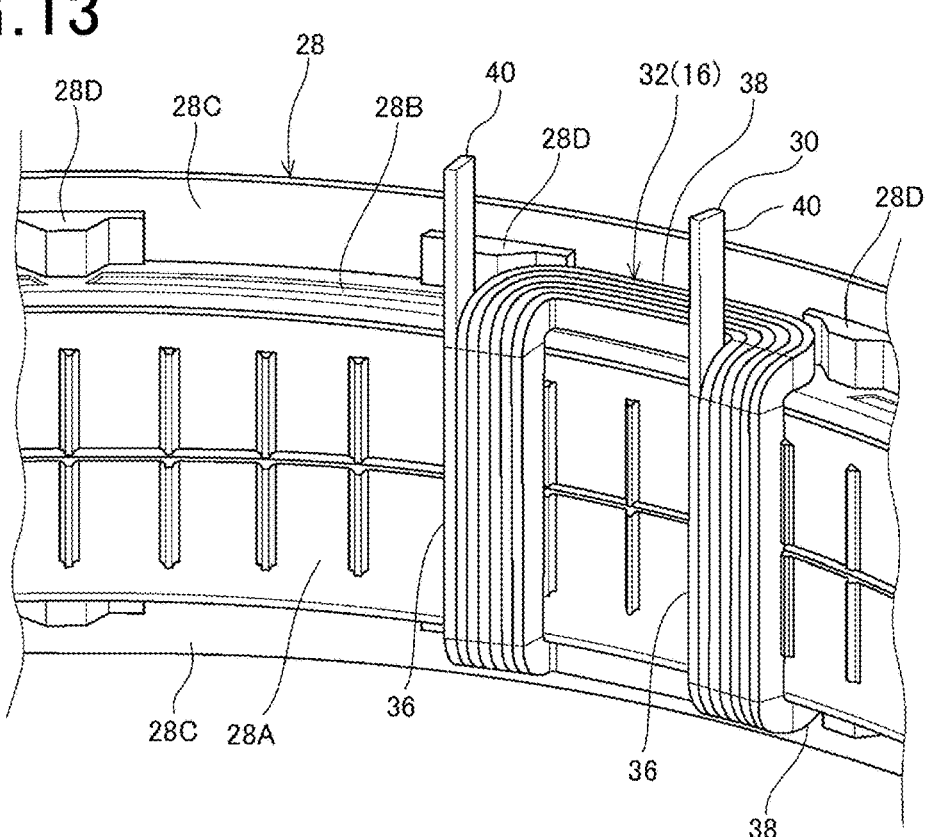
FIG. 13 is a perspective view showing an insulator and a coil that is supported by a stator core via the insulator.
Figure 14:
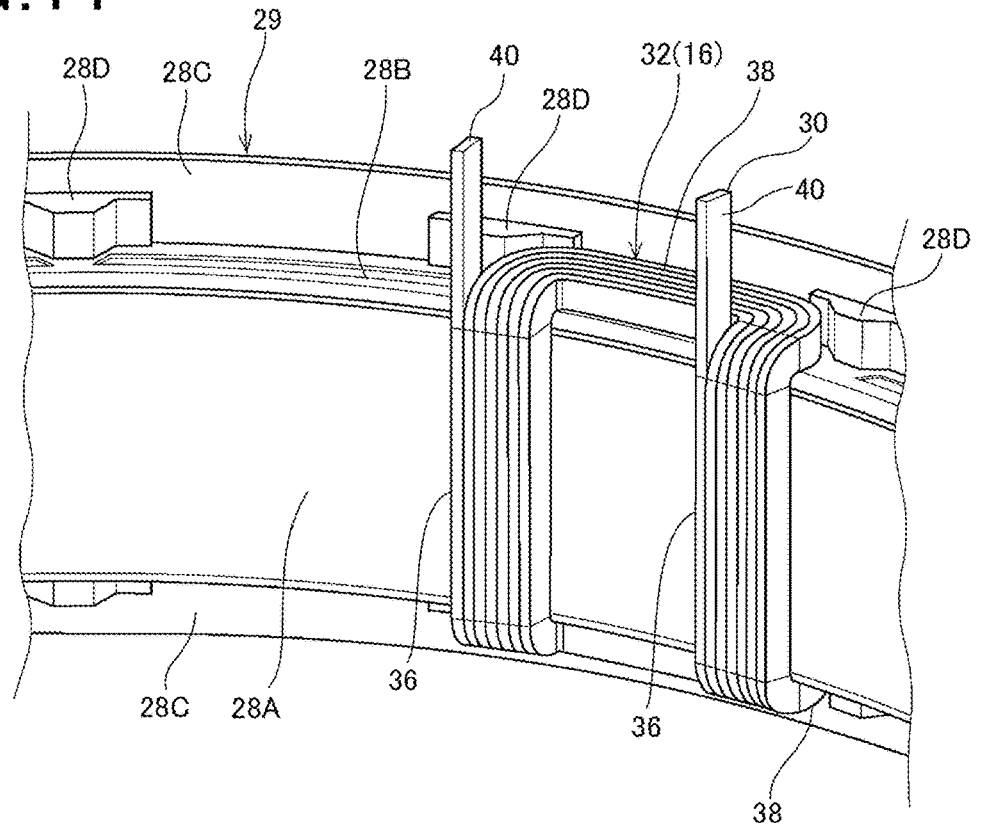
FIG. 14 is a perspective view showing an insulator and a coil that is supported by the stator core via the insulator, wherein the insulator is different from that shown in FIG. 13.

As shown in FIGS. 12 and 13, the insulator 28, to which each of the coils 16 is mounted, has an inner-surface covering part 28A that covers the radially inner surface of the stator core 26, a pair of axial-end-surface covering parts 28B respectively covering the pair of axial end surfaces of the stator core 26, and a pair of outer peripheral flange parts 28C extending in the axial direction respectively from radially outer end portions of the pair of axial-end-surface covering parts 28B. Moreover, the insulator 28 also has a plurality of circumferential positioning parts 28D that position the short coils 32 in the circumferential direction. Each of the circumferential positioning parts 28D is formed in a convex shape radially inward from a corresponding one of the outer peripheral flange parts 28C. Moreover, the circumferential positioning parts 28D are arranged at equal intervals along the circumferential direction. Each of the short coils 32 is circumferentially positioned by arranging each of the coil end parts 38 of the short coil 32 between a circumferentially-adjacent pair of the circumferential positioning parts 28D. It should be noted that the circumferential positioning parts 28D may be provided on both or only one of the outer peripheral flange parts 28C. Alternatively, an insulator 29 as shown in FIG. 14 may be employed. The insulator 29 has the same configuration as the insulator 28 shown in FIG. 13 except that a part of the insulator 29 which corresponds to the inner-surface covering part 28A of the insulator 28 is constituted of a sheet-like paper insulator. It should be noted that parts of the insulator 29 shown in FIG. 14 corresponding to those of the insulator 28 shown in FIG. 13 are designated by the same reference numerals as the corresponding parts of the insulator 28.

Figure 15:
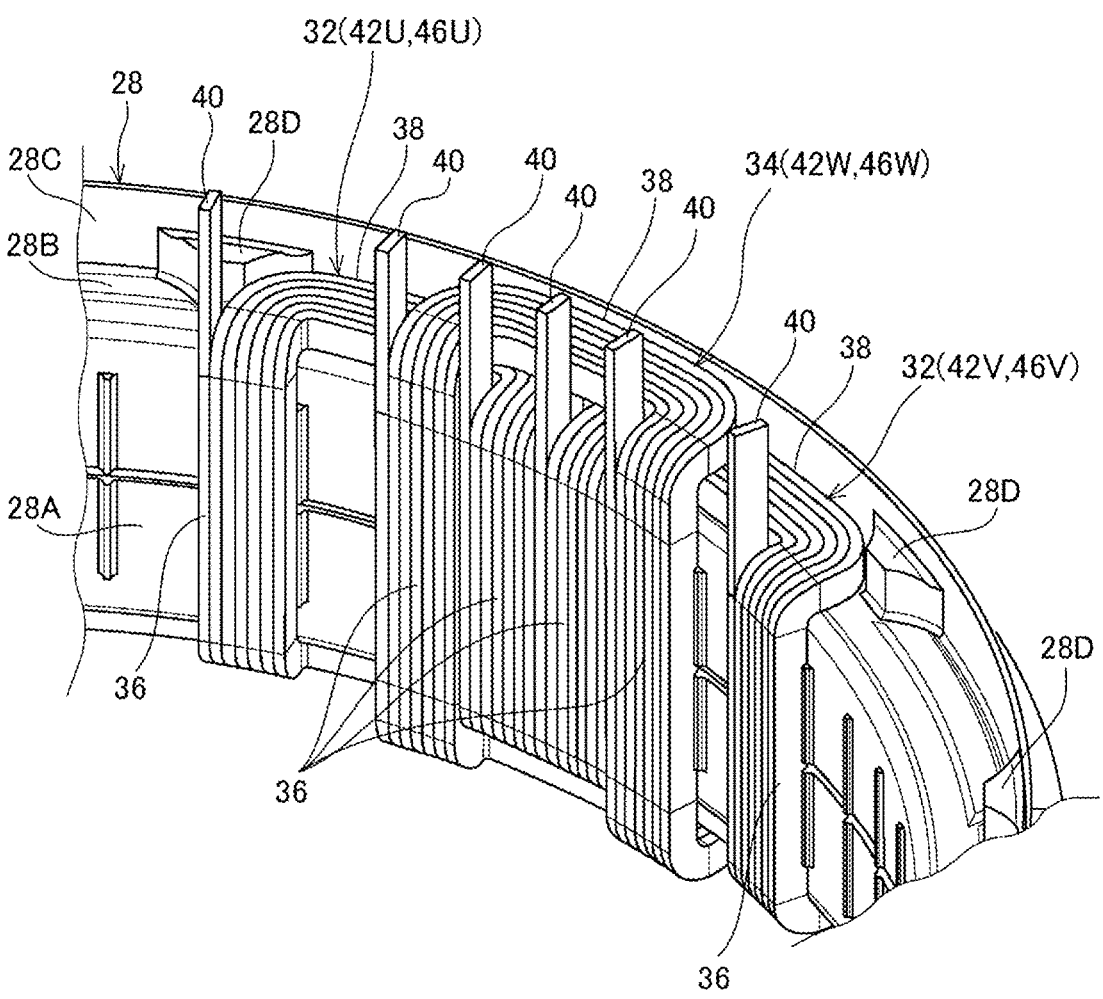
FIG. 15 is a perspective view showing an insulator and the U-phase, V-phase and W-phase coils that are supported by the stator core via the insulator.

As shown in FIGS. 11, 12 and 15, the opposing parts 36 of the short coils 32 and the opposing parts 36 of the long coils 34 are arranged, via the inner-surface covering part 28A of the insulator 28, along the radially inner surface of the stator core 26. Moreover, all of the opposing parts 36 of the short coils 32 and the opposing parts 36 of the long coils 34 are arranged at the same radial position. Specifically, in FIG. 15, for a circumferentially-adjacent pair of one of the U-phase short coils 32 and one of the V-phase short coils 32, the opposing part 36 of the U-phase short coil 32 on the one side in the circumferential direction and the opposing part 36 of the V-phase short coil 32 on the other side in the circumferential direction are arranged adjacent to each other in the circumferential direction. Moreover, the opposing part 36 of the U-phase short coil 32 on the one side in the circumferential direction and the opposing part 36 of the V-phase short coil 32 on the other side in the circumferential direction are together arranged between the pair of opposing parts 36 of one of the W-phase long coils 34. As shown in FIGS. 11 and 15, the opposing parts 36 of the other short coils 32 and the opposing parts 36 of the other long coils 34 are also arranged along the radially inner surface of the stator core 26 in the same manner as described above. Moreover, the opposing parts 36 of the short coils 32 and the opposing parts 36 of the long coils 34 are radially opposed to the magnets 18, with the axial center positions of the opposing parts 36 of the short coils 32 and the axial center positions of the opposing parts 36 of the long coils 34 coinciding in the axial direction with the axial center positions of the magnets 18. Furthermore, the first directions of those portions of the windings 30 which constitute the opposing parts 36 of the short coils 32 and the opposing parts 36 of the long coils 34 are oriented toward the magnets 18.

As shown in FIGS. 11, 12 and 15, for each of the short coils 32, the pair of coil end parts 38 of the short coil 32 are arranged respectively along the pair of axial end surfaces of the stator core 26 via the pair of axial-end-surface covering parts 28B of the insulator 28. Moreover, for each of the long coils 34, the pair of coil end parts 38 of the long coil 34 are arranged respectively along the pair of axial end surfaces of the stator core 26 via the pair of axial-end-surface covering parts 28B of the insulator 28 and the coil end parts 38 of a circumferentially-adjacent pair of the short coils 32. That is, for each of the long coils 34, the pair of coil end parts 38 of the long coil 34 are arranged to axially overlap the coil end parts 38 of a circumferentially-adjacent pair of the short coils 32. Specifically, in FIG. 15, the pair of coil end parts 38 of the W-phase long coil 34 are arranged to axially overlap parts of the pair of coil end parts 38 of the U-phase short coil 32 on the one side in the circumferential direction and parts of the pair of coil end parts 38 of the V-phase short coil 32 on the other side in the circumferential direction; the U-phase short coil 32 and the V-phase short coil 32 are adjacent to each other in the circumferential direction. As shown in FIGS. 11 and 15, the pairs of coil end parts 38 of the other short coils 32 and the pairs of coil end parts 38 of the other long coils 34 are also arranged respectively along the pair of axial end surfaces of the stator core 26 in the same manner as described above.

Next, the operation and effects of the present embodiment will be described.

As shown in FIGS. 3, 6, 7, 10 and 11, in the motor 10 according to the present embodiment, by switching energization of the U-phase coil connection body 46U, the V-phase coil connection body 46V and the W-phase coil connection body 46W of the stator 14, a rotating magnetic field is generated on an inner periphery of the stator 14. Consequently, the rotor 12 is caused by the rotating magnetic field to rotate.

In the motor 10 according to the present embodiment, the numbers of long coils 34 of the U-phase, V-phase and W-phase coil connection bodies 46U, 46V and 46W are set to be equal to each other; and the numbers of short coils 32 of the U-phase, V-phase and W-phase coil connection bodies 46U, 46V and 46W are also set to be equal to each other. Therefore, the combined resistances of the U-phase, V-phase and W-phase coil connection bodies 46U, 46V and 46W are equal to each other. Consequently, it becomes difficult for electrical imbalance to occur between the U-phase, V-phase and W-phase coil connection bodies 46U, 46V and 46W. As a result, it becomes possible to suppress deterioration of torque ripple of the motor 10.

Moreover, in the motor 10 according to the present embodiment, the coil end parts 38 of the long coils 34 and the coil end parts 38 of the short coils 32 are bent radially outward at substantially right angles with respect to the opposing parts 36; the coil end parts 38 of the long coils 34 axially overlap the coil end parts 38 of the short coils 32. Consequently, it becomes possible to suppress increase in the size of the stator 14 in the axial direction. As a result, it becomes possible to suppress increase in the size of the motor 10 in the axial direction.

Furthermore, in the motor 10 according to the present embodiment, each of the windings 30 forming the coils 16 has a rectangular cross section whose longitudinal direction is the first direction (i.e., the direction of the arrow A1). In addition, the first directions of those portions of the windings 30 which constitute the opposing parts 36 of the short coils 32 and the opposing parts 36 of the long coils 34 are oriented toward the magnets 18. Consequently, it becomes possible to reduce the surface areas of the windings 30 facing the magnets 18 while securing the cross-sectional areas of the windings 30. As a result, it becomes possible to suppress increase in the AC copper loss due to eddy current generated in the opposing parts 36 while suppressing increase in the electrical resistances of the windings 30. Moreover, in the motor 10 according to the present embodiment, the opposing parts 36 have a single-layer structure along the radially inner surface of the stator core 26. Consequently, as shown in FIG. 8, it becomes possible to easily form the shape of the opposing parts 36 viewed in the axial direction into a curved shape conforming to the radially inner surface of the stator core 26. As a result, the space factor can be improved.

Furthermore, as shown in FIGS. 6, 7, 8 and 9, in the motor 10 according to the present embodiment, in the manufacturing process of each of the coils 16, those portions of the coil 16 (i.e., the stacked layers of the winding 30) which form the pair of opposing parts 36, the coil end part 38 on the one side in the axial direction and the coil end part 38 on the other side in the axial direction are inseparably bound in the second direction. Consequently, it becomes possible to improve the work efficiency when bending those portions of the coil 16 which form the coil end part 38 on the one side in the axial direction and the coil end part 38 on the other side in the axial direction radially outward at substantially right angles.

Moreover, in the motor 10 according to the present embodiment, for each of the coils 16, the pair of terminal parts 40 of the coil 16 are arranged on the one side in the axial direction; and the number of stacked layers of the winding 30 at the coil end part 38 of the coil 16 on the one side in the axial direction is less than the number of stacked layers of the winding 30 at the coil end part 38 of the coil 16 on the other side in the axial direction. With such a configuration, the length of the winding 30 that is wound to form the coil 16 can be reduced. Consequently, it becomes to suppress increase in the electrical resistance of the coil 16.

Furthermore, in the motor 10 according to the present embodiment, in the outer peripheral flange parts 28C of the insulator 28, there are provided the circumferential positioning parts 28D. Consequently, with the circumferential positioning parts 28D, it becomes possible to improve the work efficiency when mounting the short coils 32 to the stator core 26 via the insulator 28. Moreover, it also becomes possible to arrange the short coils 32 evenly in the circumferential direction and stabilize the positions of the short coils 32 in the circumferential direction. It should be noted that in the insulator 28, there may be provided only those circumferential positioning parts 28D which position the short coils 32 of only one phase in the circumferential direction.

Motors According to Second to Eighth Embodiments

Next, referring to FIGS. 16 to 29, the configurations of stators 14 of motors according to the second to the eighth embodiments will be described. Similar to the motor 10 according to the first embodiment, the motors according to the second to the eighth embodiments can suppress torque ripple. It should be noted that: members and parts of the motors according to the second to the eighth embodiments corresponding to those of the motor(s) according to the previous embodiment(s) are designated by the same reference numerals as the corresponding members and parts of the motor(s) according to the previous embodiment(s); and description of these parts and members will be omitted hereinafter.

Motor According to Second Embodiment

Figure 16:
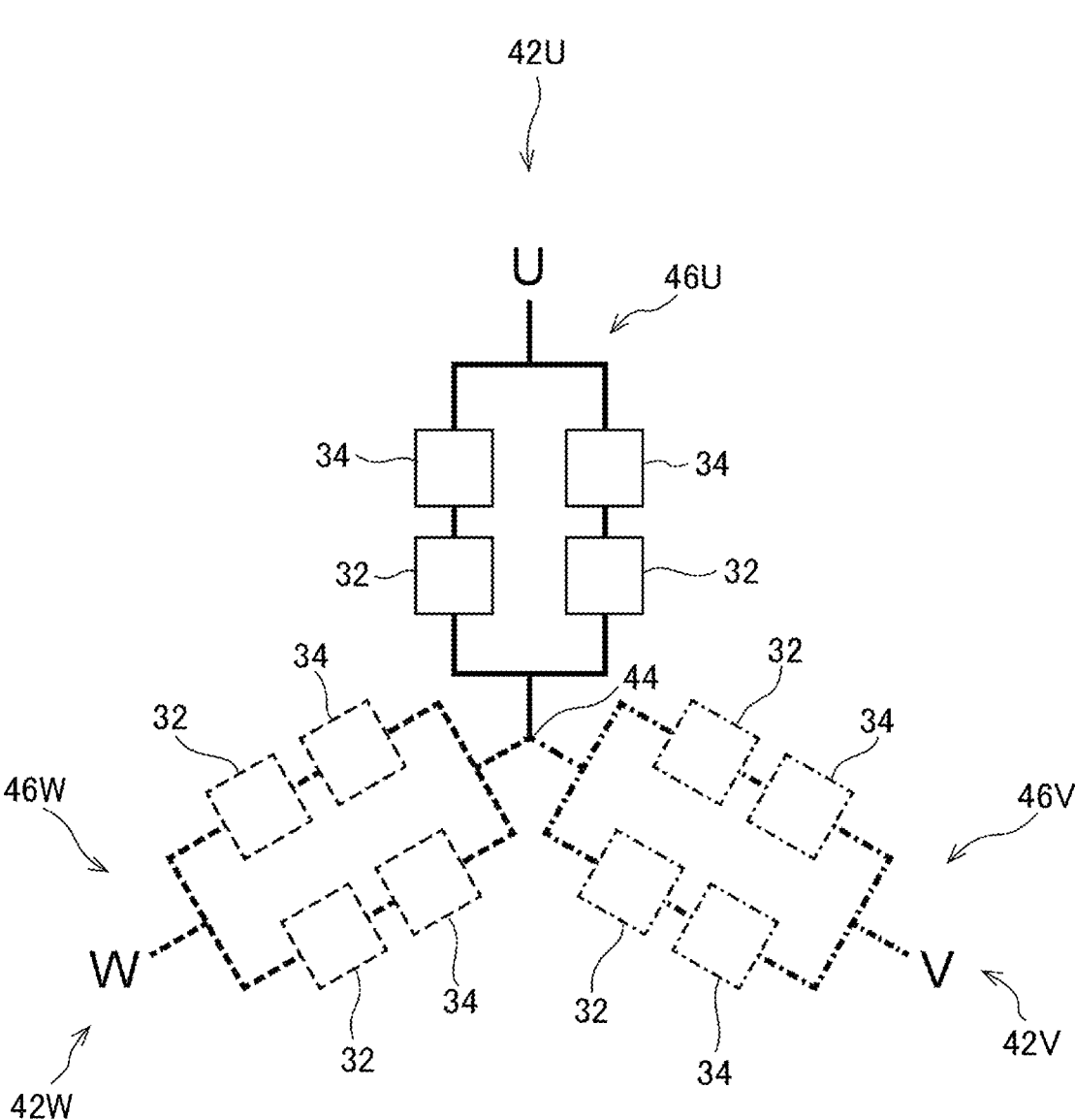
FIG. 16 is a schematic diagram for explaining the connection between U-phase, V-phase and W-phase coils of a motor according to a second embodiment.

As shown in FIG. 16, in the stator 14 of the motor according to the second embodiment, a plurality of coils 16 are connected in a star connection. In the present embodiment, each of the U phase 42U, the V phase 42V and the W phase 42W includes two short coils 32 and two long coils 34. Specifically, in the U phase 42U, two coil pairs are connected in parallel to each other; each coil pair consists of one short coil 32 and one long coil 34 that are serially connected in this order from the neutral point 44 side. Similarly, in the V phase 42V, two coil pairs are connected in parallel to each other; each coil pair consists of one short coil 32 and one long coil 34 that are serially connected in this order from the neutral point 44 side. On the other hand, in the W phase 42W, two coil pairs are connected in parallel to each other; each coil pair consists of one long coil 34 and one short coil 32 that are serially connected in this order from the neutral point 44 side. Therefore, in the present embodiment as well, the combined resistances of the U-phase, V-phase and W-phase coil connection bodies 46U, 46V and 46W are equal to each other.

Figure 17:
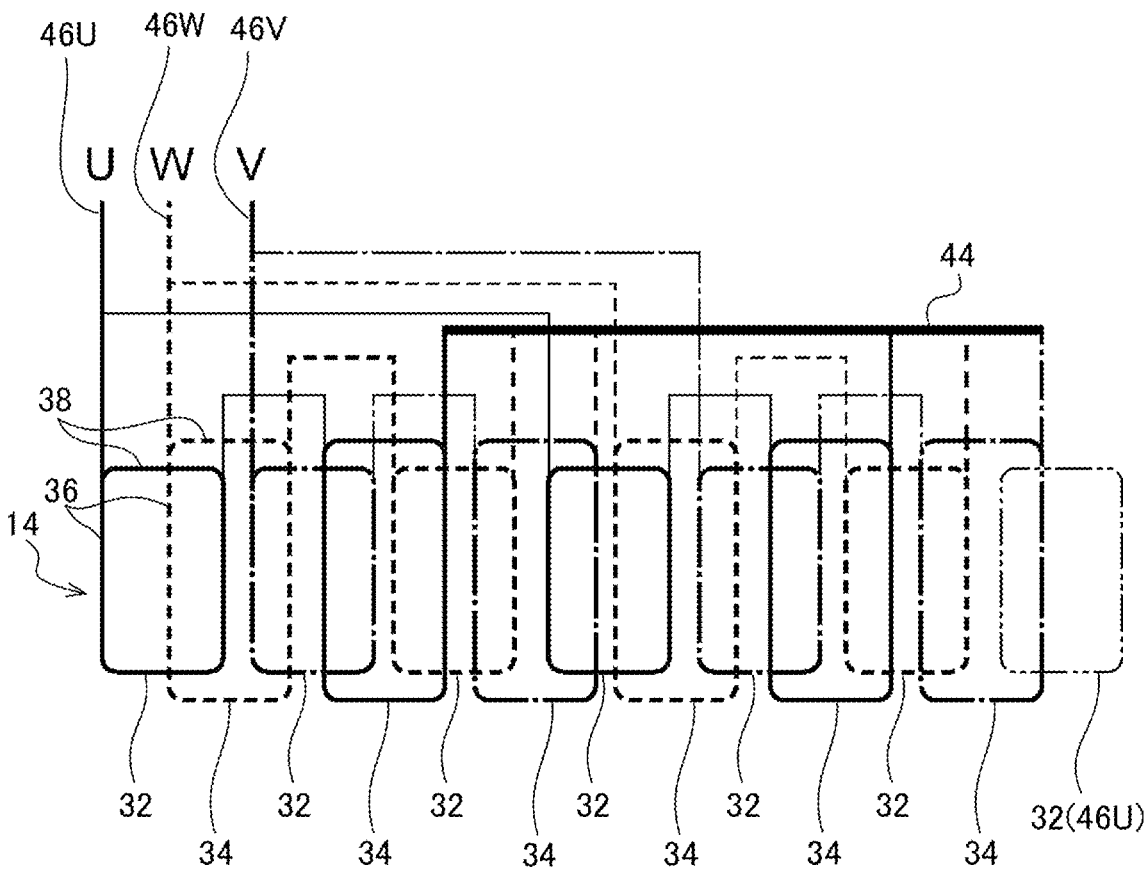
FIG. 17 is a schematic diagram for explaining the connection and arrangement of the U-phase, V-phase and W-phase coils of the motor according to the second embodiment.

As shown in FIG. 17, the short coil 32 in one wiring path of the U phase 42U and the short coil 32 in one wiring path of the V phase 42V are arranged adjacent to each other in the circumferential direction along the stator core 26. Moreover, the long coil 34 in one wiring path of the W phase 42W is arranged so as to straddle the short coil 32 in the one wiring path of the U phase 42U and the short coil 32 in the one wiring path of the V phase 42V.

The short coil 32 in the one wiring path of the V phase 42V and the short coil 32 in the one wiring path of the W phase 42W are arranged adjacent to each other in the circumferential direction along the stator core 26. Moreover, the long coil 34 in the one wiring path of the U phase 42U is arranged so as to straddle the short coil 32 in the one wiring path of the V phase 42V and the short coil 32 in the one wiring path of the W phase 42W.

The short coil 32 in the one wiring path of the W phase 42W and the short coil 32 in the other wiring path of the U phase 42U are arranged adjacent to each other in the circumferential direction along the stator core 26. Moreover, the long coil 34 in the one wiring path of the V phase 42V is arranged so as to straddle the short coil 32 in the one wiring path of the W phase 42W and the short coil 32 in the other wiring path of the U phase 42U.

The short coil 32 in the other wiring path of the U phase 42U and the short coil 32 in the other wiring path of the V phase 42V are arranged adjacent to each other in the circumferential direction along the stator core 26. Moreover, the long coil 34 in the other wiring path of the W phase 42W is arranged so as to straddle the short coil 32 in the other wiring path of the U phase 42U and the short coil 32 in the other wiring path of the V phase 42V.

The short coil 32 in the other wiring path of the V phase 42V and the short coil 32 in the other wiring path of the W phase 42W are arranged adjacent to each other in the circumferential direction along the stator core 26. Moreover, the long coil 34 in the other wiring path of the U phase 42U is arranged so as to straddle the short coil 32 in the other wiring path of the V phase 42V and the short coil 32 in the other wiring path of the W phase 42W.

The short coil 32 in the other wiring path of the W phase 42W and the short coil 32 in the one wiring path of the U phase 42U are arranged adjacent to each other in the circumferential direction along the stator core 26. Moreover, the long coil 34 in the other wiring path of the V phase 42V is arranged so as to straddle the short coil 32 in the other wiring path of the W phase 42W and the short coil 32 in the one wiring path of the U phase 42U.

In the motor according to the second embodiment which includes the stator 14 described above, it is also possible to suppress deterioration of torque ripple.

Motor According to Third Embodiment

Figure 18:
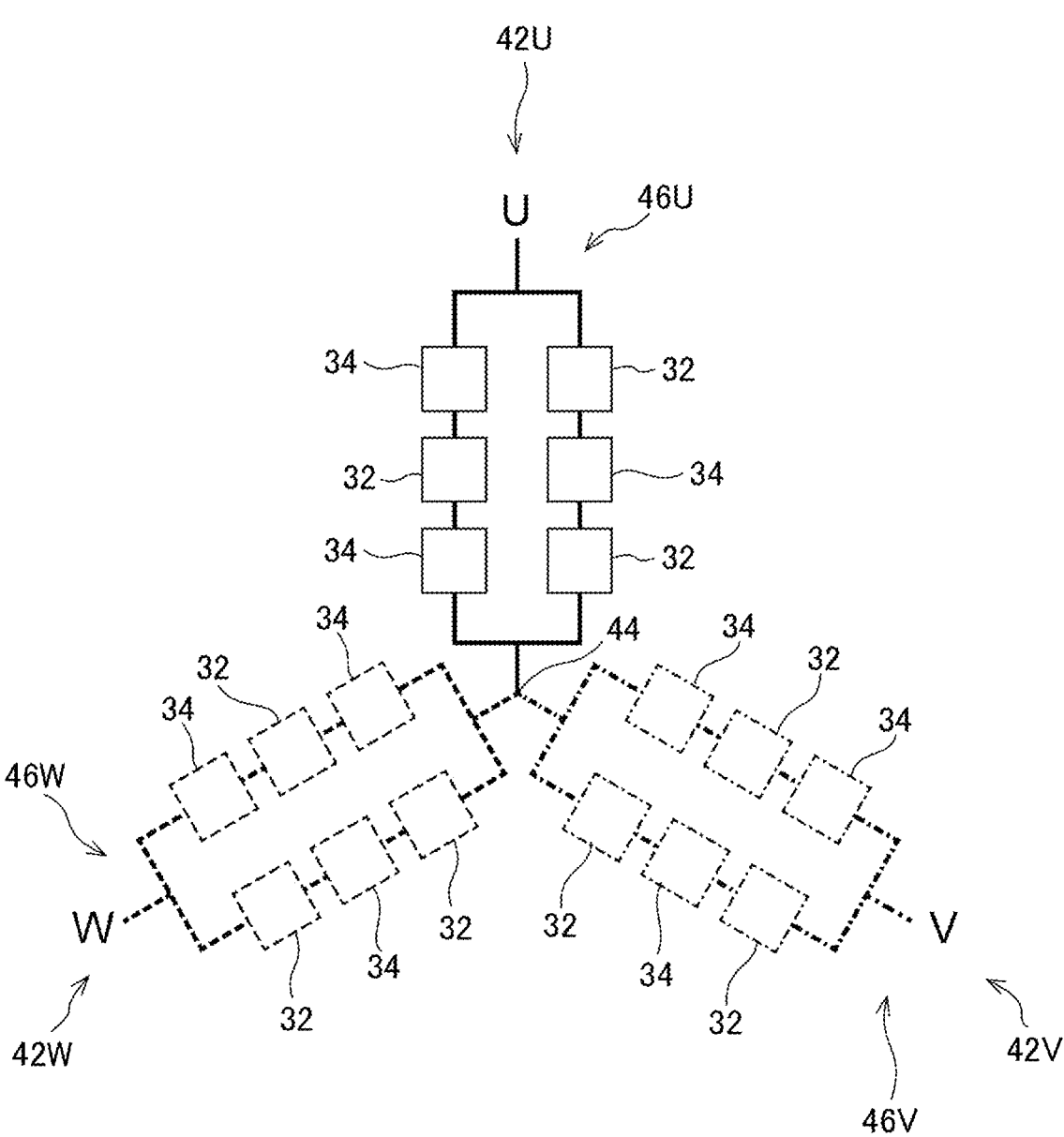
FIG. 18 is a schematic diagram for explaining the connection between U-phase, V-phase and W-phase coils of a motor according to a third embodiment.

As shown in FIG. 18, in the stator 14 of the motor according to the third embodiment, a plurality of coils 16 are connected in a star connection. In the present embodiment, each of the U phase 42U, the V phase 42V and the W phase 42W includes three short coils 32 and three long coils 34. Specifically, in the U phase 42U, two coil trios are connected in parallel to each other; one coil trio consists of one short coil 32, one long coil 34 and another short coil 32 that are serially connected in this order from the neutral point 44 side; the other coil trio consists of one long coil 34, one short coil 32 and another long coil 34 that are serially connected in this order from the neutral point 44 side. Similarly, in the V phase 42V, two coil trios are connected in parallel to each other; one coil trio consists of one short coil 32, one long coil 34 and another short coil 32 that are serially connected in this order from the neutral point 44 side; the other coil trio consists of one long coil 34, one short coil 32 and another long coil 34 that are serially connected in this order from the neutral point 44 side. Moreover, in the W phase 42W, two coil trios are connected in parallel to each other; one coil trio consists of one long coil 34, one short coil 32 and another long coil 34 that are serially connected in this order from the neutral point 44 side; the other coil trio consists of one short coil 32, one long coil 34 and another short coil 32 that are serially connected in this order from the neutral point 44 side. Therefore, in the present embodiment as well, the combined resistances of the U-phase, V-phase and W-phase coil connection bodies 46U, 46V and 46W are equal to each other.

Figure 19:
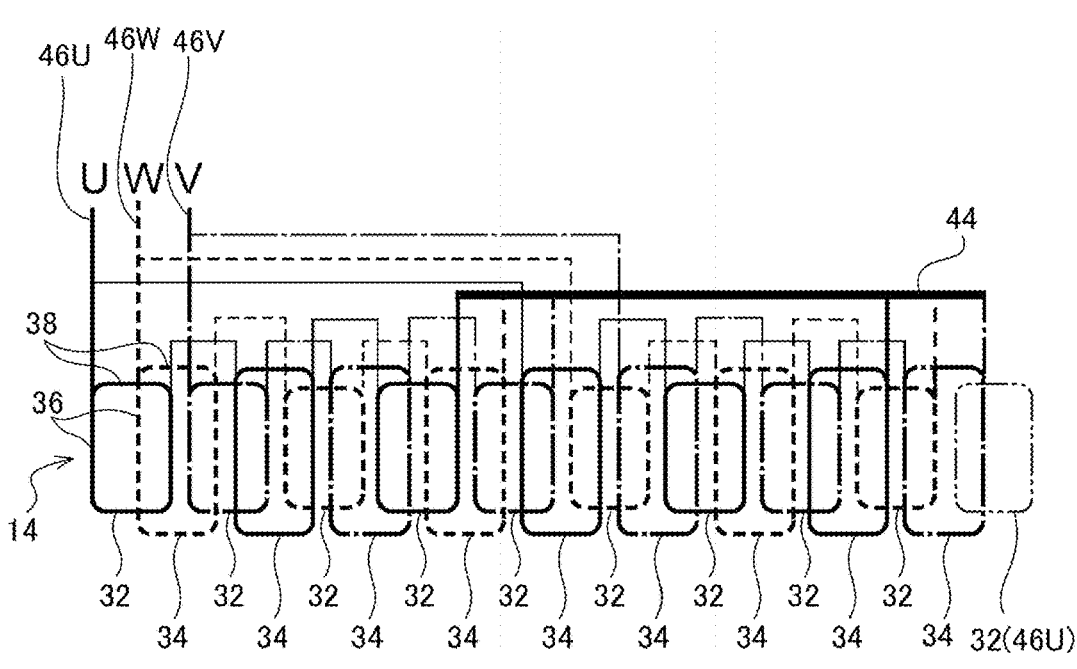
FIG. 19 is a schematic diagram for explaining the connection and arrangement of the U-phase, V-phase and W-phase coils of the motor according to the third embodiment.

As shown in FIG. 19, the short coil 32 located on the opposite side to the neutral point 44 in one wiring path of the U phase 42U and the short coil 32 located on the opposite side to the neutral point 44 in one wiring path of the V phase 42V are arranged adjacent to each other in the circumferential direction along the stator core 26. Moreover, the long coil 34 located on the opposite side to the neutral point 44 in one wiring path of the W phase 42W is arranged so as to straddle the short coil 32 located on the opposite side to the neutral point 44 in the one wiring path of the U phase 42U and the short coil 32 located on the opposite side to the neutral point 44 in the one wiring path of the V phase 42V.

The short coil 32 located on the opposite side to the neutral point 44 in the one wiring path of the V phase 42V and the short coil 32 in the one wiring path of the W phase 42W are arranged adjacent to each other in the circumferential direction along the stator core 26. Moreover, the long coil 34 in the one wiring path of the U phase 42U is arranged so as to straddle the short coil 32 located on the opposite side to the neutral point 44 in the one wiring path of the V phase 42V and the short coil 32 in the one wiring path of the W phase 42W.

The short coil 32 in the one wiring path of the W phase 42W and the short coil 32 located on the neutral point 44 side in the one wiring path of the U phase 42U are arranged adjacent to each other in the circumferential direction along the stator core 26. Moreover, the long coil 34 in the one wiring path of the V phase 42V is arranged so as to straddle the short coil 32 in the one wiring path of the W phase 42W and the short coil 32 located on the neutral point 44 side in the one wiring path of the U phase 42U.

The short coil 32 located on the neutral point 44 side in the one wiring path of the U phase 42U and the short coil 32 located on the neutral point 44 side in the one wiring path of the V phase 42V are arranged adjacent to each other in the circumferential direction along the stator core 26. Moreover, the long coil 34 located on the neutral point 44 side in the one wiring path of the W phase 42W is arranged so as to straddle the short coil 32 located on the neutral point 44 side in the one wiring path of the U phase 42U and the short coil 32 located on the neutral point 44 side in the one wiring path of the V phase 42V.

The short coil 32 located on the neutral point 44 side in the one wiring path of the V phase 42V and the short coil 32 located on the opposite side to the neutral point 44 in the other wiring path of the W phase 42W are arranged adjacent to each other in the circumferential direction along the stator core 26. Moreover, the long coil 34 located on the opposite side to the neutral point 44 in the other wiring path of the U phase 42U is arranged so as to straddle the short coil 32 located on the neutral point 44 side in the one wiring path of the V phase 42V and the short coil 32 located on the opposite side to the neutral point 44 in the other wiring path of the W phase 42W.

The short coil 32 located on the opposite side to the neutral point 44 in the other wiring path of the W phase 42W and the short coil 32 in the other wiring path of the U phase 42U are arranged adjacent to each other in the circumferential direction along the stator core 26. Moreover, the long coil 34 located on the opposite side to the neutral point 44 in the other wiring path of the V phase 42V is arranged so as to straddle the short coil 32 located on the opposite side to the neutral point 44 in the other wiring path of the W phase 42W and the short coil 32 in the other wiring path of the U phase 42U.

The short coil 32 in the other wiring path of the U phase 42U and the short coil 32 in the other wiring path of the V phase 42V are arranged adjacent to each other in the circumferential direction along the stator core 26. Moreover, the long coil 34 in the other wiring path of the W phase 42W is arranged so as to straddle the short coil 32 in the other wiring path of the U phase 42U and the short coil 32 in the other wiring path of the V phase 42V.

The short coil 32 in the other wiring path of the V phase 42V and the short coil 32 located on the neutral point 44 side in the other wiring path of the W phase 42W are arranged adjacent to each other in the circumferential direction along the stator core 26. Moreover, the long coil 34 located on the neutral point 44 side in the other wiring path of the U phase 42U is arranged so as to straddle the short coil 32 in the other wiring path of the V phase 42V and the short coil 32 located on the neutral point 44 side in the other wiring path of the W phase 42W.

The short coil 32 located on the neutral point 44 side in the other wiring path of the W phase 42W and the short coil 32 located on the opposite side to the neutral point 44 in the one wiring path of the U phase 42U are arranged adjacent to each other in the circumferential direction along the stator core 26. Moreover, the long coil 34 located on the neutral point 44 side in the other wiring path of the V phase 42V is arranged so as to straddle the short coil 32 located on the neutral point 44 side in the other wiring path of the W phase 42W and the short coil 32 located on the opposite side to the neutral point 44 in the one wiring path of the U phase 42U.

In the motor according to the third embodiment which includes the stator 14 described above, it is also possible to suppress deterioration of torque ripple.

Motor According to Fourth Embodiment

Figure 20:
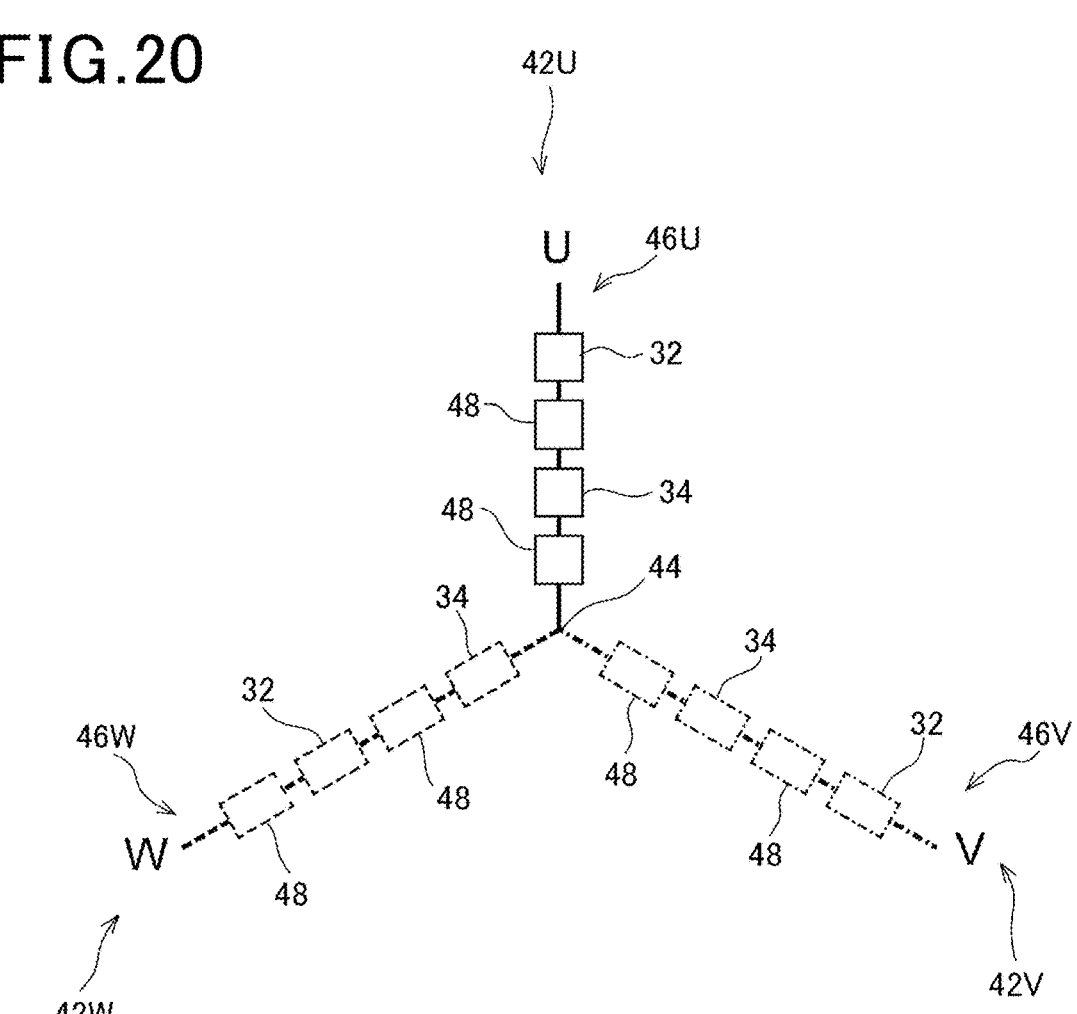
FIG. 20 is a schematic diagram for explaining the connection between U-phase, V-phase and W-phase coils of a motor according to a fourth embodiment.

As shown in FIG. 20, in the stator 14 of the motor according to the fourth embodiment, a plurality of coils 16 are connected in a star connection. In the present embodiment, each of the U phase 42U, the V phase 42V and the W phase 42W includes one short coil 32, one long coil 34 and two intermediate coils 48. The intermediate coils 48 denote coils 16 whose axial dimension is set to be greater than the axial dimension of the short coil 32 and less than the axial dimension of the long coil 34. Specifically, in the U phase 42U, the four coils 16 are serially connected in the order of one intermediate coil 48, the long coil 34, the other intermediate coil 48 and the short coil 32 from the neutral point 44 side. Moreover, in the V phase 42V, the four coils 16 are serially connected in the order of one intermediate coil 48, the short coil 32, the other intermediate coil 48 and the long coil 34 from the neutral point 44 side. Furthermore, in the W phase 42W, the four coils 16 are serially connected in the order of the long coil 34, one intermediate coil 48, the short coil 32 and the other intermediate coil 48 from the neutral point 44 side. Therefore, in the present embodiment as well, the combined resistances of the U-phase, V-phase and W-phase coil connection bodies 46U, 46V and 46W are equal to each other.

Figure 21:
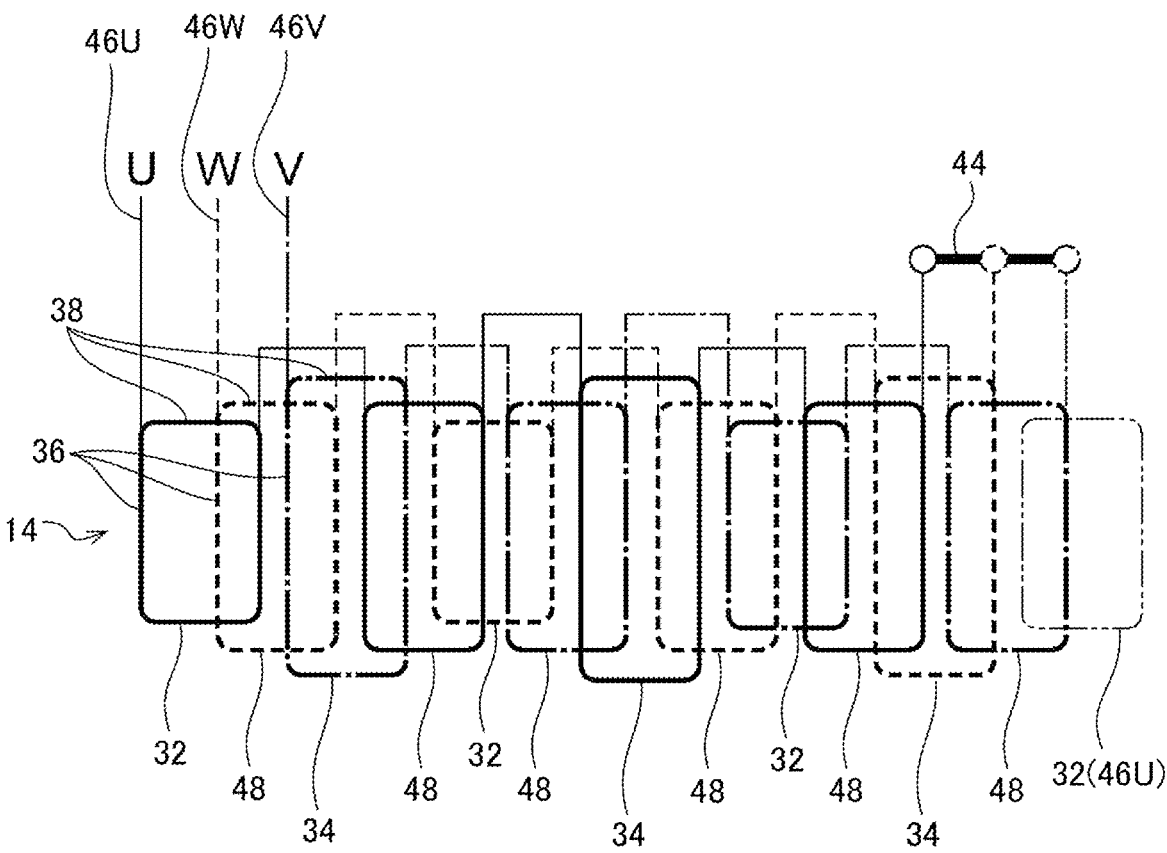
FIG. 21 is a schematic diagram for explaining the connection and arrangement of the U-phase, V-phase and W-phase coils of the motor according to the fourth embodiment.

As shown in FIG. 21, the short coil 32 of the U phase 42U and the long coil 34 of the V phase 42V are arranged adjacent to each other in the circumferential direction along the stator core 26. Moreover, the intermediate coil 48 located on the opposite side to the neutral point 44 in the W phase 42W is arranged so as to straddle the short coil 32 of the U phase 42U and the long coil 34 of the V phase 42V.

The long coil 34 of the V phase 42V and the short coil 32 of the W phase 42W are arranged adjacent to each other in the circumferential direction along the stator core 26. Moreover, the intermediate coil 48 located on the opposite side to the neutral point 44 in the U phase 42U is arranged so as to straddle the long coil 34 of the V phase 42V and the short coil 32 of the W phase 42W.

The short coil 32 of the W phase 42W and the long coil 34 of the U phase 42U are arranged adjacent to each other in the circumferential direction along the stator core 26. Moreover, the intermediate coil 48 located on the opposite side to the neutral point 44 in the V phase 42V is arranged so as to straddle the short coil 32 of the W phase 42W and the long coil 34 of the U phase 42U.

The long coil 34 of the U phase 42U and the short coil 32 of the V phase 42V are arranged adjacent to each other in the circumferential direction along the stator core 26. Moreover, the intermediate coil 48 located on the neutral point 44 side in the W phase 42W is arranged so as to straddle the long coil 34 of the U phase 42U and the short coil 32 of the V phase 42V The short coil 32 of the V phase 42V and the long coil 34 of the W phase 42W are arranged adjacent to each other in the circumferential direction along the stator core 26. Moreover, the intermediate coil 48 located on the neutral point 44 side in the U phase 42U is arranged so as to straddle the short coil 32 of the V phase 42V and the long coil 34 of the W phase 42W.

The long coil 34 of the W phase 42W and the short coil 32 of the U phase 42U are arranged adjacent to each other in the circumferential direction along the stator core 26. Moreover, the intermediate coil 48 located on the neutral point 44 side in the V phase 42V is arranged so as to straddle the long coil 34 of the W phase 42W and the short coil 32 of the U phase 42U.

In the motor according to the fourth embodiment which includes the stator 14 described above, it is also possible to suppress deterioration of torque ripple.

Motor According to Fifth Embodiment

Figure 22:
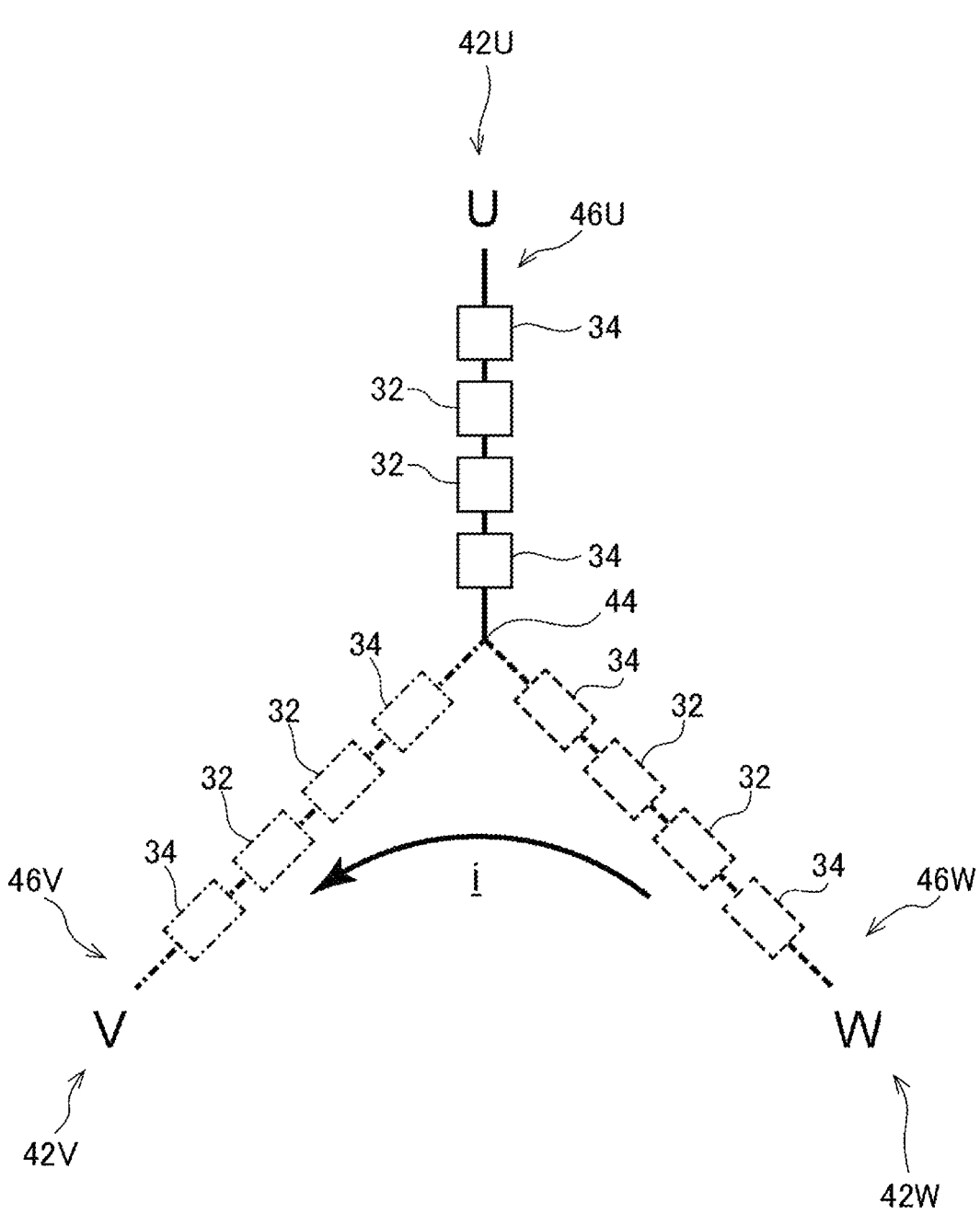
FIG. 22 is a schematic diagram for explaining the connection between U-phase, V-phase and W-phase coils of a motor according to a fifth embodiment.
Figure 23:
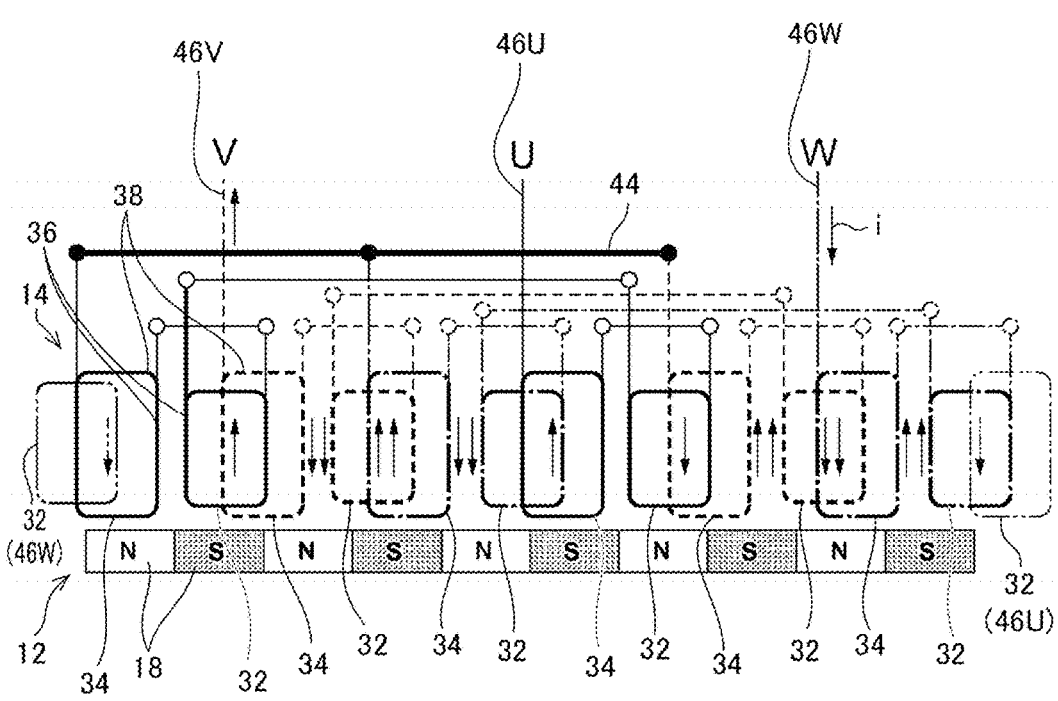
FIG. 23 is a schematic diagram for explaining the connection and arrangement of the U-phase, V-phase and W-phase coils of the motor according to the fifth embodiment.

As shown in FIGS. 22 and 23, the motor 50 according to the fifth embodiment is a 10-pole 12-slot toothless motor. It should be noted that the arrow i shown in the figures indicates the direction of electric current flowing from the W phase 42W side to the V phase 42V side.

As shown in FIG. 22, in the stator 14 of the motor 50 according to the fifth embodiment, a plurality of coils 16 are connected in a star connection. In the present embodiment, each of the U phase 42U, the V phase 42V and the W phase 42W includes two short coils 32 and two long coils 34. Specifically, in the U phase 42U, the four coils 16 are serially connected in the order of one long coil 34, one short coil 32, the other short coil 32 and the other long coil 34 from the neutral point 44 side. Similarly, in the V phase 42V, the four coils 16 are serially connected in the order of one long coil 34, one short coil 32, the other short coil 32 and the other long coil 34 from the neutral point 44 side. Moreover, in the W phase 42W, the four coils 16 are serially connected in the order of one long coil 34, one short coil 32, the other short coil 32 and the other long coil 34 from the neutral point 44 side. Therefore, in the present embodiment as well, the combined resistances of the U-phase, V-phase and W-phase coil connection bodies 46U, 46V and 46W are equal to each other.

As shown in FIG. 23, the long coil 34 located on the neutral point 44 side in the U phase 42U and the short coil 32 located on the neutral point 44 side in the U phase 42U are arranged adjacent to each other in the circumferential direction along the stator core 26.

Moreover, one opposing part 36 of the long coil 34 located on the opposite side to the neutral point 44 in the V phase 42V is arranged between the pair of opposing parts 36 of the short coil 32 located on the neutral point 44 side in the U phase 42U.

The long coil 34 located on the opposite side to the neutral point 44 in the V phase 42V and the short coil 32 located on the opposite side to the neutral point 44 in the V phase 42V are arranged adjacent to each other in the circumferential direction along the stator core 26.

Moreover, one opposing part 36 of the long coil 34 located on the neutral point 44 side in the W phase 42W is arranged between the pair of opposing parts 36 of the short coil 32 located on the opposite side to the neutral point 44 in the V phase 42V.

The long coil 34 located on the neutral point 44 side in the W phase 42W and the short coil 32 located on the neutral point 44 side in the W phase 42W are arranged adjacent to each other in the circumferential direction along the stator core 26.

Moreover, one opposing part 36 of the long coil 34 located on the opposite side to the neutral point 44 in the U phase 42U is arranged between the pair of opposing parts 36 of the short coil 32 located on the neutral point 44 side in the W phase 42W.

The long coil 34 located on the opposite side to the neutral point 44 in the U phase 42U and the short coil 32 located on the opposite side to the neutral point 44 in the U phase 42U are arranged adjacent to each other in the circumferential direction along the stator core 26.

Moreover, one opposing part 36 of the long coil 34 located on the neutral point 44 side in the V phase 42V is arranged between the pair of opposing parts 36 of the short coil 32 located on the opposite side to the neutral point 44 in the U phase 42U.

The long coil 34 located on the neutral point 44 side in the V phase 42V and the short coil 32 located on the neutral point 44 side in the V phase 42V are arranged adjacent to each other in the circumferential direction along the stator core 26.

Moreover, one opposing part 36 of the long coil 34 located on the opposite side to the neutral point 44 in the W phase 42W is arranged between the pair of opposing parts 36 of the short coil 32 located on the neutral point 44 side in the V phase 42V.

The long coil 34 located on the opposite side to the neutral point 44 in the W phase 42W and the short coil 32 located on the opposite side to the neutral point 44 in the W phase 42W are arranged adjacent to each other in the circumferential direction along the stator core 26.

Moreover, one opposing part 36 of the long coil 34 located on the neutral point 44 side in the U phase 42U is arranged between the pair of opposing parts 36 of the short coil 32 located on the opposite side to the neutral point 44 in the W phase 42W.

In the motor 50 according to the fifth embodiment which includes the stator 14 described above, it is also possible to suppress deterioration of torque ripple.

Motor According to Sixth Embodiment

As shown in FIG. 24, in the stator 14 of the motor according to the sixth embodiment, there are provided a plurality of coils 16 half of which are connected in a star connection and the other half of which are also connected in a star connection. In the present embodiment, each of the U phase 42U, the V phase 42V and the W phase 42W includes one short coil 32 and one long coil 34. In the U phase 42U, the two coils 16 are serially connected in the order of the long coil 34 and the short coil 32 from the neutral point 44 side. Similarly, in the V phase 42V, the two coils 16 are serially connected in the order of the long coil 34 and the short coil 32 from the neutral point 44 side. On the other hand, in the W phase 42W, the two coils 16 are serially connected in the order of the short coil 32 and the long coil 34 from the neutral point 44 side.

Moreover, in the present embodiment, the stator 14 further has an X phase 42X, a Y phase 42Y and a Z phase 42Z, each of which includes one short coil 32 and one long coil 34. In the X phase 42X, the two coils 16 are serially connected in the order of the long coil 34 and the short coil 32 from the neutral point 44 side. Similarly, in the Y phase 42Y, the two coils 16 are serially connected in the order of the long coil 34 and the short coil 32 from the neutral point 44 side. On the other hand, in the Z phase 42Z, the two coils 16 are serially connected in the order of the short coil 32 and the long coil 34 from the neutral point 44 side. Hereinafter, in the X phase 42X, the range from the neutral point 44 to the short coil 32 will be referred to as an X-phase coil connection body 46X. Similarly, in the Y phase 42Y, the range from the neutral point 44 to the short coil 32 will be referred to as a Y-phase coil connection body 46Y Moreover, in the Z phase 42Z, the range from the neutral point 44 to the long coil 34 will be referred to as a Z-phase coil connection body 46Z. In the present embodiment, all the combined resistances of the U-phase, V-phase, W-phase, X-phase, Y-phase and Z-phase coil connection bodies 46U, 46V, 46W, 46X, 46Y and 46Z are equal to each other.

As shown in FIG. 25, the short coil 32 of the U phase 42U and the short coil 32 of the V phase 42V are arranged adjacent to each other in the circumferential direction along the stator core 26. Moreover, the long coil 34 of the W phase 42W is arranged so as to straddle the short coil 32 of the U phase 42U and the short coil 32 of the V phase 42V.

The short coil 32 of the V phase 42V and the short coil 32 of the W phase 42W are arranged adjacent to each other in the circumferential direction along the stator core 26. Moreover, the long coil 34 of the U phase 42U is arranged so as to straddle the short coil 32 of the V phase 42V and the short coil 32 of the W phase 42W.

The short coil 32 of the W phase 42W and the short coil 32 of the X phase 42X are arranged adjacent to each other in the circumferential direction along the stator core 26. Moreover, the long coil 34 of the V phase 42V is arranged so as to straddle the short coil 32 of the W phase 42W and the short coil 32 of the X phase 42X.

The short coil 32 of the X phase 42X and the short coil 32 of the Y phase 42Y are arranged adjacent to each other in the circumferential direction along the stator core 26. Moreover, the long coil 34 of the Z phase 42Z is arranged so as to straddle the short coil 32 of the X phase 42X and the short coil 32 of the Y phase 42Y.

The short coil 32 of the Y phase 42Y and the short coil 32 of the Z phase 42Z are arranged adjacent to each other in the circumferential direction along the stator core 26. Moreover, the long coil 34 of the X phase 42X is arranged so as to straddle the short coil 32 of the Y phase 42Y and the short coil 32 of the Z phase 42Z.

The short coil 32 of the Z phase 42Z and the short coil 32 of the U phase 42U are arranged adjacent to each other in the circumferential direction along the stator core 26. Moreover, the long coil 34 of the Y phase 42Y is arranged so as to straddle the short coil 32 of the Z phase 42Z and the short coil 32 of the U phase 42U.

In the motor according to the second embodiment which includes the stator 14 described above, it is also possible to suppress deterioration of torque ripple. It should be noted that the trio of the U phase 42U, the V phase 42V and the W phase 42W and the trio of the X phase 42X, the Y phase 42Y and the Z phase 42Z may be either respectively connected to and driven by two three-phase inverters, or together connected to and driven by a single three-phase inverter.

Motor According to Seventh Embodiment

As shown in FIG. 26, in the stator 14 of the motor according to the seventh embodiment, there are provided a plurality of coils 16 half of which are connected in a star connection and the other half of which are also connected in a star connection. In the present embodiment, each of the U phase 42U, the V phase 42V and the W phase 42W includes either two short coils 32 or two long coils 34. In the U phase 42U, the two coils 16 are serially connected in the order of one short coil 32 and the other short coil 32 from the neutral point 44 side. Similarly, in the V phase 42V, the two coils 16 are serially connected in the order of one short coil 32 and the other short coil 32 from the neutral point 44 side. On the other hand, in the W phase 42W, the two coils 16 are serially connected in the order of one long coil 34 and the other long coil 34 from the neutral point 44 side.

Moreover, in the present embodiment, each of the X phase 42X, the Y phase 42Y and the Z phase 42Z includes either two short coils 32 or two long coils 34. In the X phase 42X, the two coils 16 are serially connected in the order of one long coil 34 and the other long coil 34 from the neutral point 44 side. Similarly, in the Y phase 42Y, the two coils 16 are serially connected in the order of one long coil 34 and the other long coil 34 from the neutral point 44 side. On the other hand, in the Z phase 42Z, the two coils 16 are serially connected in the order of one short coil 32 and the other short coil 32 from the neutral point 44 side.

As shown in FIG. 27, the short coil 32 located on the opposite side to the neutral point 44 in the U phase 42U and the short coil 32 located on the opposite side to the neutral point 44 in the V phase 42V are arranged adjacent to each other in the circumferential direction along the stator core 26. Moreover, the long coil 34 located on the opposite side to the neutral point 44 in the W phase 42W is arranged so as to straddle the short coil 32 located on the opposite side to the neutral point 44 in the U phase 42U and the short coil 32 located on the opposite side to the neutral point 44 in the V phase 42V.

The short coil 32 located on the opposite side to the neutral point 44 in the V phase 42V and the short coil 32 located on the opposite side to the neutral point 44 in the Z phase 42Z are arranged adjacent to each other in the circumferential direction along the stator core 26. Moreover, the long coil 34 located on the opposite side to the neutral point 44 in the X phase 42X is arranged so as to straddle the short coil 32 located on the opposite side to the neutral point 44 in the V phase 42V and the short coil 32 located on the opposite side to the neutral point 44 in the Z phase 42Z.

The short coil 32 located on the opposite side to the neutral point 44 in the Z phase 42Z and the short coil 32 located on the neutral point 44 side in the U phase 42U are arranged adjacent to each other in the circumferential direction along the stator core 26. Moreover, the long coil 34 located on the opposite side to the neutral point 44 in the Y phase 42Y is arranged so as to straddle the short coil 32 located on the opposite side to the neutral point 44 in the Z phase 42Z and the short coil 32 located on the neutral point 44 side in the U phase 42U.

The short coil 32 located on the neutral point 44 side in the U phase 42U and the short coil 32 located on the neutral point 44 side in the V phase 42V are arranged adjacent to each other in the circumferential direction along the stator core 26. Moreover, the long coil 34 located on the neutral point 44 side in the W phase 42W is arranged so as to straddle the short coil 32 located on the neutral point 44 side in the U phase 42U and the short coil 32 located on the neutral point 44 side in the V phase 42V.

The short coil 32 located on the neutral point 44 side in the V phase 42V and the short coil 32 located on the neutral point 44 side in the Z phase 42Z are arranged adjacent to each other in the circumferential direction along the stator core 26. Moreover, the long coil 34 located on the neutral point 44 side in the X phase 42X is arranged so as to straddle the short coil 32 located on the neutral point 44 side in the V phase 42V and the short coil 32 located on the neutral point 44 side in the Z phase 42Z.

The short coil 32 located on the neutral point 44 side in the Z phase 42Z and the short coil 32 located on the opposite side to the neutral point 44 in the U phase 42U are arranged adjacent to each other in the circumferential direction along the stator core 26. Moreover, the long coil 34 located on the neutral point 44 side in the Y phase 42Y is arranged so as to straddle the short coil 32 located on the neutral point 44 side in the Z phase 42Z and the short coil 32 located on the opposite side to the neutral point 44 in the U phase 42U.

As shown in FIGS. 26 and 27, in present embodiment, each of the combined resistances of the U-phase coil connection body 46U and the V-phase coil connection body 46V is R1. On the other hand, the combined resistance of the W-phase coil connection body 46W is R2. As described above, each of the U-phase coil connection body 46U and the V-phase coil connection body 46V is configured with two short coils 32, whereas the W-phase coil connection body 46W is configured with two long coils 34; therefore, the combined resistances R1 are lower than the combined resistance R2.

Moreover, each of the combined resistances of the X-phase coil connection body 46X and the Y-phase coil connection body 46Y is R3. On the other hand, the combined resistance of the Z-phase coil connection body 46Z is R4. As described above, each of the X-phase coil connection body 46X and the Y-phase coil connection body 46Y is configured with two long coils 34, whereas the Z-phase coil connection body 46Z is configured with two short coils 32; therefore, the combined resistances R3 are higher than the combined resistance R4.

Furthermore, in the motor according to the seventh embodiment, the numbers of short coils 32 and long coils 34 of each of the coil connection bodies 46U, 46V, 46W, 46X, 46Y and 46Z is set so as to satisfy the relationship of R1:R2=R4:R3. Consequently, it becomes possible to suppress deterioration of torque ripple. It should be noted that the expression of satisfying the relationship of R1:R2=R4:R3 used hereinafter means that the difference between R1/R2 and R4/R3 is within +5%. It also should be noted that the trio of the U phase 42U, the V phase 42V and the W phase 42W and the trio of the X phase 42X, the Y phase 42Y and the Z phase 42Z may be either respectively connected to and driven by two three-phase inverters, or together connected to and driven by a single three-phase inverter.

Motor According to Eighth Embodiment

As shown in FIG. 28, in the stator 14 of the motor 51 according to the eighth embodiment, a plurality of coils 16 are connected in a delta connection. In the present embodiment, each of the U phase 42U, the V phase 42V and the W phase 42W includes two short coils 32 and two long coils 34. Hereinafter, the junction point between the U-phase coil connection body 46U and the V-phase coil connection body 46V will be referred to as the UV junction point 52UV; the junction point between the V-phase coil connection body

46V and the W-phase coil connection body 46W will be referred to as the VW junction point 52VW; and the junction point between the W-phase coil connection body 46W and the U-phase coil connection body 46U will be referred to as the WU junction point 52WU. In addition, the direction of electric current when voltages are applied between the UV junction point 52UV and the VW junction point 52VW and between the UV junction point 52UV and the WU junction point 52WU is indicated by arrows in FIG. 29.

In the U phase 42U, the four coils 16 are serially connected in the order of one long coil 34, one short coil 32, the other long coil 34 and the other short coil 32 from the WU junction point 52WU side to the UV junction point 52UV side. Moreover, in the V phase 42V, the four coils 16 are serially connected in the order of one short coil 32, one long coil 34, the other short coil 32 and the other long coil 34 from the UV junction point 52UV side to the VW junction point 52VW side. Furthermore, in the W phase 42W, the four coils 16 are serially connected in the order of one short coil 32, one long coil 34, the other short coil 32 and the other long coil 34 from the VW junction point 52VW side to the WU junction point 52WU side. Hereinafter, the range from the WU junction point 52WU to the UV junction point 52UV in the U phase 42U will be referred to as the U-phase coil connection body 46U; the range from the UV junction point 52UV to the VW junction point 52VW in the V phase 42V will be referred to as the V-phase coil connection body 46V; and the range from the VW junction point 52VW to the WU junction point 52WU in the W phase 42W will be referred to as the W-phase coil connection body 46W. In the present embodiment as well, the combined resistances of the U-phase, V-phase and W-phase coil connection bodies 46U, 46V and 46W are equal to each other.

As shown in FIG. 29, the short coil 32 located on the WU junction point 52WU side in the U phase 42U and the short coil 32 located on the VW junction point 52VW side in the W phase 42W are arranged adjacent to each other in the circumferential direction along the stator core 26. Moreover, the long coil 34 located on the VW junction point 52VW side in the V phase 42V is arranged so as to straddle the short coil 32 located on the WU junction point 52WU side in the U phase 42U and the short coil 32 located on the VW junction point 52VW side in the W phase 42W.

The short coil 32 located on the VW junction point 52VW side in the W phase 42W and the short coil 32 located on the UV junction point 52UV side in the V phase 42V are arranged adjacent to each other in the circumferential direction along the stator core 26. Moreover, the long coil 34 located on the WU junction point 52WU side in the U phase 42U is arranged so as to straddle the short coil 32 located on the VW junction point 52VW side in the W phase 42W and the short coil 32 located on the UV junction point 52UV side in the V phase 42V.

The short coil 32 located on the UV junction point 52UV side in the V phase 42V and the short coil 32 located on the UV junction point 52UV side in the U phase 42U are arranged adjacent to each other in the circumferential direction along the stator core 26. Moreover, the long coil 34 located on the WU junction point 52WU side in the W phase 42W is arranged so as to straddle the short coil 32 located on the UV junction point 52UV side in the V phase 42V and the short coil 32 located on the UV junction point 52UV side in the U phase 42U.

The short coil 32 located on the UV junction point 52UV side in the U phase 42U and the short coil 32 located on the WU junction point 52WU side in the W phase 42W are arranged adjacent to each other in the circumferential direction along the stator core 26. Moreover, the long coil 34 located on the VW junction point 52VW side in the V phase 42V is arranged so as to straddle the short coil 32 located on the UV junction point 52UV side in the U phase 42U and the short coil 32 located on the WU junction point 52WU side in the W phase 42W.

The short coil 32 located on the WU junction point 52WU side in the W phase 42W and the short coil 32 located on the VW junction point 52VW side in the V phase 42V are arranged adjacent to each other in the circumferential direction along the stator core 26. Moreover, the long coil 34 located on the UV junction point 52UV side in the U phase 42U is arranged so as to straddle the short coil 32 located on the WU junction point 52WU side in the W phase 42W and the short coil 32 located on the VW junction point 52VW side in the V phase 42V.

The short coil 32 located on the VW junction point 52VW side in the V phase 42V and the short coil 32 located on the WU junction point 52WU side in the U phase 42U are arranged adjacent to each other in the circumferential direction along the stator core 26. Moreover, the long coil 34 located on the VW junction point 52VW side in the W phase 42W is arranged so as to straddle the short coil 32 located on the VW junction point 52VW side in the V phase 42V and the short coil 32 located on the WU junction point 52WU side in the U phase 42U.

In the motor 51 according to the eighth embodiment which includes the stator 14 described above, it is also possible to suppress deterioration of torque ripple.

Motor According to Ninth Embodiment

As shown in FIGS. 30 and 31, the insulator 28 of the motor according to the ninth embodiment has a plurality of first circumferential positioning parts 28E that position the short coils 32 in the circumferential direction, and a plurality of second circumferential positioning parts 28F that position the intermediate coils 48 in the circumferential direction. The first circumferential positioning parts 28E and the second circumferential positioning parts 28F have the same configuration as the circumferential positioning parts 28D (see FIG. 13) described in the first embodiment. The first circumferential positioning parts 28E are arranged at equal intervals in the circumferential direction along the axial-end-surface covering parts 28B of the insulator 28. The second circumferential positioning parts 28F are offset to one side in the axial direction with respect to the first circumferential positioning parts 28E, and arranged at equal intervals in the circumferential direction. Moreover, when viewed from the one side in the axial direction, each of the second circumferential positioning parts 28F is located between a circumferentially-adjacent pair of the first circumferential positioning parts 28E.

Each of the short coils 32 is circumferentially positioned by arranging each of the coil end parts 38 of the short coil 32 between a circumferentially-adjacent pair of the first circumferential positioning parts 28E. Moreover, each of the intermediate coils 48 is circumferentially positioned by arranging each of the coil end parts 38 of the intermediate coil 48 between a circumferentially-adjacent pair of the second circumferential positioning parts 28F. Further, in the state of having been arranged between the circumferentially-adjacent pair of the second circumferential positioning parts 28F, each of the coil end parts 38 of the intermediate coil 48 abuts an axial end surface of one of the first circumferential positioning parts 28E which is located between the circumferentially-adjacent pair of the second circumferential positioning parts 28F. Consequently, each of the intermediate coils 48 is also axially positioned. That is, the first circumferential positioning parts 28E also serve as first axial positioning parts 28G that position the intermediate coils 48 in the axial direction. Furthermore, in the state of the long coils 34 having been arranged along the stator core 26 via the insulator 28, the coil end parts 38 of the long coils 34 respectively abut axial end surfaces of the second circumferential positioning parts 28F. Consequently, the long coils 34 are axially positioned. That is, the second circumferential positioning parts 28F also serve as second axial positioning parts 28H that position the long coils 34 in the axial direction.

In the above-described motor according to the present embodiment, by providing the first circumferential positioning parts 28E (i.e., the first axial positioning parts 28G) and the second circumferential positioning parts 28F (i.e., the second axial positioning parts 28H) in the insulator 28, it becomes possible to improve the work efficiency when mounting the coils 16 to the stator core 26 via the insulator 28.

Motor According to Tenth Embodiment

As shown in FIG. 32, in the motor 54 according to the tenth embodiment, in the stator core 26, there are provided small protrusions 26A each of which is arranged, as an inter-coil part, between a circumferentially-adjacent pair of the opposing parts 36 of the coils 16. Here, let Wt be the circumferential width of each of the small protrusions 26A, Bs be the saturation flux density of the small protrusions 26A, Wm be the circumferential width of the magnets 18 corresponding to one magnetic pole, and Br be the residual flux density of the magnetic compound of which the magnets 18 are formed. In the present embodiment, the small protrusions 26A are formed of a magnetic material satisfying the relationship of Wt× Bs≤Wm×Br, or formed of a non-magnetic material. Consequently, it becomes possible to suppress magnetic saturation and magnetic flux leakage while improving the magnetic flux density of the stator 14. As a result, it becomes possible to improve the torque of the motor 54.

Motor According to Eleventh Embodiment

As shown in FIG. 33, in the motor 56 according to the eleventh embodiment, the magnets 18 of the rotor 12 are formed of a magnetic compound whose intrinsic coercive force He is higher than or equal to 400 [kA/m] and residual flux density Br is higher than or equal to 1.0[T]. Moreover, when the magnets 18 are viewed in the axial direction, the angles between the directions of easy axes of magnetization 58 at the centers of magnetic poles formed by the magnets 18 and the radial directions (or the d-axis 60) are less than the angles between the directions of easy axes of magnetization 58 at the boundaries between the magnetic poles and the radial directions (or the q-axis 62). Consequently, it becomes possible to increase the magnetic flux density in an air gap between the rotor 12 and the stator 14. As a result, it becomes possible to reduce the size of the motor 56, increase the output of the motor 56 and reduce the volume of the magnets 18.

Motors According to Twelfth and Thirteenth Embodiments

As shown in FIG. 34A, in the motor 64 according to the twelfth embodiment, for each circumferentially-adjacent pair of the magnets 18, a part of one of the pair of the magnets 18 on the side of the coils 16 and a part of the other of the pair of the magnets 18 on the side of the coils 16 are spaced apart in the circumferential direction. Moreover, an intervening part 24D, which is formed of a magnetic material, intervenes between a part of one of the pair of the magnets 18 on the opposite side to the coils 16 and a part of the other of the pair of the magnets 18 on the opposite side to the coils 16. The intervening part 24D is formed, for example, integrally with the rotor core 24 into one piece.

As shown in FIG. 34B, in the motor 66 according to the thirteenth embodiment, for each circumferentially-adjacent pair of the magnets 18, a part of one of the pair of the magnets 18 on the side of the coils 16 and a part of the other of the pair of the magnets 18 on the side of the coils 16 are spaced apart in the circumferential direction. On the other hand, a part of one of the pair of the magnets 18 on the opposite side to the coils 16 and a part of the other of the pair of the magnets 18 on the opposite side to the coils 16 are in contact with or slightly spaced apart from each other in the circumferential direction.

With the above configurations of the motors 64 and 66 according to the twelfth and thirteenth embodiments, it is possible to increase the magnetic flux density while reducing the magnetic resistance between each circumferentially-adjacent pair of the magnets 18.

Motor According to Fourteenth Embodiment

As shown in FIG. 35, the motor 68 according to the fourteenth embodiment is a speed reducer-equipped motor which includes a speed reducer 70. Most of the speed reducer 70 is arranged inside the rotor core 24. The speed reducer 70 includes an inner gear 72 fixed to the rotating shaft 22, and an outer gear 76 arranged radially outside the inner gear 72 and fixed to a housing 74 that supports the stator 14. Moreover, the speed reducer 70 further includes planet gears 78 that are arranged between the inner gear 72 and the outer gear 76 to mesh with the inner gear 72 and the outer gear 76, a carrier 80 that supports the planet gears 78, and an output shaft 82 that is fixed to the carrier 80. With this configuration, the motor 68 can transmit the rotation of the rotor 12 to the output shaft 82 through speed reduction by the speed reducer 70.

Motors According to Fifteenth and Sixteenth Embodiments

As shown in FIGS. 36 and 37, the short coils 32 and long coils 34 of the motor 84 according to the fifteenth embodiment have the same configurations as the short coils 32 and long coils 34 of the motor 86 according to the sixteenth embodiment. In this case, by adjusting the circumferential length of the stator core 26, it is possible to manufacture, with the short coils 32 and long coils 34 of the same configurations, a plurality of types of motors 84 and 86 that are different in output and size.

It should be noted that the configurations of the motors according to the above-described embodiments can be combined with each other. Further, the combinations may be suitably set in consideration of the outputs, sizes and the like required for the motors. Moreover, the configurations of the motors according to the above-described embodiments can be applied not only to inner rotor type motors, but also to outer rotor type motors.

Furthermore, in the examples described above, the pair of coil end parts 38 of each of the coils 16 are bent respectively toward the pair of axial end surfaces of the stator core 26 at substantially right angles. However, the present disclosure is not limited to this configuration. For instance, in an example shown in FIG. 38, for each of the short coils 32, the coil end part 38 of the short coil 32 on the one side in the axial direction is bent toward the corresponding axial end surface of the stator core 26 at a substantially right angle, whereas the coil end part 38 of the short coil 32 on the other side in the axial direction is bent toward the opposite side to the stator core 26 at a substantially right angle. Moreover, for each of the long coils 34, the coil end part 38 of the long coil 34 on the one side in the axial direction is bent toward the corresponding axial end surface of the stator core 26 at a substantially right angle, whereas the coil end part 38 of the long coil 34 on the other side in the axial direction is bent toward the opposite side to the stator core 26 at a substantially right angle. In an example shown in FIG. 39, for each of the short coils 32, the coil end part 38 of the short coil 32 on the one side in the axial direction is bent toward the corresponding axial end surface of the stator core 26 at a substantially right angle, whereas the coil end part 38 of the short coil 32 on the other side in the axial direction extends straight without being bent. On the other hand, for each of the long coils 34, the coil end part 38 of the long coil 34 on the one side in the axial direction extends straight without being bent, whereas the coil end part 38 of the long coil 34 on the other side in the axial direction is bent toward the opposite side to the stator core 26 at a substantially right angle. In addition, in this example, the terminal parts 40 of the coils 16 extend obliquely with respect to the axial direction. In an example shown in FIG. 40, the pair of coil end parts 38 of each of the short coils 32 are bent respectively toward the pair of axial end surfaces of the stator core 26 at substantially right angles, whereas the pair of coil end parts 38 of each of the long coils 34 extend straight without being bent. In an example shown in FIG. 41, the pair of coil end parts 38 of each of the short coils 32 are bent respectively toward the pair of axial end surfaces of the stator core 26 so as to extend obliquely with respect to the axial direction. Moreover, the pair of coil end parts 38 of each of the long coils 34 are also bent respectively toward the pair of axial end surfaces of the stator core 26 so as to extend obliquely with respect to the axial direction. As above, the decision as to whether to bend the coil end parts 38 of the coils 16 may be suitably made and the directions of bending and the angles of bending of the coil end parts 38 may be suitably set in consideration of the sizes and the like required for the motors. Moreover, as shown in FIG. 42, the end parts of the magnets 18 on the one side and the other side in the axial direction may be respectively radially opposed to the coil end parts 38 of the coils 16 on the one side and the other side in the axial direction. In this case, it is possible to achieve an increase in the output of the motor and a reduction in the size of the motor. Furthermore, in an example shown in FIG. 43, both the coil end parts 38 of one coil 16 on the one side and the other side in the axial direction are not bent. On the other hand, the boundary portions between the opposing parts 36 and the coil end parts 38 of another coil 16 on the one side and the other side in the axial direction are bent respectively toward the pair of axial end surfaces of the stator core 26. Consequently, the coil end parts 38 of the two coils 16 on the one side in the axial direction are arranged to radially overlap each other; and the coil end parts 38 of the two coils 16 on the other side in the axial direction are also arranged to radially overlap each other. With this configuration, it becomes unnecessary to arrange the coil end parts 38 of the one coil 16 respectively along the pair of axial end surfaces of the stator core 26; and it becomes possible to reduce the size of those portions of the coil end parts 38 of the another coil 16 which are arranged respectively along the pair of axial end surfaces of the stator core 26. Consequently, it becomes possible to achieve a reduction in the radial size of the stator core 26. In an example shown in FIG. 44, in one coil 16, the coil end part 38 on the one side in the axial direction is bent toward the corresponding axial end surface of the stator core 26, whereas the coil end part 38 on the other side in the axial direction is not bent. On the other hand, in another coil 16, the coil end part 38 on the one side in the axial direction is not bent, whereas the coil end part 38 on the other side in the axial direction is bent toward the opposite side to the stator core 26. Consequently, the coil end parts 38 of the two coils 16 on the one side in the axial direction are arranged to radially overlap each other; and the coil end parts 38 of the two coils 16 on the other side in the axial direction are also arranged to radially overlap each other. In addition, in this example, the one coil 16 may be first arranged along the stator core 26; and then the another coil 16 may be arranged along the stator core 26 by moving it in the axial direction.

As shown in FIG. 45, each of the windings 30 forming the coils 16 may be constituted of two winding units 88 stacked in the second direction (i.e., the direction of the arrow A2). As an alternative, as shown in FIG. 46, each of the windings 30 forming the coils 16 may be constituted of two winding units 88 stacked in the first direction (i.e., the direction of the arrow A1). As another alternative, as shown in FIG. 47, each of the windings 30 forming the coils 16 may be constituted of four winding units 88 stacked in the first direction and the second direction.

In the above-described embodiments, the magnets 18 are provided in the rotor 12; and the coils 16 are provided in the stator 14. Alternatively, the coils 16 may be provided in the rotor 12; and the magnets 18 may be provided in the stator 14. Moreover, the present disclosure can also be applied to electric generators where a rotor is rotated by an external force.

While the above particular embodiments of the present disclosure have been shown and described, it will be understood by those skilled in the art that the present disclosure is not limited to the above particular embodiments, but may be carried out through various modifications without departing from the spirit of the present disclosure.

Moreover, while the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A motor comprising:
a rotating body having magnets and rotatably supported;
a core formed in a ring shape and arranged coaxially with the rotating body;
a coil connection body of one phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core; and a coil connection body of another phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core, wherein the coil connection body of the another phase has a combined resistance set to be equal to a combined resistance of the coil connection body of the one phase, wherein:

each of the coils has
opposing parts in each of which layers of the winding are arranged side by side in a circumferential direction and which are radially opposed to axial centers of the magnets, and
coil end parts formed respectively on one side and the other side of the opposing parts in an axial direction; and
the coil end parts of one of the coils and the coil end parts of another of the coils whose electrical resistance is different from the electrical resistance of the one of the coils are arranged to overlap each other.

2. The motor as set forth in claim 1, wherein:
in each of the coils, the winding has, in a cross-sectional view taken along its longitudinal direction, a dimension in a first direction set to be greater than a dimension in a second direction perpendicular to the first direction; and
the first direction of the winding at the opposing parts of the coil is oriented toward the magnets.

3. The motor as set forth in claim 1, wherein:
each of the coils is formed by winding the winding so that the layers of the winding are stacked in the second direction;
the layers of the winding stacked in the second direction are inseparably bound in the second direction; and
for each of the coils, at least one of the coil end parts of the coil is arranged along an axial end surface of the core by bending boundary portions between the at least one of the coil end parts and the opposing parts of the coil in the first direction.

4. The motor as set forth in claim 1, wherein:
when viewed in the axial direction, the opposing parts of each of the coils are curved along a radially inner surface or a radially outer surface of the core.

5. The motor as set forth in claim 1, wherein:
each of the coils has a pair of terminal parts arranged on the one side in the axial direction; and
the number of stacked layers of the winding at the coil end part on the one side in the axial direction is less than the number of stacked layers of the winding at the coil end part on the other side in the axial direction.

6. The motor as set forth in claim 1, wherein:
each of the magnets has an end part on one side in an axial direction and an end part on the other side in the axial direction; and
the end parts of the magnets on the one side and the other side in the axial direction are respectively radially opposed to the coil end parts of the coils on the one side and the other side in the axial direction.

7. The motor as set forth in claim 1, wherein:
to the core, there is mounted an insulator that separates the core and the coils; and in the insulator, there are provided circumferential positioning parts that position the coils in a circumferential direction.

8. The motor as set forth in claim 1, wherein:

to the core, there is mounted an insulator that separates the core and the coils; and in the insulator, there are provided axial positioning parts that position the coils in an axial direction.

9. The motor as set forth in claim 1, wherein:

the magnets are formed of a magnetic compound whose intrinsic coercive force Hc is higher than or equal to 400 [kA/m] and residual flux density Br is higher than or equal to 1.0 [T]; and when viewed in an axial direction, angles between directions of easy axes of magnetization at centers of magnetic poles formed by the magnets and radial directions are less than angles between directions of easy axes of magnetization at boundaries between the magnetic poles and radial directions.

10. The motor as set forth in claim 1, wherein:

the magnets are arranged side by side in a circumferential direction;

for each circumferentially-adjacent pair of the magnets, a part of one of the pair of the magnets on a side of the coils and a part of the other of the pair of the magnets on the side of the coils are spaced apart in the circumferential direction; and for each circumferentially-adjacent pair of the magnets, a part of one of the pair of the magnets on an opposite side to the coils and a part of the other of the pair of the magnets on the opposite side to the coils are arranged in contact with each other in the circumferential direction, or arranged with an intervening part, which is formed of a magnetic material, intervening therebetween in the circumferential direction.

11. The motor as set forth in claim 1, further comprising a speed reducer that is provided radially inside the rotating body to reduce the speed of rotation of the rotating body.

12. The motor as set forth in claim 1, wherein:

the plurality of coils of the coil connection body of the one phase comprise coils each of which is formed of a winding having a first length and coils each of which is formed of a winding having a second length greater than the first length;

the plurality of coils of the coil connection body of the another phase also comprise coils each of which is formed of a winding having the first length and coils each of which is formed of a winding having the second length;

the opposing parts of all the coils are arranged at a same radial position;

the coil end parts of the coils formed of the windings having the first length axially overlap the coil end parts of the coils formed of the windings having the second length; and the coil end parts of the coils formed of the windings having the second length are arranged on an opposite side to the core with respect to the coil end parts of the coils formed of the windings having the first length.

13. A motor comprising:

a rotating body having magnets and rotatably supported;

a core formed in a ring shape and arranged coaxially with the rotating body;

a coil connection body of one phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core; and a coil connection body of another phase having a plurality of coils connected with each other, each of the plurality of coils being formed by winding an electrically conductive winding into a ring shape, at least one of the plurality of coils having an electrical resistance set to be different from an electrical resistance of another of the plurality of coils, the plurality of coils being opposed to the magnets and arranged along the core, wherein the coil connection body of the another phase has a combined resistance set to be equal to a combined resistance of the coil connection body of the one phase, wherein:

the core has inter-coil parts each of which is arranged between one of the coils and another of the coils; and the inter-coil parts are formed of a magnetic material satisfying the following relationship or formed of a nonmagnetic material, $$Wt \times Bs \leq Wm \times Br$$

where Wt is a circumferential width of each of the inter-coil parts, Bs is a saturation flux density of the inter-coil parts, Wm is a circumferential width of the magnets corresponding to one magnetic pole, and Br is a residual flux density of a magnetic compound of which the magnets are formed.

14. A motor comprising:

a rotating body having magnets and rotatably supported;

a core formed in a ring shape and arranged coaxially with the rotating body;

a first connection body having a plurality of coil connection bodies connected with each other, each of the plurality of coil connection bodies having a plurality of coils connected with each other, each of the plurality of coils being formed by winding an electrically conductive winding into a ring shape, the plurality of coils being opposed to the magnets and arranged along the core; and a second connection body having a plurality of coil connection bodies connected with each other, each of the plurality of coil connection bodies having a plurality of coils connected with each other, each of the plurality of coils being formed by winding an electrically conductive winding into a ring shape, the plurality of coils being opposed to the magnets and arranged along the core, wherein:

a combined resistance R1 of one of the plurality of coil connection bodies constituting the first connection body is lower than a combined resistance R2 of another of the plurality of coil connection bodies constituting the first connection body;

a combined resistance R3 of one of the plurality of coil connection bodies constituting the second connection body is higher than a combined resistance R4 of another of the plurality of coil connection bodies constituting the second connection body; and $$R1:R2 = R4:R3.$$

* * * * *